United States Patent
Spoto et al.

(10) Patent No.: US 8,142,944 B2
(45) Date of Patent: Mar. 27, 2012

(54) MICRO FUEL CELL AND CORRESPONDING MICROREACTOR, SUPPLIED WITH HYDROGEN, FOR PRODUCING ELECTRIC ENERGY

(75) Inventors: Giuseppe Emanuele Spoto, S. G. La Punta (IT); Cristian Dall'oglio, Niscemi (IT); Giuseppe Antonio Maria Nastasi, Tremestieri Etneo (IT); Salvatore Abbisso, Augusta (IT); Roberta Zito, Modugno (IT); Andrea Lazzara, Pedara (IT); Salvatore Leonardi, Aci S. Antonio (IT); Roberta Giuffrida, Catania (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 471 days.

(21) Appl. No.: 12/419,772

(22) Filed: Apr. 7, 2009

(65) Prior Publication Data

US 2009/0253006 A1    Oct. 8, 2009

(30) Foreign Application Priority Data

Apr. 8, 2008  (IT) .............. MI2008A0616
Dec. 31, 2008 (IT) .............. MI2008A2360

(51) Int. Cl.
*H01M 8/06* (2006.01)
(52) U.S. Cl. .................................................. 429/423
(58) Field of Classification Search ............... 429/423, 429/424

See application file for complete search history.

(56) References Cited

U.S. PATENT DOCUMENTS

2005/0176037 A1* 8/2005 Mastromatteo et al. .......... 435/6
2008/0085433 A1* 4/2008 Giuffrida et al. .............. 429/17

FOREIGN PATENT DOCUMENTS

| EP | 1437918 | 7/2004 |
| EP | 1908728 | 4/2008 |
| EP | 1909350 | 4/2008 |

OTHER PUBLICATIONS

Kundu et al., "MEMS-based micro-fuel processor for application in a cell phone", Journal of Power Sources, vol. 162, No. 1, Nov. 2006, pp. 572-578.
Kim et al., "Air-breathing miniature planar stack using the flexible printed circuit board as a current collector" International Journal of Hydrogen Energy, vol. 34, No. 1, Nov. 2008, pp. 459-466.
VanDePol et al., "A thermopneumatic micropump based on micro-engineering techniques", Elsevier Sequoia, Sensors and Actuators, A-21-A23, 1990, pp. 198-202.
VanLintel et al., "A piezoelectric micropump based on micromachining of silicon", Elsevier Sequoia, Sensors and Actuators, 15, 1998, pp. 153-167.

* cited by examiner

*Primary Examiner* — Phuong Dinh
(74) *Attorney, Agent, or Firm* — Allen, Dyer, Doppelt, Milbrath & Gilchrist, P.A.

(57) ABSTRACT

A device for producing energy for portable applications including at least one micro fuel cell and a microreactor, having a reaction chamber including a catalyst, for producing hydrogen gas to be fed to the micro fuel cell. The microreactor includes at least one substrate of a composite material for making printed circuits micromachined with printed circuit technology suitable for making the reaction chamber and having a semipermeable membrane on top of it. The substrate and the membrane are connected to the micro fuel cell to make a single body through a single pressure assembly step.

20 Claims, 71 Drawing Sheets

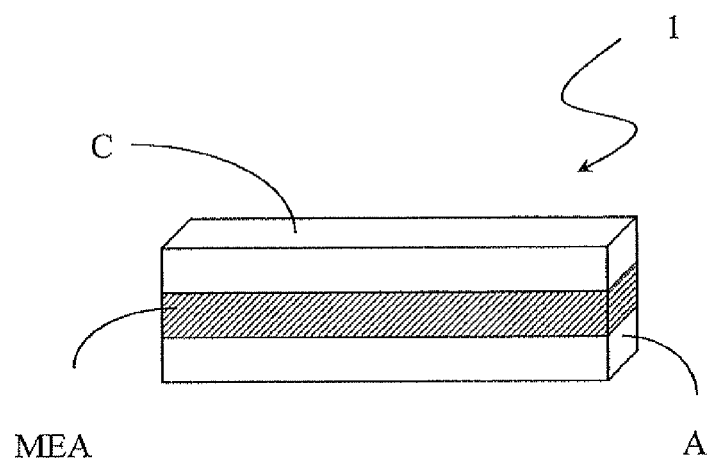
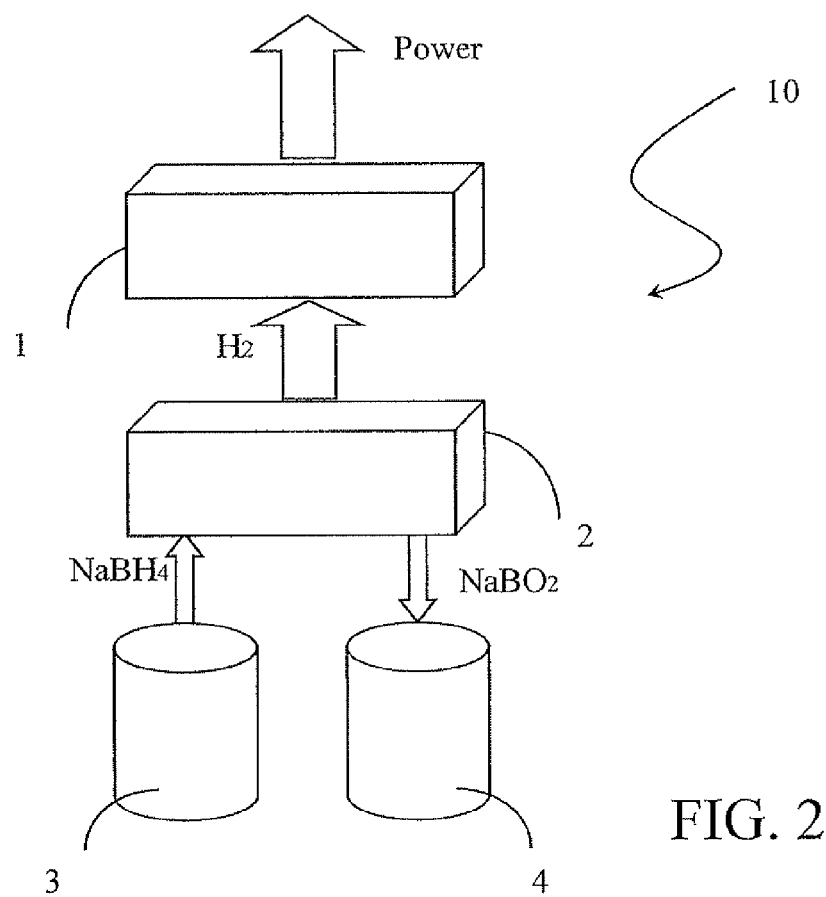
FIG. 1
PRIOR ART
FIG. 2

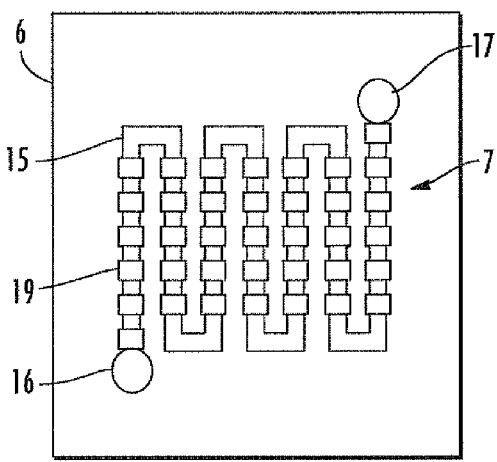
FIG. 7
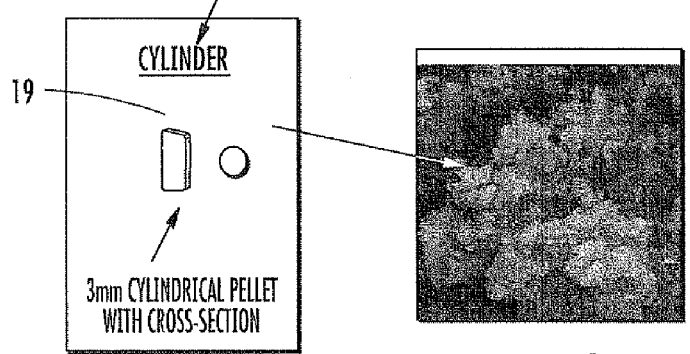
FIG. 8  
3mm CYLINDRICAL PELLET WITH CROSS-SECTION
FIG. 9
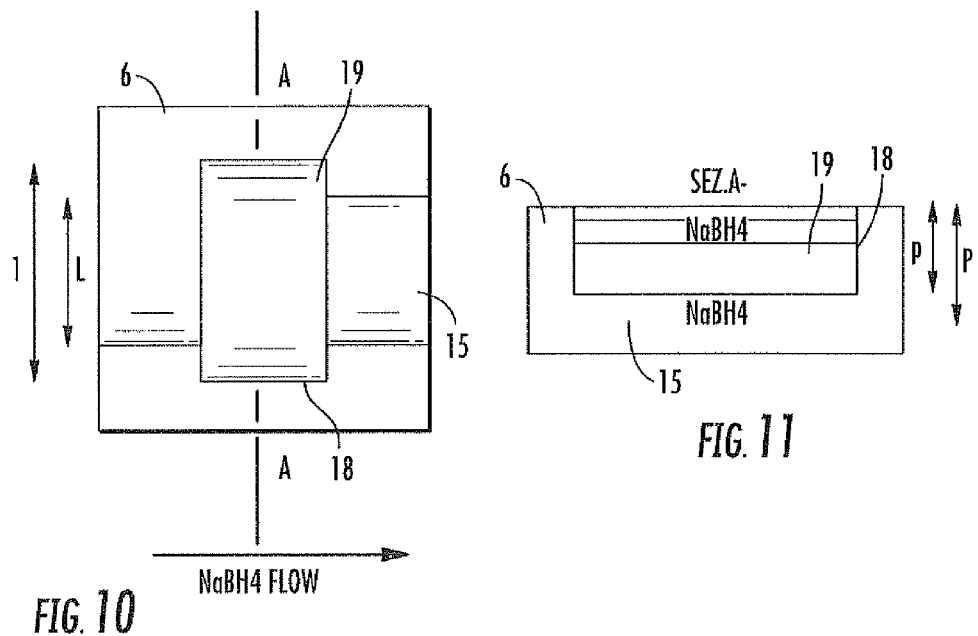
FIG. 10  
NaBH4 FLOW
FIG. 11

96

MICRO FUEL CELL AND CORRESPONDING MICROREACTOR, SUPPLIED WITH HYDROGEN, FOR PRODUCING ELECTRIC ENERGY

FIELD OF THE INVENTION

In its most general aspect, the present invention refers to the industrial field of micro fuel cells, supplied with hydrogen, for producing electric energy, particularly but not exclusively intended to be used in portable electronic applications. In particular, the present invention concerns a device for producing energy including at least one micro fuel cell and a microreactor.

BACKGROUND OF THE INVENTION

It may be known that the increasing miniaturization of portable electronic applications has brought about an intense, strong interest from those skilled in the art towards identifying new sources of electric energy and towards making equipment for exploiting them. All of this is to overcome the use of now conventional batteries, for example, lithium ion batteries.

It may be known that, amongst the new portable electric energy sources, micro fuel cells, hereafter referred to as microcells, in other words, those devices capable of obtaining electric energy from an appropriate fuel, for example through redox reactions, have been of great interest.

A known micro fuel cell is schematically illustrated in FIG. 1, wholly indicated with 1. In particular, the micro fuel cell illustrated uses a solid polymer electrolyte [Proton Exchange Membrane Fuel Cells]. Such a micro fuel cell 1 includes two electrodes, an anode A and a cathode C, separated by an electrolyte, which, instead of being a liquid, is solid and includes a thin polymeric membrane. The thin polymeric membrane allows the H+ protons to pass from the anode A to the cathode C (PEM or Proton Exchange Membrane).

In particular, the advantages of using a membrane electrode assemblies (MEAs) as illustrated in FIG. 1 suitably sandwiched between the anode A and the cathode C to make the micro fuel cell 1 may be known. The micro fuel cells are typically energy converters that, by exploiting the energy content of a chemical fuel, for example, through a redox reaction, allow electric energy to be reversibly produced. Reaction by-products are thus supplied, in particular heat and water. It may also be known that attention of researchers in this field has turned towards identifying fuels that when appropriately treated in respective micro cells, allow electric energy to be obtained easily and cleanly with increased yields.

Currently, hydrogen and methanol are the preferred fuels for treatment in micro cells, in particular, those using solid polymer electrolyte. The power density produced by such micro fuel cells, which is the main prerequisite in portable applications, is greatly influenced by the type of fuel used.

An energy density that can be obtained by a micro fuel cell supplied with hydrogen under the same conditions is greater by a few orders of magnitude than that obtained by an analogous micro cell supplied with methanol. Hydrogen is thus, the desired fuel to use for micro fuel cells for which an increase power density is desired, for example, for portable applications.

In particular, in a hydrogen micro cell 1, the anode A is supplied with hydrogen gas (pure) and then via a catalyst (usually platinum), is separated into protons and electrons. At this point, the protons migrate towards the cathode C through the polymeric MEA membrane, and the electrons, being unable to cross such a membrane, reach the cathode C passing through an external circuit (not illustrated), thus producing an electric current. Oxygen (which may be the oxygen contained in air) also arrives at the cathode C and recombines again with the help of a catalyst (again usually platinum), with the protons coming from the polymeric MEA membrane, and with the electrons coming from the external circuit, thus forming water.

However, to obtain sufficient amounts of electric energy from a hydrogen micro cell for satisfactory, long-lasting operation of a respective portable electronic device, in particular, sufficient amounts of energy to justify a gradual replacement of the batteries currently used as portable energy sources, it is desirable for the micro cell to have a substantial "reserve" of hydrogen available. For the aforementioned purpose, taking into account the techniques for producing hydrogen adopted up to now, the extremely reduced size of the electronic devices under consideration, and that of the micro fuel cells associated with the devices, the aforementioned may be satisfied by using small tanks (cylinders) in which the hydrogen is stored in gas state at very high pressures, or even liquefied at very low temperatures.

Known technical approaches for storing hydrogen include compressing hydrogen in gaseous phase under high pressure, for example 200-350 bar at a temperature of 20° C. It may be known to store hydrogen in liquid form at very low temperatures, for example equal to –253° C. for a pressure of one bar.

The operative conditions (temperature and pressure) for the storage of hydrogen in liquid and gas form carried out according to the prior art can be summarised in the following table:

TABLE 1

| Storage system | Temperature (° C.) | Pressure (bar) |
| --- | --- | --- |
| liquid H2 | –253 | 1 |
| compressed H2 | 20 | 200-350 |

In addition to the recognized danger of the different manipulations, it may be desirable to subject hydrogen to, in order to store it in small tanks in the aforementioned conditions, other drawbacks of the known techniques that include such manipulations that should be carried out between the production of the hydrogen and its transformation into electric energy, involving respective methodologies, apparatuses, and devices that are generally difficult to carry and control. Moreover, as far as the liquefaction of hydrogen is concerned, it may be known that it involves a total energy loss of about 30% since keeping the hydrogen in liquid form involves keeping it at a temperature of –253° C. Moreover, to keep hydrogen in liquid form it is desirable to use cryogenic containers that, as well as being expensive instruments, generally require a reduction of fuel losses by evaporation to a minimum.

For these reasons, the use of hydrogen as energy vehicle in portable commercial systems has not yet experienced the great, advantageous widespread use that its potential would make us think. In any case, at the moment, on the market there are no portable systems for producing electric power based upon micro fuel cells supplied with hydrogen.

SUMMARY OF THE INVENTION

The technical problem is to provide a device for producing energy using micro fuel cells, having functional and structural features that allow the aforementioned drawbacks with reference to the prior art to be overcome, reducing the operative steps between production of hydrogen and its transformation into electric energy, and the overall size of the system, and also reducing the production costs.

This problem is addressed according to the present embodiments by a device for producing electric energy for portable applications. The device includes at least one micro fuel cell and a microreactor having a reaction chamber having a catalyst for producing hydrogen gas. The hydrogen gas is fed to the aforementioned micro cell. The microreactor includes at least one substrate of composite material for making printed circuits. The substrate is micromachined with printed circuit board (PCB) technology to make the reaction chamber, and has a semipermeable membrane on top of it. The substrate and the membrane are connected to the micro fuel cell to form a single body.

Moreover, advantageously, the substrate of the microreactor includes a microchannel having a plurality of trapping seats for a plurality of catalyst particles to restrain such particles and promote the reaction with a fuel solution that flows in the channel. Moreover, the micro fuel cell is made using a first layer and a second layer, both of composite material for making printed circuits, suitably micromachined with printed circuit technology. The characteristics and advantages of the device according to the present embodiments shall become clearer from the following description of an embodiment thereof, given for indication and not limiting purposes, and with reference to the attached drawings.

BRIEF DESCRIPTION OF THE DRAWINGS

FIG. 1 is a block diagram that schematically illustrates a micro fuel cell according to the prior art.

FIG. 2 is a block diagram that schematically illustrates a device for producing energy according to the present invention.

FIG. 7 is a top view of the substrate of the microreactor of the device for producing energy of FIG. 5.

FIG. 8 is a side view from above of a particle of a catalyst used in the device for producing energy according to the invention.

FIG. 9 is a photograph taken by microscope of the particle of FIG. 8.

FIG. 10 is a schematic view from above of a detail of the substrate of FIG. 7

FIG. 11 is a view according to the line A-A of the detail of FIG. 10.

FIG. 42 shows a schematic view of a second step of Stand-By.

FIGS. 92 to 96 show respective graphs depicting the data shown in a table of experimental tests carried out by the Applicant according to the present invention.

DETAILED DESCRIPTION OF THE PREFERRED EMBODIMENTS

First Embodiment

Figure 3:
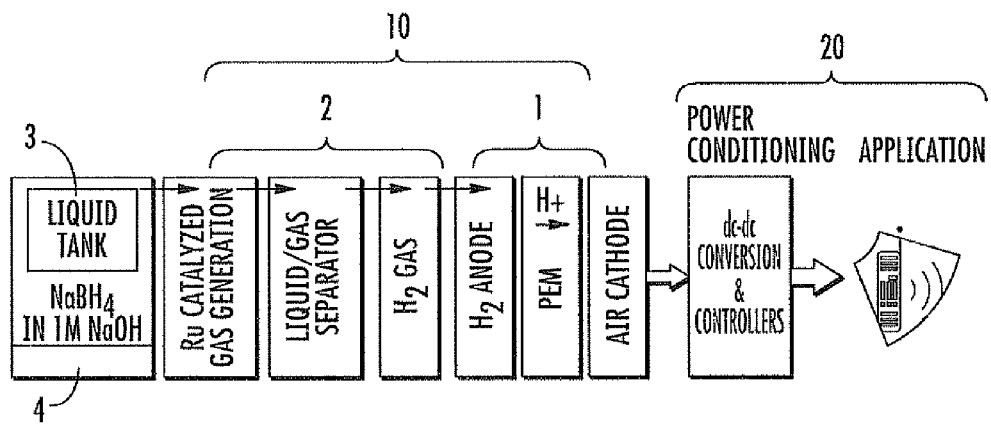
FIG. 3 is a block diagram of a portable application including a device for producing energy according to the present invention.
Figure 4:
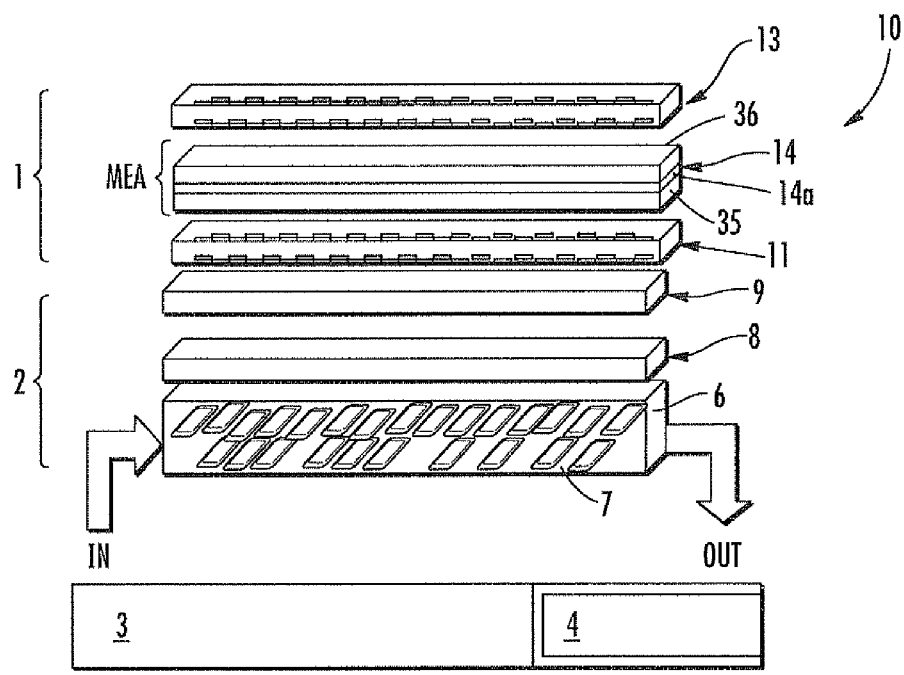
FIG. 4 is a schematic exploded view of a device for producing energy according to the present invention.
Figure 5:
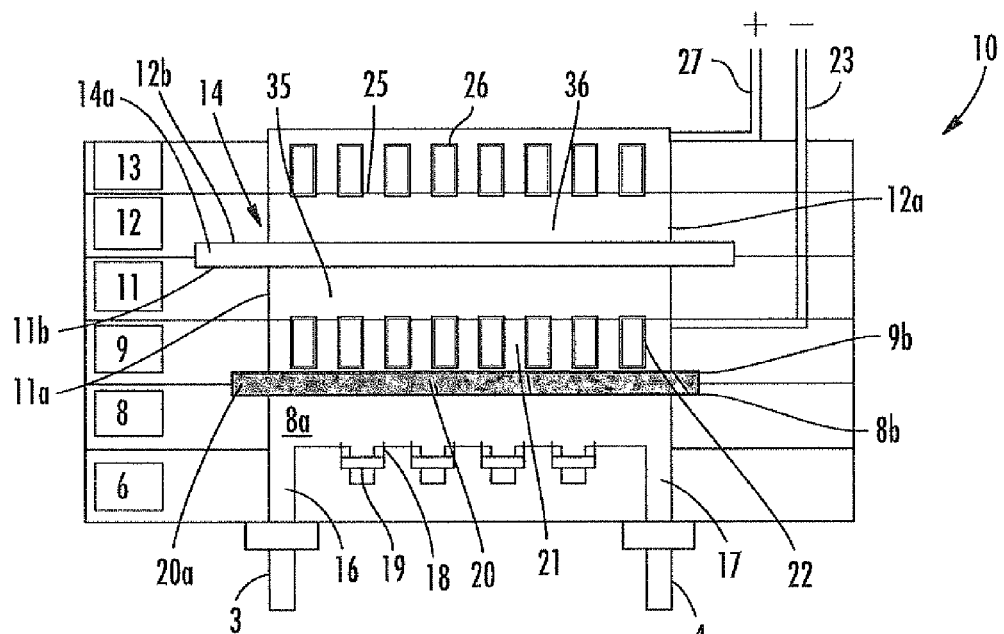
FIG. 5 is a schematic side section view of a device for producing energy according to the present invention.
Figure 6:
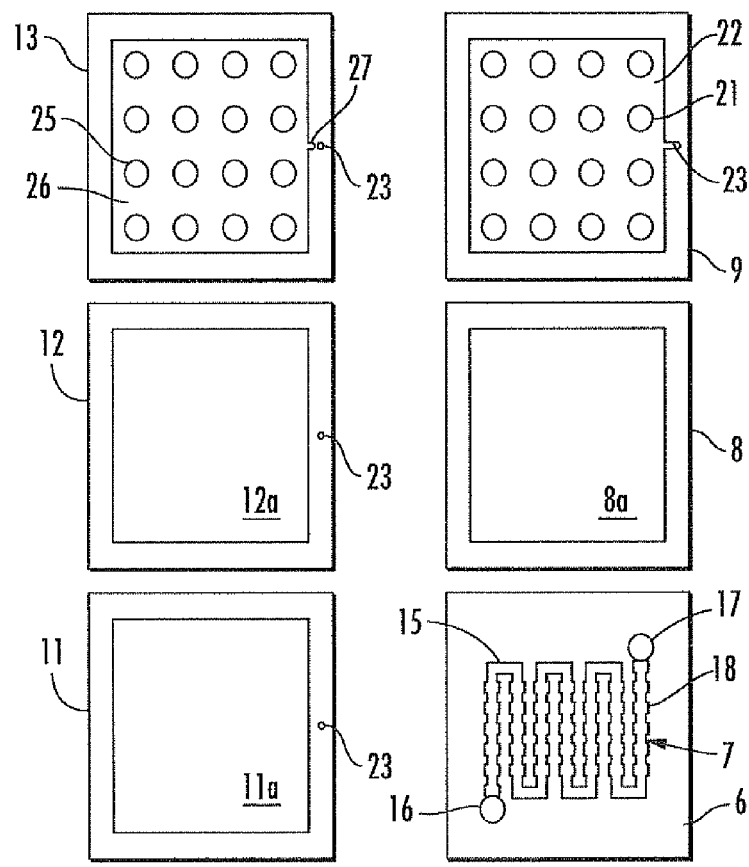
FIG. 6 is an exploded view of the layers that make up the micro fuel cell and the microreactor of the device for producing energy of FIG. 5.

With reference to the attached figures, a device for producing energy is described. The device is for supplying power to a generic portable application, for example, for indicative and not limiting purposes, the one represented in FIG. 3.

The illustrated application includes the device 10 for producing energy suitable for supplying power to a mobile telephone 20, but it could supply power to a Personal Digital Assistant (PDA), a palmtop computer, and similar applications. In particular, the device 10 for producing energy includes a micro fuel cell 1 and a microreactor 2 for producing hydrogen gas H2 to be supplied to such a micro fuel cell 1, which takes care of transforming it into electric energy, indicated with Power in FIG. 2. The mobile telephone 20 also includes conversion and control circuits to convert the electric energy produced by the device 10 according to the application.

The manufacture of the present device 10 is based upon forming the microreactor 2 through superposition of layers of composite material, similar to making printed circuits, preferably of the Frame Retardant 4 (FR4) type or Composite Epoxy Material type 1 (CEM1).

Such layers are separately micromachined with Printed Circuit Board (PCB) technology through precision mechanical micromachining, for example, numerical control milling, and three-dimensional metallizations to obtain metalized through holes and buried channels. Advantageously, moreover, such layers are connected together in a single final pressure assembly step, with the interposition of an adhesive and/or of a silicon resin to make a single body with the micro fuel cell 1. The micro fuel cell 1 is obtained according to the present embodiments as described hereafter.

According to the present embodiments, the device 10 for producing energy also includes a first tank 3 for storing a fuel solution and a second tank 4 for collecting the reaction by-products. The body of the microreactor 2 includes a substrate 6, in particular, a plate made from composite material with a predetermined thickness, and micromachined through a numerical control milling to form a reaction chamber 7. In accordance with an embodiment, the reaction chamber 7 includes a microchannel 15, formed in the thickness of the substrate 6 and extending substantially in a coil, and two through holes, a first inlet hole 16 and a second outlet hole 17, are open on the bottom of the microchannel 15 at respective opposite ends.

The first inlet hole 16 and the second outlet hole 17 are in fluid communication, respectively, with the first storage tank 3 and with the second collection tank 4 to allow the flowing of the fuel solution. Advantageously, the reaction chamber 7 includes a catalyst that reacts with the fuel solution for producing hydrogen gas H2.

The catalyst includes a plurality of particles 19 of catalyst advantageously shaped like pellets, and the microchannel 15 includes a plurality of trapping seats 18 for the particles 19 of catalyst. Advantageously, to fix the particles 19 of catalyst, the trapping seats 18 are made, according to an embodiment, transversally with respect to the axis of greatest extension of the microchannel 15, obtained as grooves with a generally parallel-piped configuration. Suitably, the trapping seats 18 or housing and locking seats are made through precision mechanical machining, for example, numerical control milling. Each trapping seat 18, is arranged symmetrically with respect to the axis of greatest extension of the microchannel 1, has a greater width l than the width L of the microchannel 15, and a smaller depth p than the depth P of the microchannel 15. In this way, the microchannel 15, at each trapping seat 18, has a generally T-shaped cross section.

Advantageously, moreover, the trapping seats 18 are arranged regularly for the width of the microchannel 15. In particular, the trapping seats 18 are equally spaced apart for a uniform distribution of the particles 19 of catalyst along the microchannel 15 to allow a uniform production of hydrogen gas H2. The particles 19 of catalyst have a cylindrical configuration with a diameter between about 2 mm and 4 mm, and preferably equal to about 3 mm. Advantageously, the particles 19 of catalyst are housed in the trapping seats 18 and remain suspended, resting at their ends. In this way, the trapping seats 18 in turn fix each particle 19 of catalyst, avoiding it being transported by the fuel that flows in the microchannel 15. Moreover, in each trapping seat 18 many particles 19 of catalyst are housed that are arranged perpendicular to the flow of the fuel, and they are advantageously hit by it along their longer side. This promotes the reaction with the fuel solution considerably increasing the production of hydrogen gas H2.

The microreactor 2 also includes an upper layer 9 on top of the substrate 6 with the interposition of a semipermeable membrane 20, i.e. a liquid-gas separator permeable to gases and impermeable to liquids. The semipermeable membrane 20 is arranged in juxtaposition over the microchannel 15 and allows the passage of hydrogen gas H2 towards the anode A of the micro fuel cell 1 on top. Advantageously, the upper layer 9 has a plurality of first through holes 21 juxtaposed over the semipermeable membrane 20. Such first holes 21 are formed through a numerical control milling step.

Furthermore, the upper layer 9 includes, on the opposite face to the semipermeable membrane 20, a first metalized film 22 that also covers the inside of the plurality of first holes 21. The first metalized film 22 is made through a planar metallization step that advantageously takes place by electrochemical deposition of a metal, for example, copper. Suitably, the first metalized film 22 captures the electrons that are freed at the anode A of the micro fuel cell 1, and through a first connection terminal 23 connects the first metalized film 22 to the outside of the device 10.

According to the present embodiment, the microreactor 2 also includes an intermediate layer 8 arranged between the substrate 6 and the upper layer 9. The intermediate layer 8 has a first opening 8a of about the same size as the perimeter size of the microchannel 15. The semipermeable membrane 20 is completely embedded between the intermediate layer 8 and the upper layer 9, which define suitable containment half-shells. The perimeter edges 20a of the membrane 20 are housed in countershaped recesses 8b, 9b shaped like an "L" and formed in the intermediate layer 8 and in the upper layer 9 made through respective numerical control milling machining.

The substrate 6 and the layers 8 and 9, suitably micromachined separately, are laid on top of one another with the juxtaposition of the semipermeable membrane 20, and, through a single final pressure assembly step with the interposition of an adhesive and/or of a silicon resin between the layers, they are associated with one another and with the micro fuel cell 1 to form the device 10 in a single or monolithic body.

According to a further aspect, the micro fuel cell 1 is advantageously formed from a first layer 11 and from a second layer 13 with a membrane 14 of the Membrane Electrode Assembly (MEA) arranged between. The membrane 14 advantageously includes a central core 14A or Proton Exchange Membrane (PEM) and two electrodes, a lower one 35 and an upper one 36, in a monolithic configuration.

According to the present embodiment, the micro fuel cell 1 and the microreactor 2 are both formed from layers of composite material, preferably FR4 or CEM1, having the same dimensions. Such layers are micromachined according to PCB technology and connected together, and with the layers defining the microreactor 2 through a single final pressure assembly step, with the interposition of an adhesive and/or of a silicon resin to make the device 10 in a single body.

The first layer 11 has a second opening 11a of approximately the same size as the size of the microchannel 15 and/or of the MEA membrane 14, and it has, at the edge of such a second opening 11a, a recess 11b shaped like an "L", which is the housing seat for the perimeter edge of the central core 14A or PEM of the MEA membrane 14.

The second layer 13 has a plurality of second through holes 25 juxtaposed over the second window 11a, and such second holes 25 are formed through a numerical control milling step. Furthermore, the second layer 13, on the opposite face to the MEA membrane 14, includes a second metalized film 26 that also covers the inside of the plurality of second holes 25, thus making them metalized. The second metalized film 26 is formed through a planar metallization step that advantageously takes place by electrochemical deposition of a metal, preferably copper.

The second metallic film 26 is connected to the external application through a second terminal 27 made with a metallic track during the planar metallization step. In particular, the first terminal 23 is carried outside of the device 10. A second terminal 27, with suitable overlying metalized holes is made in each layer that makes up the micro fuel cell 1. The first terminal 23 and the second terminal 27, which represent the poles for connection to the application, allow the electric signal or the power produced to be withdrawn localizing it outside of the device 10.

According to the present embodiment, the micro fuel cell 1 also includes a third intermediate layer 12 arranged between the first layer 11 and the second layer 13, also preferably made from FR4 or else CEM1. The third layer 12 has a third opening 12a of about the same size as the size of the upper electrode 36 of the MEA membrane 14. In this case, the MEA membrane 14 is arranged between the first layer 11 and the third layer 12, which define suitable containment half-shells. The perimeter edges of the central core 14A or PEM 4a of the MEA membrane 14 are housed in countershaped recesses 11b, 12b shaped like an "L" formed in the first layer 11 and in the third layer 12.

Advantageously, a further catalyst including at least one metal of group VIIIB of the periodic table of elements. In particular, the metal is selected from Cobalt, Nickel, Platinum, Ruthenium, and preferably Platinum is placed on the MEA membrane 14. Such a further catalyst allows the reaction of the hydrogen gas H2 produced by the microreactor 2 and its transformation into H+ ions. These H+ ions, passing through the MEA membrane 14, reach the cathode C of the micro fuel cell 1, where, together with the oxygen present in the air and having access to the micro fuel cell 1 through the second layer 13 that makes such a cathode C, they react to form water and developing heat.

In particular, therefore, the micro fuel cell 1 operates in so-called "air breathing" conditions, i.e. the oxygen needed to complete the electrochemical reaction of the device 10 arrives naturally, coming from atmospheric air through the cathode C of the micro fuel cell 1. The electrons, on the other hand, through an external electric circuit connected to the device 10 for producing energy, constitute the current delivered by the micro fuel cell 1, and complete the reaction at the cathode C where, recombining with the H+ ions, reconstitute the hydrogen atoms before they react with oxygen to form water.

In accordance with an embodiment, a continuous flow of an aqueous solution of Sodium borohydride (NaBH4), stored at room temperature and atmospheric pressure in the first tank 3, is supplied to the reaction chamber 7 of the microreactor 2. In this way, the aqueous solution of Sodium borohydride (NaBH4) passing through the reaction path into the combustion chamber 7 flows through the microchannel 15 and comes into contact, for an appropriate and predetermined residency time, with the particles 19 of the catalyst housed in the trapping seats 18, reacting for the formation of hydrogen gas H2 to be fed to the micro fuel cell 1. Advantageously, to make such an aqueous solution non-flammable and stable in air, it is buffered to a pH of between 13 and 14, preferably pH 14, by an aqueous solution of sodium hydroxide (NaOH), about 4% by weight.

The particles 19 of catalyst may be formed from a metal of group VIIIB of the periodic table of elements, and in particular a metal selected from Co, Ni, Pt and Ru. Preferably, the catalyst used is Ruthenium in pellet form, arranged at the trapping seats 18.

When it comes into contact with such a catalyst, hydrogen gas is released from the aqueous solution of Sodium borohydride (NaBH4), according to the reaction:

$$NaBH4 + H2O \xrightarrow{catalyst} 4 H2 + NaBO2\ (aq) + 300\ KJ$$

It is, in particular, an exothermal reaction, which takes place spontaneously at a temperature equal to about 25° C. and at atmospheric pressure.

The unreacted Sodium borohydride (NaBH4) solution and the sodium metaborate (NaBO2) by-product, continuously discharged from the microreactor 2, are sent to the second collection tank 4. The hydrogen (H2) produced by the aforementioned catalytic reaction comes into contact with the micro fuel cell 1, at room temperature and atmospheric pressure, passing through the first holes 21.

In the reaction indicated above, from 1 mol of Sodium borohydride (NaBH4) 4 mols of hydrogen (H2) are obtained, for which reason, advantageously by using Sodium borohydride (NaBH4) as fuel solution, increased percentages of hydrogen are produced in a stable manner. In particular, from 1 liter of NaBH4 solution at 30 wt %, stabilized with NaOH at 4 wt %, in the presence of Ruthenium as catalyst 8, at about 66 grams of liquid hydrogen are formed, equivalent to 789 liters of hydrogen gas (equal to 7 wt % of hydrogen). Furthermore, it should be highlighted that the sodium metaborate (NaBO2) by-product that is formed from the reaction of Sodium borohydride (NaBH4) is soluble in water, and is not a polluting product, and because of the presence of the semipermeable membrane 20 for separating the gas from the liquid, it does not reach the anode A of the micro fuel cell 1.

Another product in addition to hydrogen that develops and reaches the anode A of the micro fuel cell 1 is therefore water vapour, able to be used to wet the solid electrolyte of the MEA membrane 14 of the micro fuel cell 1. Of course, according to different embodiments, the Sodium borohydride (NaBH4) solution can be supplied by the first storage tank 3 to the reaction chamber 7 through external microfluidic systems such as pumps and/or microvalves or injected using suitably sized pressurised tanks. The advantages of using the PCB technology used to make printed circuits to make micro fuel cells are substantial, in particular, the low cost of the materials used to make the layers of the microreactor and of the micro cell, fast prototyping, and flexibility in the layout of the layers: three-dimensional electric paths and buried channels. Other embodiments include a high level of integration, absence of the containment package, i.e. through the present embodiment the device for producing energy obtained is a so-called on-package system, and possible industrial implementation.

Moreover, further advantages are the substrates that constitute the microreactor and the micro fuel cell can be designed and made separately according to a mass production, carrying out micromachining using numerical control machinery that allows high size control and very high precision machining typical of PCB processes. For this reason, such a device can be manufactured industrially and at low cost. Moreover, such PCB technology allows three-dimensional metallizations, through holes, microchannels and recesses to be made accurately and quickly.

The device is made monolithic through the final assembly step that takes place by a hot pressure step of all of the layers, through the interposition of an adhesive or glue and/or a silicon resin, which allows them to be fixedly connected together making a single monolithic body. Moreover, the device is particularly versatile, and indeed the microreactor can be associated monolithically with a known hydrogen gas H2 micro cell, exploiting all of the advantages that come with the microreactor.

Moreover, because of the presence of the layers of composite material in making printed circuits PCB it is possible to make metallic tracks, and in particular, the connection terminals, extending both horizontally at the surface of the respective layer, and perpendicular to the surface of the layer, according to the specific needs. Moreover, the reaction path in the reaction chamber is particularly effective, and indeed the presence of the trapping seats made in the microchannel fix the particles of catalyst avoiding them being transported by the fuel solution, thus improving the control of the hydrogen gas as produced.

Furthermore, the microreactor makes it possible to improve the efficiency of a known microreactor, and indeed, such trapping seats make it possible to increase the production of hydrogen gas by exploiting to the maximum the reaction power of the particles of catalyst, which, suitably fixed to such trapping seats, are hit by the fuel solution along their longer side. Furthermore, the advantages of using an aqueous Sodium borohydride (NaBH4) solution as fuel solution are totally clear. In particular: the advantages include wide availability of the starting material, easy to prepare and equally easy to manipulate; high yield of the catalytic reaction in the microreactor, the completion of which does not involve danger and does not typically require special and difficult controls or adjustment interventions; production of hydrogen at room temperature and atmospheric pressure and consequent possibility of supplying it as such as a product to the micro fuel cell; continuity of production of hydrogen; control of the production through simple adjustment of the flow rate of the supply of aqueous Sodium borohydride (NaBH4) solution to the microreactor and through variations of the residency time in contact with the catalyst and appropriate variations in the amount of catalyst used; and obtaining a by-product, sodium metaborate (NaBO2), which is non-toxic, easy to manipulate, soluble in water and possibly able to be used to obtain Sodium borohydride (NaBH4).

Advantageously, moreover, the semipermeable membrane covering the reaction chamber allows the correct operation of the microreactor in whatever position and orientation, not allowing an undesired leakage of the Sodium borohydride (NaBH4) fuel solution. In conclusion, the microreactor 2 of the device 10 for producing energy carries out the continuous production of hydrogen through reaction of a Sodium borohydride (NaBH4) solution, such production of hydrogen advantageously taking place at room temperature and atmospheric pressure thanks to the use of a suitable catalyst.

Moreover, the proposed device for producing energy addresses the problems highlighted in relation to the prior art and also has the following advantages: the electrochemical catalytic reaction that controls the production of hydrogen can be controlled through the amount of catalyst housed in the respective trapping seats; the microreactor does not need energy to produce hydrogen, operating at room temperature and atmospheric pressure and producing hydrogen on demand; the microreactor and all of its components can be reduced in size, allowing a portable energy source to be made; the catalytic reaction of an aqueous Sodium borohydride (NaBH4) solution is a more cost-effective method for producing hydrogen than the methods used in the prior art, and does not produce acid compounds or caustic vapours as occurs in other production systems, for example using solutions comprising Ca/water and Zn/acid; hydrogen may be the only gas produced and therefore there is neither the consumption, degradation nor so-called "poisoning" of the catalyst, carried out, for example, by reactions that produce carbon dioxide (CO2) like in the case of systems supplied with methanol; if the system is heated, the water vapours produced by the electrochemical reaction carried out in it mix with the hydrogen produced, which is highly desirable for a micro fuel cell system since the water vapours, wetting the flow of hydrogen, improve the performance of the membrane (because of a decrease in the internal resistance); and the reaction speed is constant, and thus, makes it possible to have hydrogen produced stably for a period of time. The system can be advantageously and efficiently used as an energy source in portable electronic devices.

Second Embodiment

Now, with particular reference to the embodiments of FIGS. 12 to 27, a second embodiment is described for which we will use the same reference numerals to indicate details or cooperating parts having the same structure and operation as the previous embodiment. This embodiment relates to the manufacture of micro fuel cells made with PCB technology and a control and conditioning system of the electric power integrated on the substrate that houses the electrodes of the micro fuel cells. In accordance with what has already been described previously, the present embodiment uses PCB technology, at low cost, to make the electrodes, the package and the electronic circuitry for conditioning and controlling the power produced by the micro cell. On the other hand, with regard to the problems connected to the need to supply hydrogen, and therefore to store it to make the portable system, involving the aspects of safety of the application, different systems for producing hydrogen "on demand" are currently being studied, accumulating it in stable chemical hydrides.

PCB technology, on the other hand, is widely developed and mature, it is used to manufacture printed circuits, and has a low cost. The materials with which the boards with the printed circuits are manufactured are mainly FR4 and CEM1, fully described hereafter. The machining of these materials according to PCB technology makes it possible to make complex three-dimensional electric paths, buried channels and metalized blind and/or through holes.

Figure 12:
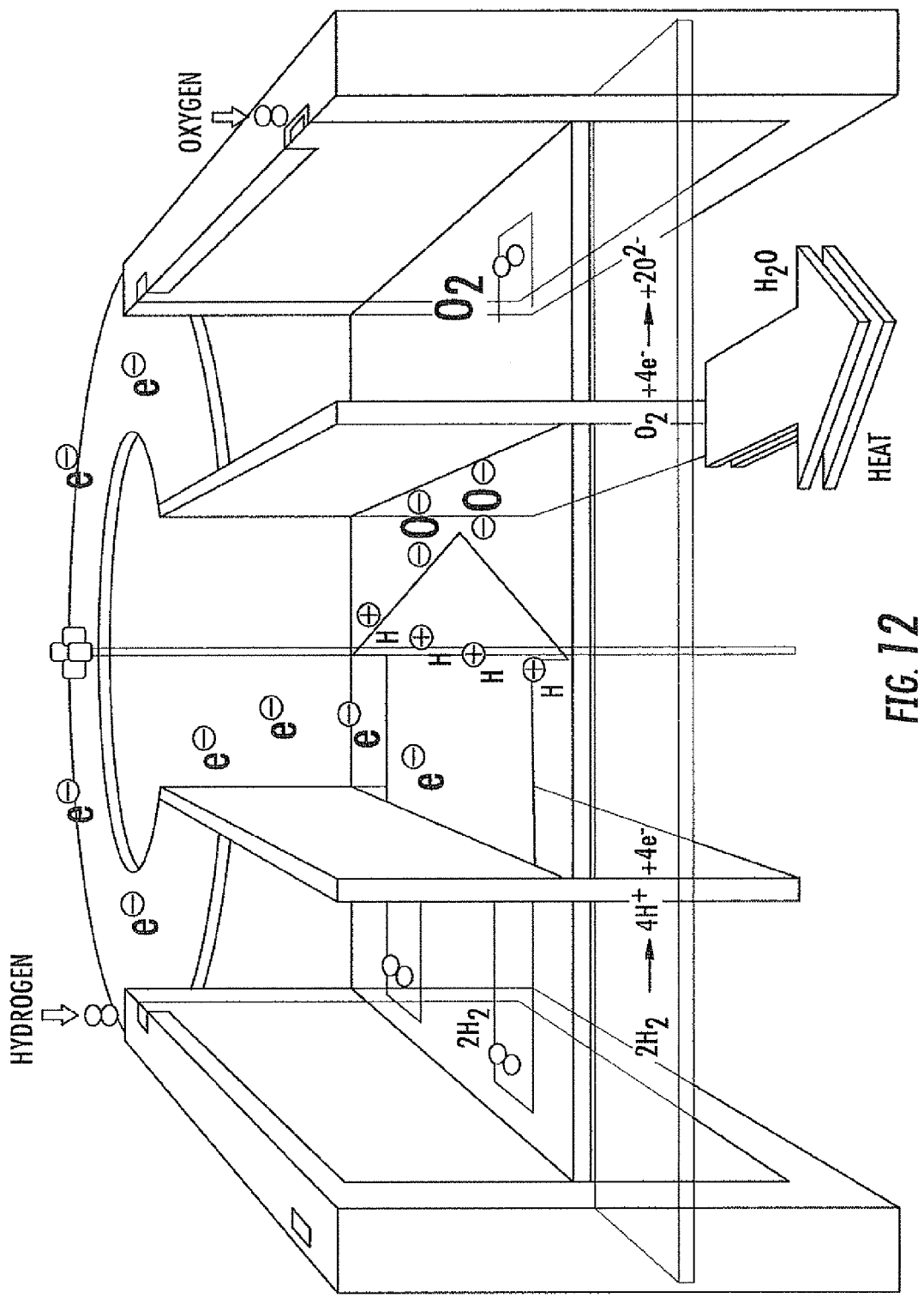
FIG. 12 shows a schematic view of the operation of a fuel cell.

However, the unconventional use of PCB technology to make the system of the present embodiments fall within the field of integrated microfluidic systems and of "system on package" devices. The present embodiments provide for the use of PCB technology to make micro PEMFC and opens up a new scenario in the search for solutions for supplying power to portable electronic systems based upon micro fuel cells. An outline diagram of the operation of a PEMFC cell is illustrated in FIG. 12. The use of such PCB technology makes it possible to make electrodes and channels for the outflow of the gases in monolithic systems made up of many layers. PCB technology makes it possible to integrate the control circuitry of the devices directly on the electrodes and to manufacture prototypes at low cost in substantially shorter time periods than conventional technologies.

Let us firstly see how a miniaturized portable system for producing energy, in other words a micro-fuel-cell, can be made. For this purpose it may be desirable to provide for making an integrated control and conditioning system. Such a system can be implemented with the PCB technology commonly used to make printed circuits. As seen earlier, fuel cells supplied with $H_2$ have an increased efficiency (theoretically about 80%) and allow power to be produced in direct current at the same time as the supply of the reactants. By interrupting the supply of reactants the electric power produced is interrupted, and it starts up again as soon as the chemical redox reaction of $H_2$ and $O_2$ is reactivated. The reaction by-products in addition to electric energy, are heat and water, thus making such systems very attractive from the point of view of the low environmental impact and sustainable development.

The oxygen for the completion of the reaction is drawn naturally from atmospheric air (air breathing). The series connection of two or more micro fuel cells makes it possible to raise the voltage at which the direct current is produced, whereas the parallel connection of two or more micro fuel cells makes it possible to raise the current produced. The selection of the type of connection derives from the needs dictated by use of the power desired by the final application. The methodology of connection of the micro fuel cells does not constitute a limiting factor for the purposes of the manufacture of the entire system in PCB technology.

The maturity of the PCB technology also makes it possible to integrate the electronic circuits for controlling and conditioning the power on the same electrodes as the micro cells, thus, making a compact and efficient system, in which the electrodes of the micro cells are electrically connected to the discreet components of the electronic circuitry through metallic tracks made from copper. The system including the micro cells and the integrated electronic circuits also does not typically need special packages for including the electrodes, and for interfacing the micro cells with the outside for the introduction of the reactants and for the extraction of electric power, thus, simplifying the assembly operations and reducing the overall costs of the system.

To make miniaturized micro cells suitable MEA can be used that are commercially available, today at very competitive prices. The multilayer structure includes the micro fuel cells, and the electronic circuitry is made monolithic by hot pressing the various basic layers of the system and making them fixedly connected through the use of gluing resins. The boards for the PCBs are made using vetronite or epoxy glass based materials, also known as Fiberglass. Vetronite is a very strong and insulating material used to create printed circuits on which discreet electronic components may be mounted. Vetronite is made from various layers of fiberglass fabric that are laid over one another, impregnated with a suitable resin and laminated in the final form. The final physical properties of vetronite depend upon those of the resin as used. The fundamental characteristics of vertronite based materials are the following: high resistance to mechanical stresses; dimensional stability over time; and good resistance to heat shocks lasting a short time.

Printed circuits are also called copper-plated boards because they are coated on one side or on both sides with a uniform layer of a few microns of copper (usually 35 µm). Amongst vetronite based materials there are Flame Retardant type 4 (FR4) and Composite Epoxy Material type 1 (CEM1).

FR4 material is a laminate including glass fabric and polymerised brominated epoxy resin, with or without one or two electrodeposited outer sheets of copper. The glass fabric is of type "E" and the epoxy resin used is brominated and formulated on Tetrabromobisphenol A (TBBA). The sheet of copper is electrodeposited on one or both of the sides of the laminate. The glass transition temperature of FR4 is about 130° C.

CEM1 material is a laminate including glass fabric, epoxy resin and sheets of cellulose that act as reinforcers of the material. The sheet of cellulose is arranged between two sheets of vetronite sandwiched together and the whole thing is hot pressed. The maximum working temperature of CEM1 is around 130° C.

Figure 13A:
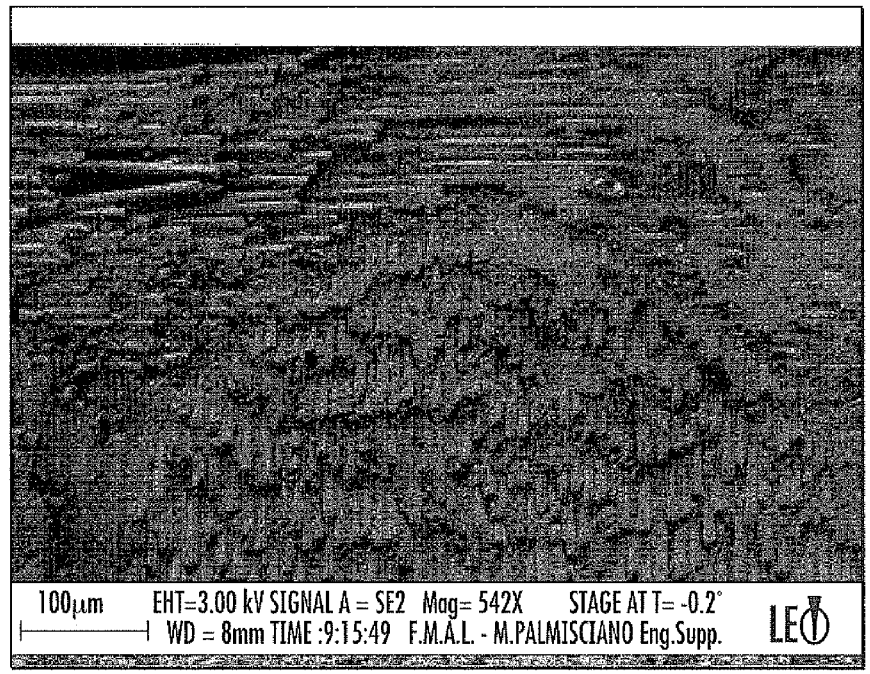
FIGS. 13A and 13B respectively show scanning electron microscope (SEN) images of an FR4 material photographed in plan from the oxide side and from the side of the layer of Cu.
Figure 13B:
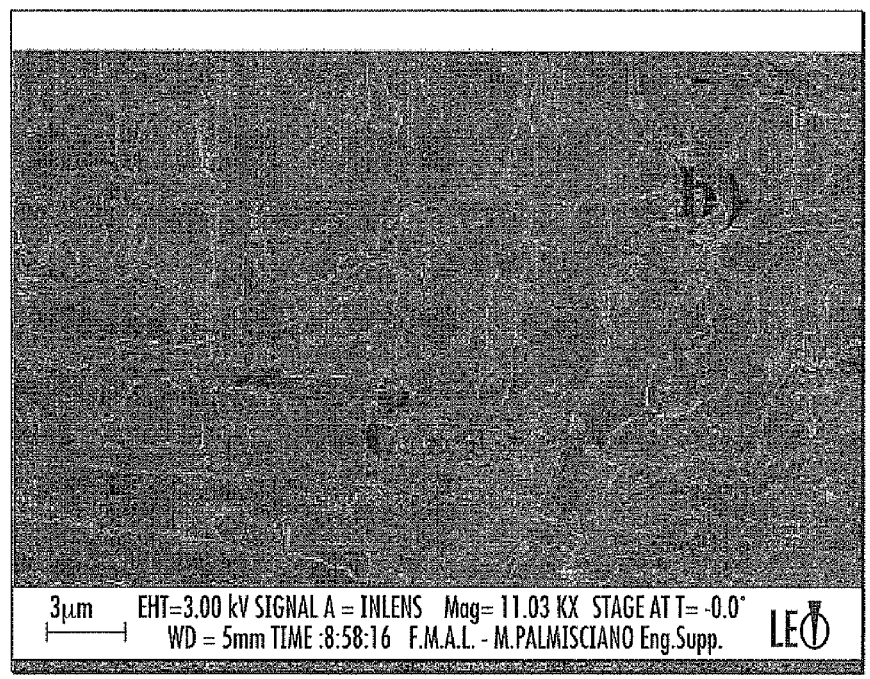
Figure 14A:
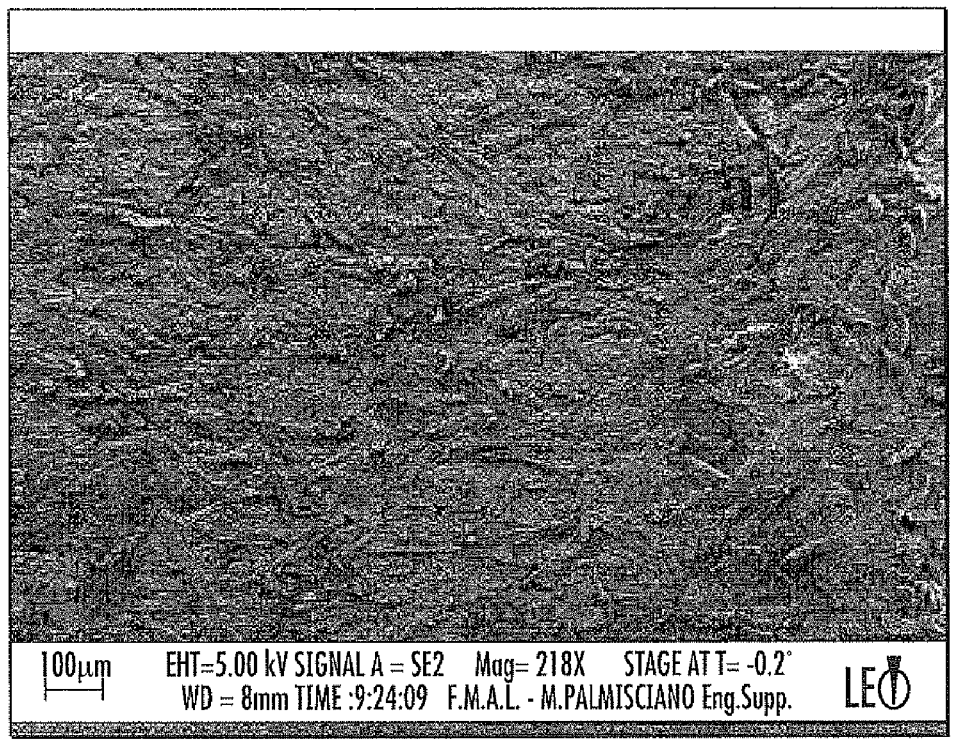
FIGS. 14A and 14B respectively show SEM images of a CEM1 material photographed in plan from the oxide side and from the side of the layer of Cu.
Figure 14B:
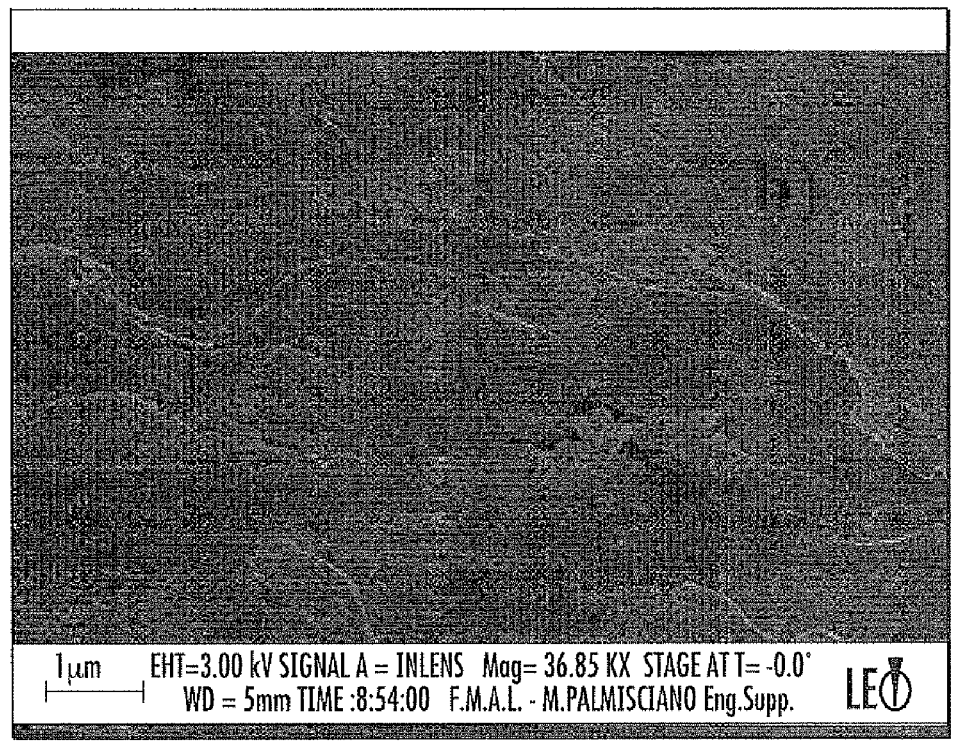

FIG. 13 shows the scanning electronic microscope (SEM) images in plan relative to the FR4 material with a monolayer of copper, on the vetronite side (FIG. 13a) and on the copper surface side (FIG. 13b). FIG. 14 shows the SEM images in plan relative to the CEM1 material with a monolayer of copper, on the vetronite side (FIG. 14a) and on the copper surface side (FIG. 14b).

Figure 15:
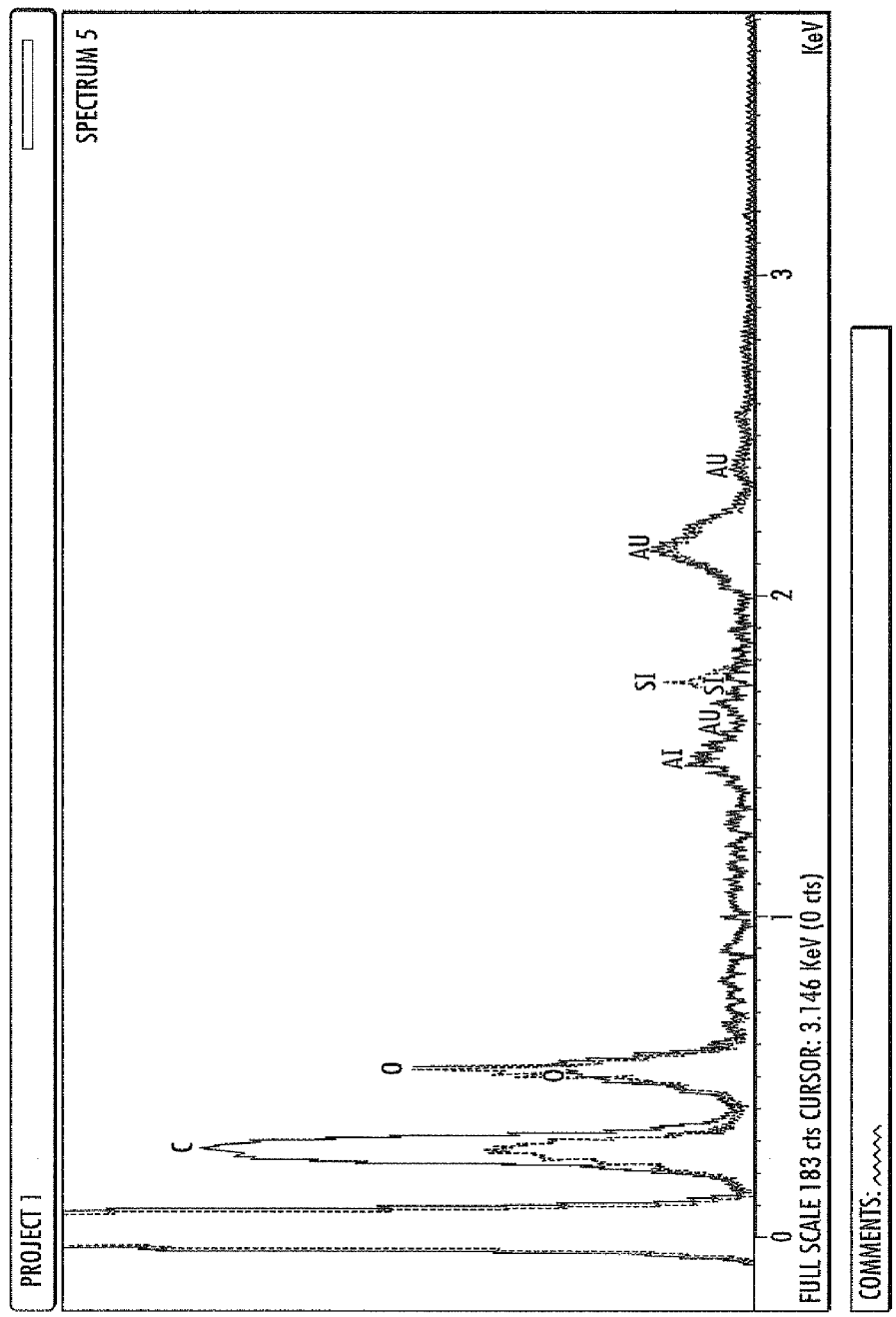
FIG. 15 shows a schematic view of an EDX spectrographic analysis for comparing the CEM1 (spectrum 5) and FR4 (spectrum 4) materials.

To evaluate the basic composition of the CEM1 and FR4 materials, an EDX comparative analysis has been carried out, illustrated in FIG. 15. From the analysis, it can be seen that the elements present are carbon, oxygen and silicon. The elements are in roughly equal proportions apart from carbon, which is more abundant in CEM1 due to the addition of cellulose between the vetronite fibres.

The micro cell system 30 includes, as a whole, the following components: two or more micro fuel cells 31, 32 electrically connected together; two or more MEA membranes 33, 34; microfluidic channels 35 with three-dimensional extension for supplying hydrogen to the anode of the micro cells 31, 32; three-dimensional metallizations 36 for the electric connection of the micro fuel cells and for sending the electric signal to an electronic management system; and an electronic circuit for managing and controlling the electric power as produced.

Figure 16:
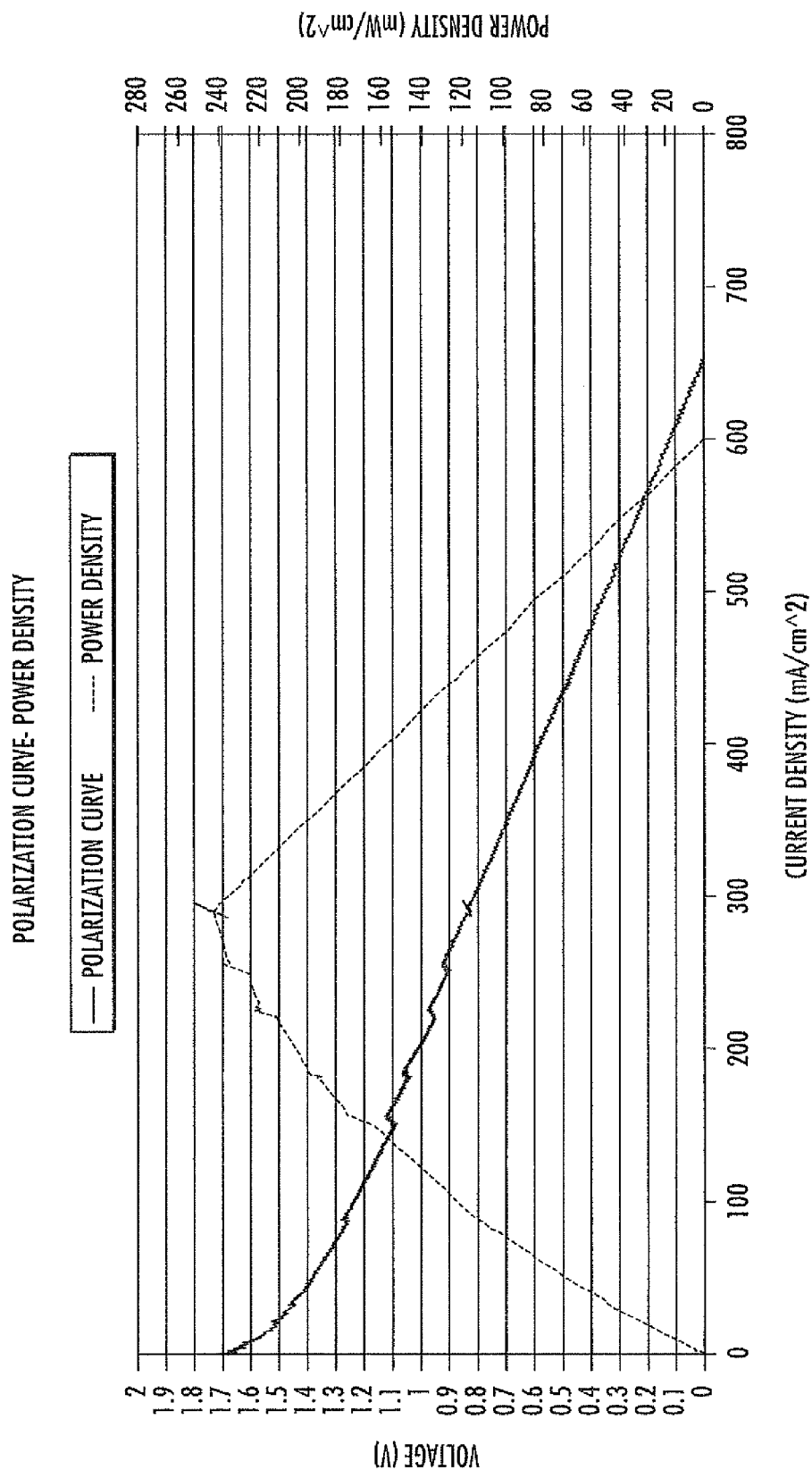
FIG. 16 shows a voltage-current diagram displaying polarization and power density curves of two micro cells connected in series with each other.

A micro fuel cell 31, 32 produces electric energy in direct current (DC), proportionally to the active area of the electrolyte present in the MEA membrane and according to the amount of reactants introduced at the anode and at the cathode. The redox reaction for the production of energy is the following:

at the anode: $H_2 \rightarrow 2H^+ + 2e^-$
at the cathode: $\frac{1}{2}O_2 + 2H^+ + 2e^- \rightarrow H_2O$
overall: $H_2 + \frac{1}{2}O_2 \rightarrow H_2O$ The produced electric energy can be voltage and current modulated according to the electric load applied to the system. For example, FIG. 16 shows a polarization and typical power curve of a series electric connection of micro fuel cells supplied with hydrogen. A biasing curve includes the acquisition of the voltage and current values produced by the micro cells as the electrical load as applied varies.

The power density curve is given by the product of the values of the voltage (V) and current density (I). The selection of the point of operation depends upon the electrical charge applied to the system 30 for the production of electric energy. The electric power supplied by the micro fuel cells does not necessarily adapt to the power desired by a user. Accordingly, it may be desirable to include a conditioning circuit to adapt the produced power to the user's demands. The assembly includes the conditioning circuit of the electric power and the final load influence the choice of the series and/or parallel modes of connection between the micro fuel cells.

The supply of hydrogen to the micro fuel cells, is carried out through microchannels 37 made in the individual layers that, when laid over one another, create the monolithic system object of the present embodiments.

PCB technology allows working of the individual layers by suitably designing machining to be carried out and by piling up the individual machined layers in sequence the desired geometries both of the channels for the outflow of the gas (hydrogen) and of the metallizations are formed.

The cathode of the micro fuel cells is in contact with atmospheric air from which it takes the oxygen to complete the reaction, by slits 38 with metalized vertical walls made through mechanical machining as described hereafter. From the manufacturing point of view, it is possible to distinguish two steps, a mechanical and fluidodynamic manufacture of the micro cells and an electric manufacture of the metallizations and of the electronic control circuit. The mechanical manufacture of the system for the portable production of electric power provides both for making flow channels for the distribution of the reactants to the active layer, and the manufacture of current collectors (electrodes) to extract the produced electric power.

Figure 17:
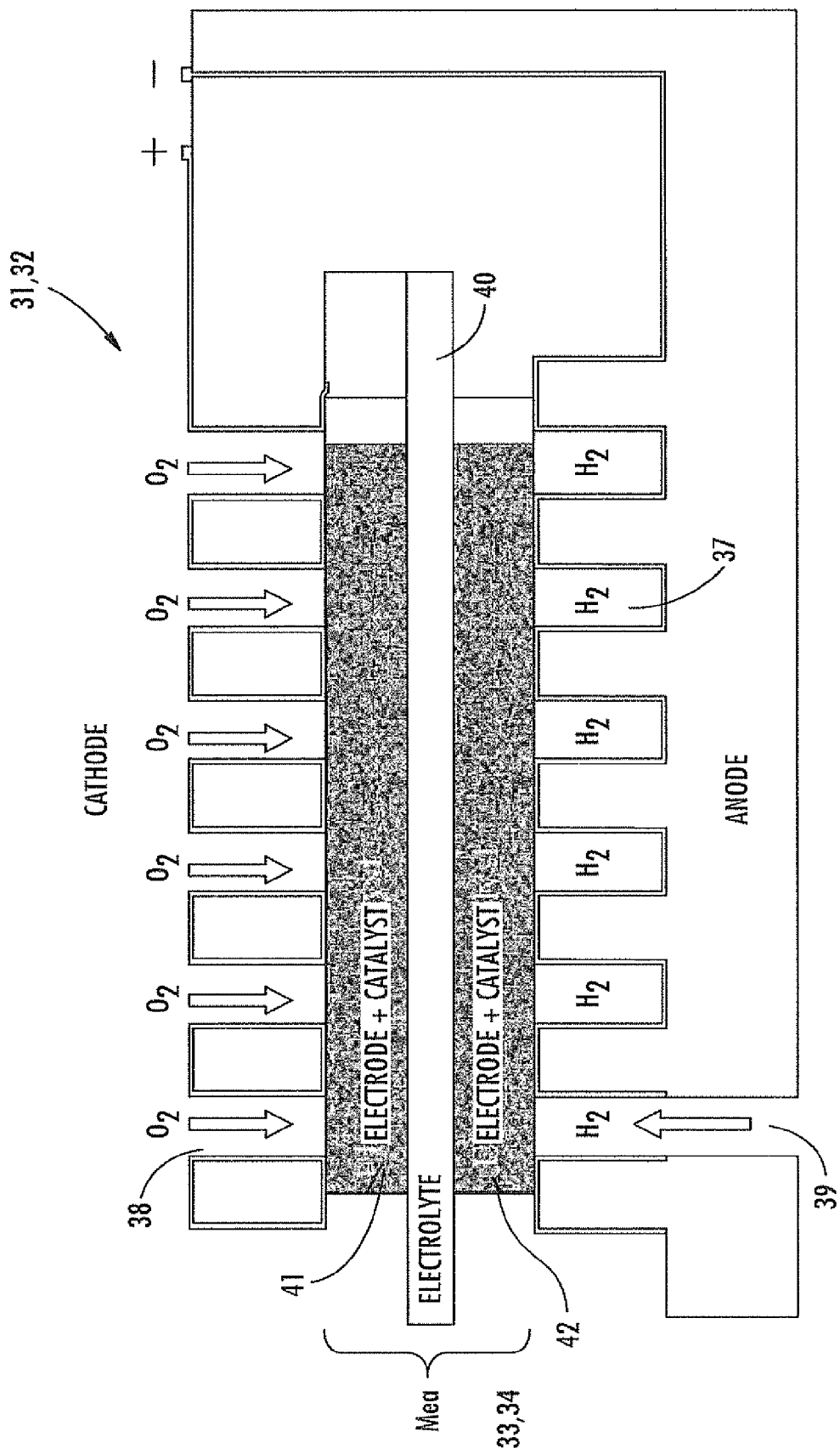
FIG. 17 shows a schematic section view on a vertical plane of the MEA membrane and of the corresponding current collectors.

As illustrated in FIG. 17, the proton exchange membranes 33 or 34 used in the system 30 includes a polymer electrolyte 40 for the proton exchange, for example, Nafion 112 arranged between two layers 41, 42 of conductive carbon fibers (electrodes) in which the platinum catalyst is dispersed. The diffusion layers are located outside of the electrodes, and have the task of distributing the gases over the entire surface of the electrolyte Gas Diffusion Layer (GDL). More particularly, it is the assembly of the membrane and electrodes that takes the name Membrane electrode assembly (MEA) and that forms the core of each micro fuel cell 31 or 32. The electrons that are freed at the electrodes of the MEA represent the current produced and are sent to the user for its operation.

The current collectors used in the present system, made with PCB technology, thus have a dual function: collecting the free electrons, and diffusing the reactants onto the electrodes of the MEA. For this reason, microchannels are made on a substrate FR4 alternating with projections that, as well as mechanically supporting the MEA, being metalized, allow the freed electrons to be sent towards the load, through the three-dimensional metallic tracks 36 and the electronic control system. FIG. 17 also shows a diagram of the channels 37 or 38 with metalized walls both of the current collector at the anode, and at the cathode.

Wherein more than one micro cell in series (for example N micro cells) are to be electrically connected to raise the produced voltage value, the cathode of the i-th micro cell may be electrically connected with the anode of the (i+1)th micro cell, and the total power may be extracted from the anode of the first cell and from the cathode of the n-th connected one. In order to fluidodynamically supply all of the micro cells of a series, buried horizontal channels 35 are made that communicate vertically with the anode of the various cells. The exhaust channel 38 of the i-th cell, in this case, communicates vertically with the buried horizontal micro channel 35 that acts to send the excess gas to the next micro cell (i+1). The exhaust of the last cell is closed, thus making a "dead end" system, in which the possible excess hydrogen does not come out from the last micro cell of the series.

Figure 18:
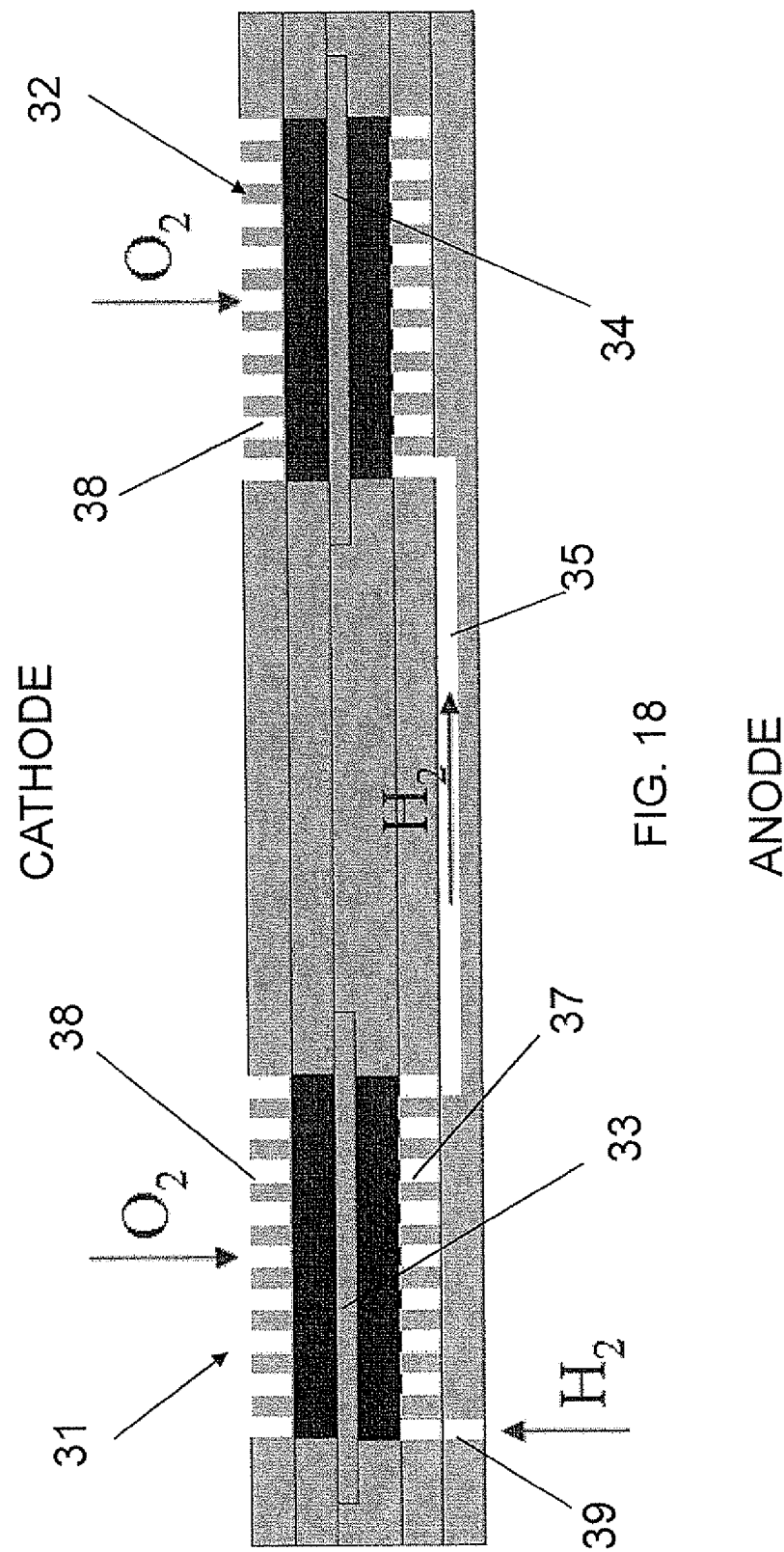
FIG. 18 shows a schematic vertical section view of a system with two micro fuel cells with serial fluidodynamic supply, according to the present invention.
Figure 19:
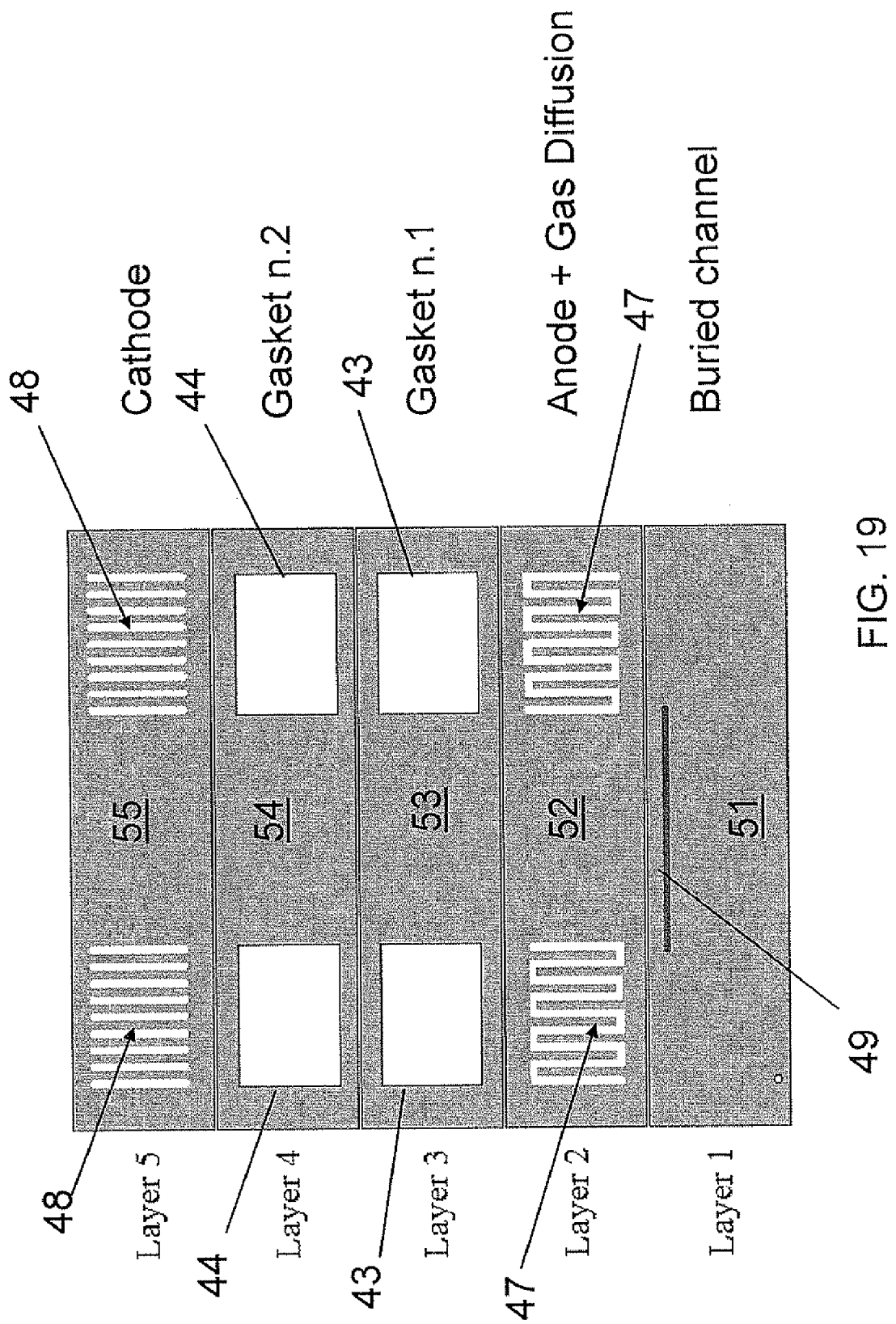
FIG. 19 shows the machining of the individual layers to make the system of FIG. 18.

The supply channels 37 of the hydrogen to the anode of the micro cells are made by cutting through slits on the layer that houses the MEA, and in this way a coil with horizontal extension is made that is crossed by the hydrogen in order to diffuse the fuel in the best possible way through the porous layer of the anodic electrode. The oxygen, on the other hand, is drawn naturally from atmospheric air via through slits 38 on the top layer that is thus "open" to the atmosphere, and the motion of the gas in this case is vertical. FIG. 18 illustrates an embodiment of a system consisting of two micro fuel cells supplied fluidodynamically in series through the aforementioned channels.

To make the aforementioned geometries, it may be desirable to individually make all of the layers or layer that are then laid on top of one another to create the monolithic system. Special care should be taken over the alignment of the through holes of the individual layers, in order to make vertical channels 37 for supplying hydrogen to the anode of the micro cells. In the example shown, it is foreseeable to separately machine at least five independent layers.

The first layer 51 of the system (bottom layer), has the purpose of introducing the hydrogen inside the system through a through hole 39 and of fluidodynamically connecting the two micro cells 31, 32 through a blind slit 49 that joins the outlet of the first cell with the inlet of the second one. The second layer 52 includes coils 47 of microchannels 37 that have the task of diffusing the hydrogen in the active layer of the MEA through the gas diffusion layer. The coils 47 are preferably made by through incisions by milling. The two coils 47 for supplying the gas to the active layer fluidodynamically communicate with each other through the blind slit made in the bottom layer 51. In such a configuration, therefore, the two micro cells 31, 32 are fluidodynamically supplied in series. The excess hydrogen from the first micro cell is used by the second one. The fluidodynamic connection microchannel of the two micro cells is limited on top by the second layer 52.

The surface portion of the second layer 52 that is located between the slits is metalized to make the electrical contact with the electrode of the MEA that houses above. The third layer 53 includes square holes 43 on perimeter edges of which the MEA is housed. The bottom surface of the MEA is thus in contact with the second layer 52 on which the channels 37 are made in a coil 47 to supply the gas.

The fourth layer 54 is made like the third layer 53, with through holes 44 that coincide with the holes 43 in the stack of layers 53 and 54, and has a similar function, in other words, electrically connecting the cathode of the MEA with the cathode of the system and fluidodynamically connecting the cathodes to supply oxygen for the completion of the reaction. The fifth layer 55 represents the cathode of the entire system, and it includes the through slits 38 obtained through respective coils 48 to supply oxygen to the MEA. This fifth layer 55 is also known as top layer.

Figure 20:
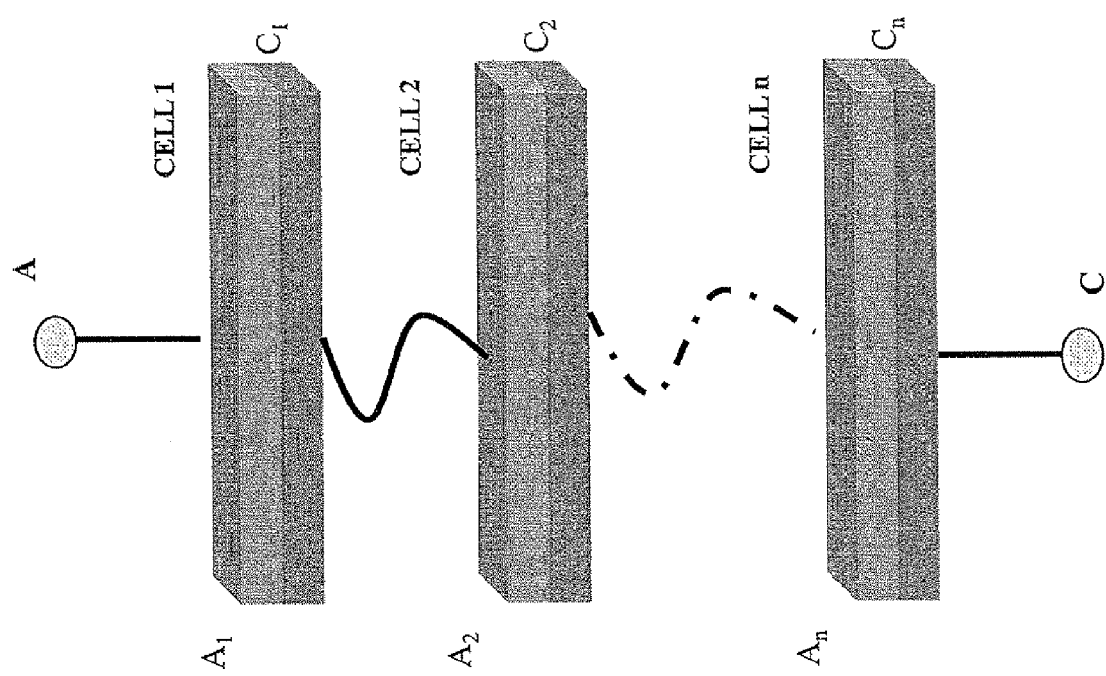
FIG. 20 shows a schematic perspective view of a serial connection between "N" fuel cells.
Figure 21:
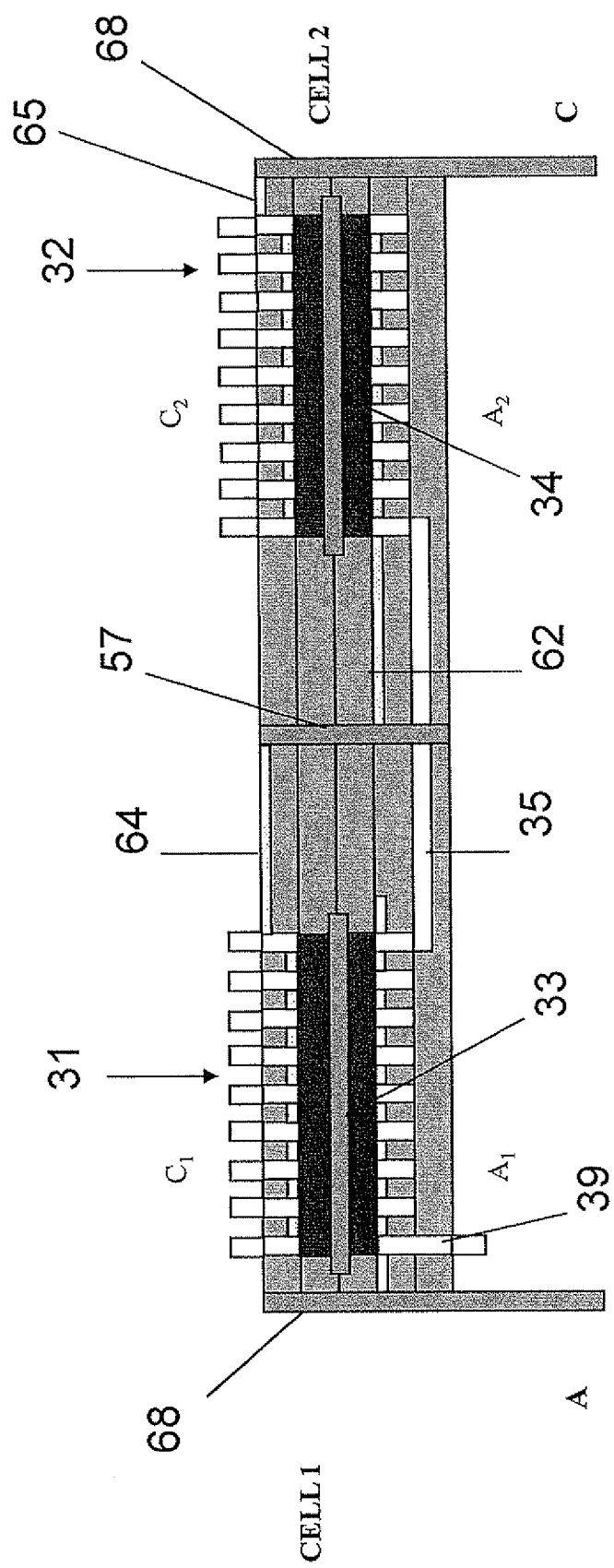
FIG. 21 shows a schematic view of a serial electric connection between two fuel cells.

The physical connection of the described layers is carried out through a process described hereafter and relating to the manufacture of the system, so as to make the system 30 monolithic. The fuel cells thus made should be connected together in order to obtain the power to electrically supply a load. As already stated earlier, in order to increase the overall voltage of the system, the fuel cells should be connected in series. This is formed by connecting the cathode of one fuel cell with the anode of another, obtaining an overall system that offers a single cathode and a single anode, as shown in FIG. 20. An example of serial connection between two fuel cells is shown in FIG. 21.

Similar to what has been outlined to make the fluid contacts, for the electrical contacts it is also desirable to distribute the metallic tracks over different layers to ensure the serial connection of the two fuel cells. The electrical contact between tracks made on different layers is ensured by through holes 58 (or vias) that should be aligned in the superposition of the layers that make up the system 30 to form the desired electrical continuity. From what has been outlined above, it is possible to operate on each layer to simultaneously make the fluid channels and the electric tracks.

Figure 22:
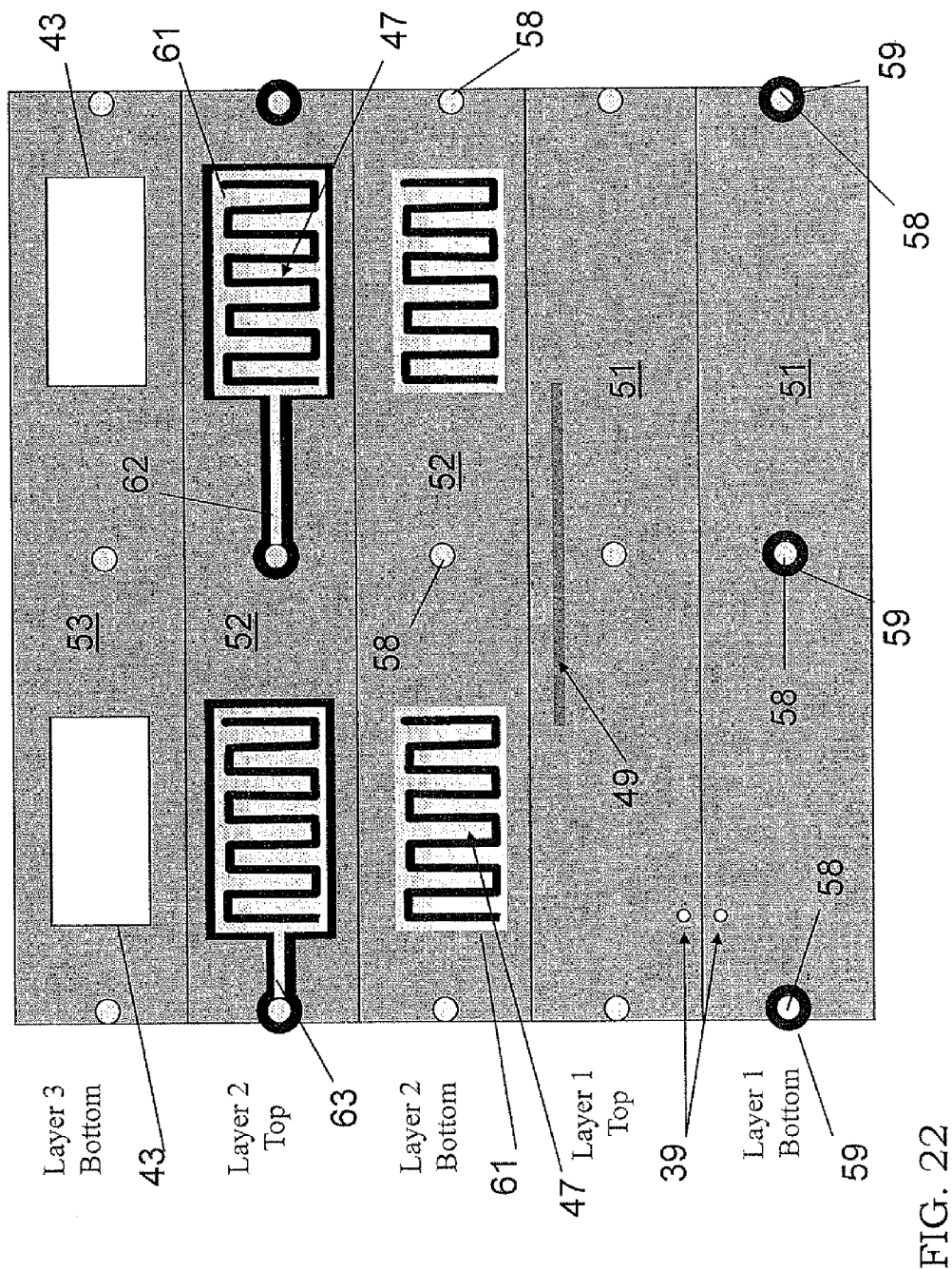
FIG. 22 shows a combined view from above and from below of three of the five layers that form the micro cell system as a whole.
Figure 23:
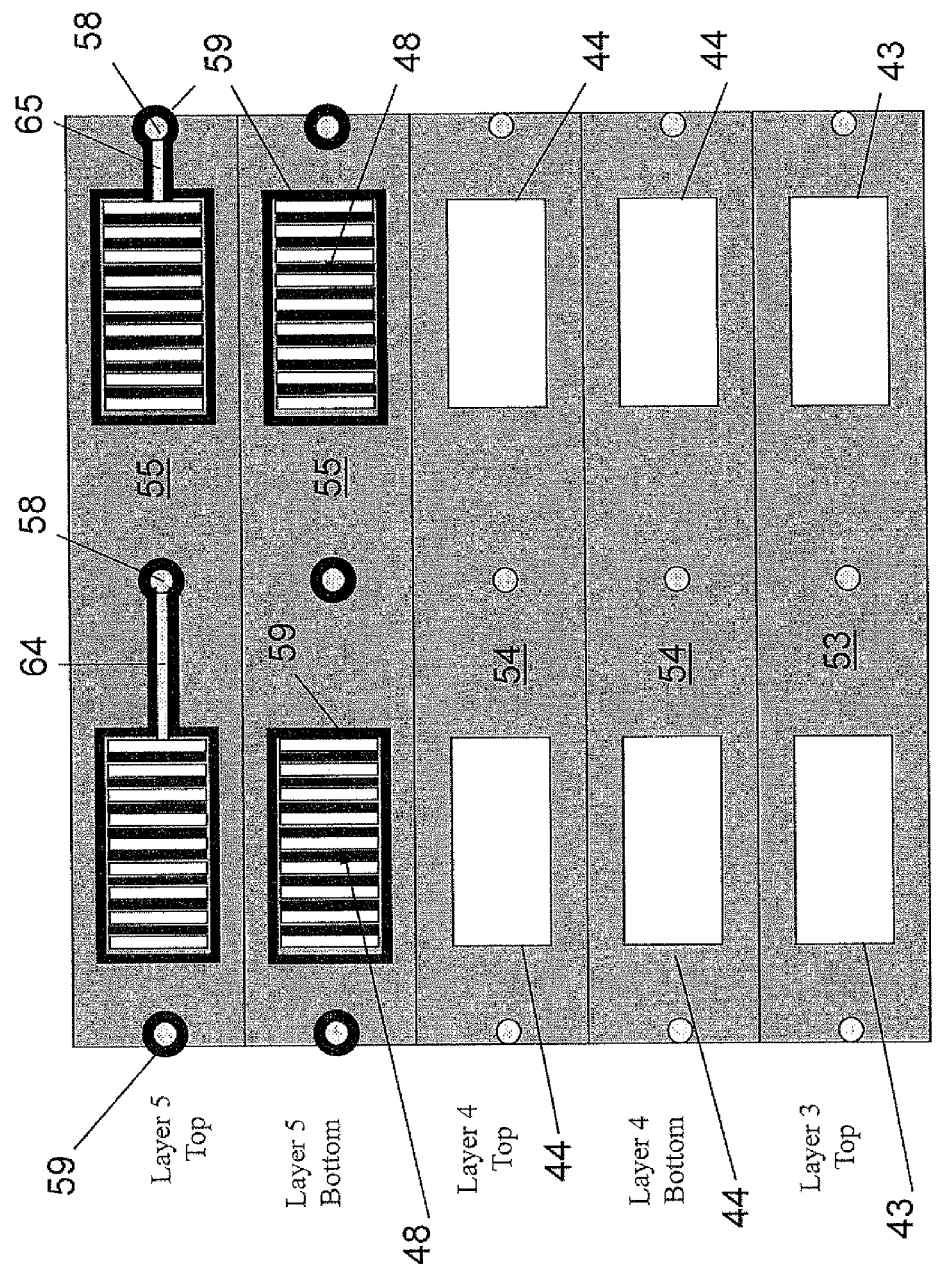
FIG. 23 shows a further combined view from above and from below three of the five layers that form the micro cell system as a whole.

FIGS. 22 and 23 show all five of the layers as used. The combination of the two figures makes it possible to see the bottom surface and the top surface of each of the five layers so as to be able to appreciate the final configuration of them. The first layer 51 is made using a single-face PCB, in the sense that just one side of the PCB is metalized. The metallization is not shown in the figures because it faces the bottom side of the layer given that the electronic circuit for conditioning and controlling the electric power is made in it. The vias 58 are thus electrically insulated from the bottom side through an insulating cover 59.

The second layer 52 is made using a single-face PCB. The metallization faces the top side of the first layer 51, since the metallic tracks for the electric connection are made on it. On the top of the second layer 52 there are therefore two metallic tracks 62, 63 and three vias 58.

The track 62 extending towards the vias 58 at the center of the second layer 52 represents a first connection portion between anode ($A_2$) and cathode ($C_1$) of the two micro fuel cells 31, 32. Such a track 52 ends in the central vias 58. This vias connects the track of the second layer 52 with the track of the fifth layer 55, as also shown in FIG. 21.

The central connection is made by making the vias of the various layers be crossed by a metallic element 57 (connection pin) that is welded with the vias of the layer 51, 52 and 55. A portion of track 63 connects the anode contact of the first cell 31 ($A_1$) and of the overall system 30 (A). This portion of track 63 ends with a peripheral vias 58. In the same way as the previous vias, the contact is made available to the outside through a connection foot that crosses all of the layers 51-55 and that also constitutes the anode pin of the overall system. The welding is carried out with the vias of the layer 51, 52 and 55. The electrical insulations 59 corresponding to the anodes of the two micro cells, of the metallic tracks and of the vias are provided.

The third layer 53 is made using a non-metalized PCB support, and it has just the vias 58 that connect the tracks of the second layer 52 with the fifth layer 55. The fourth layer 54 is made using a non-metalized PCB support, similar to the third layer 53, and this fourth layer has just the vias 58 for the passage of the connection pins 57, 68.

The fifth layer 55 is made using a double-faced PCB with a metallization that covers both the top, and the bottom. On the top of the layer the metallic tracks are made from the electric connection. On the top there are therefore two metallic tracks 64, 65 and three vias 58. The track 64 at the center of the layer constitutes the last portion of the electric connection between anode ($A_2$) and cathode ($C_1$) of the two micro fuel cells 31, 32. Such a track 64 is connected with that of the second layer 52 through a vias 58. The electric connection is formed by the introduction of a connection pin 57 that crosses the structure from part to part and that is welded with the vias of the layer 51, 52 and 55.

The other portion 65 of metallic track also ends in a vias 58, the latter being associated with the cathode of the structure and being crossed by a connection pin welded with the vias of the layer 51 and 55 to make the cathode contact. All three of the connection pins 57, 68, as well as to form the electrical contact, are also used for the alignment of the layers.

The first layer 51 has the metalized part present on the bottom. To avoid a short circuit between anode A and cathode C it is desirable to form the electrical insulation of the vias on the bottom side through the dielectric 59. It is also important to consider that the machining processes for making the electrical contacts of the electronic circuit are generally always developed on the bottom of the first layer 51.

Again on the bottom, the hole 39 for feeding fluid through hydrogen to the two micro cells is made. This hole 39 does not typically need electrical insulation. On the top of the first layer 51 a pit 49 is also made the function of which is to ensure the fluid connection between the cells. The second layer 52 has the metallization on the top. The coil-shaped incisions 47 inside which the hydrogen may flow are made on it. These incision pass straight through and are made from part to part of the layer. The metallic tracks 62, 63 and the vias 58 are made again on the top of the second layer. All of the vias 58, the tracks 62, 63 and the coil-shaped incisions 47, typically need electrical insulation 59. If the coil-shaped pits were not electrically insulated, the electric connection of the anodes of the two micro cells would automatically be made. No electrical insulating processing is generally needed on the bottom of the second layer 52.

The third and fourth layers 53 and 54 have no metallization. The holes 58 have to be made on these layers form the passage of the connection pins 57, 68, as do the two rectangular pits 43, 44 that act as housing for the MEAs.

The fifth layer 55 has the metallization on the top and bottom. The incisions from which the air may pass, i.e. the slits 38, are made on it, given that the micro fuel cells work in air breathing conditions. These incisions pass straight through and are made from part to part of the layer. The metallic tracks 64, 65 and the vias 58 are made again on the top of the layer. All of the vias 58, the tracks 64, 65 and the areas covered by the incisions generally require electrical insulation 59. If the pits were not electrically insulated, the electric connection of the cathodes of the two micro cells 31, 32 would be made automatically. The walls of the incision include electrical contacting so as to transfer the signal from the MEA to the top of the layer. On the bottom it is desirable to ensure the electrical insulation 59 of the areas of the incisions and of the vias.

Figure 24:
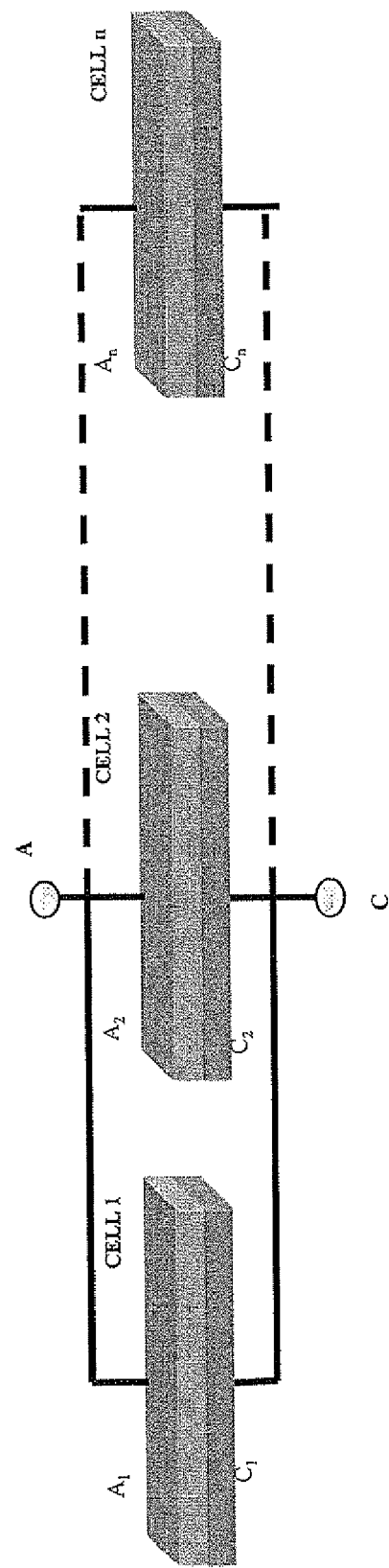
FIG. 24 shows a schematic view of an electric connection in parallel of "N" fuel cells.
Figure 25:
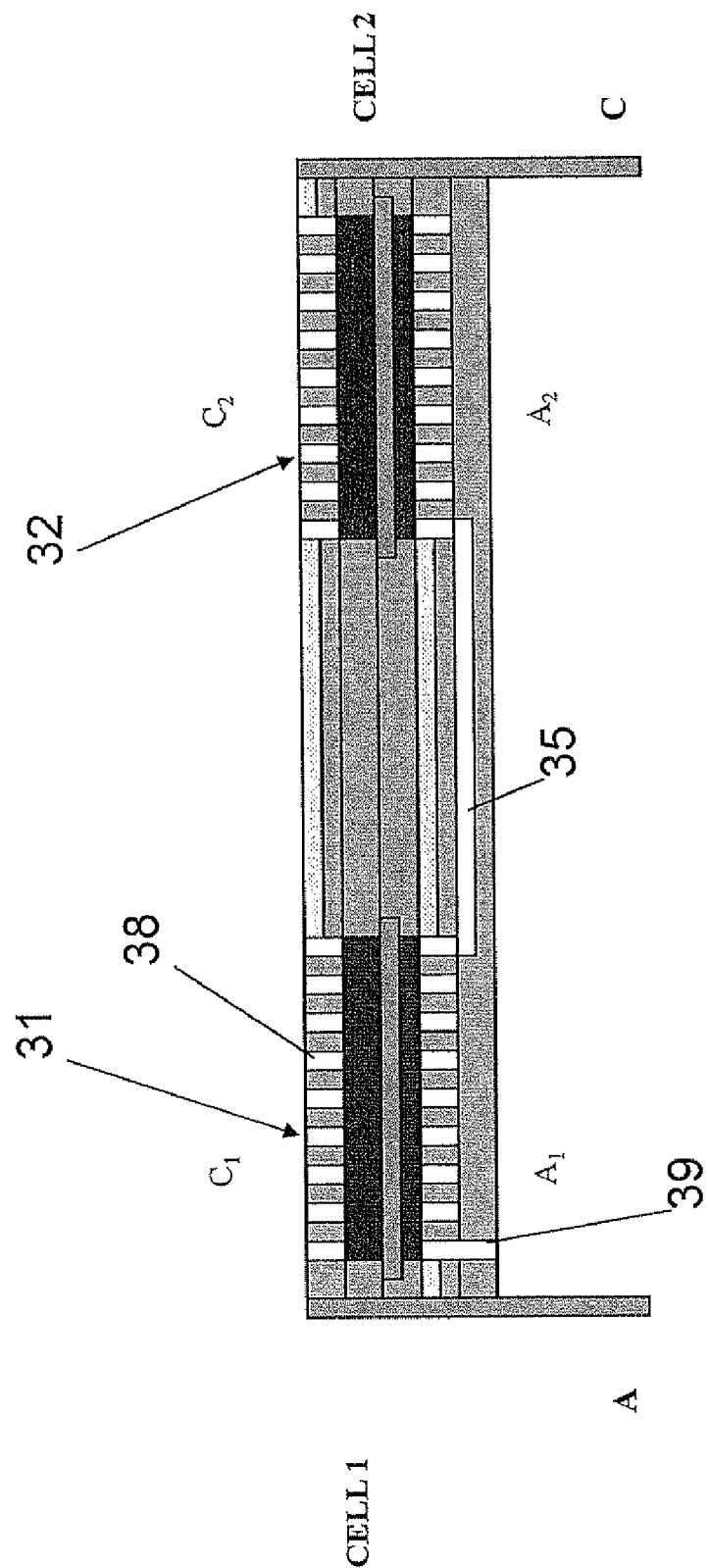
FIG. 25 shows a schematic view of an electric connection in parallel between two fuel cells.
Figure 26:
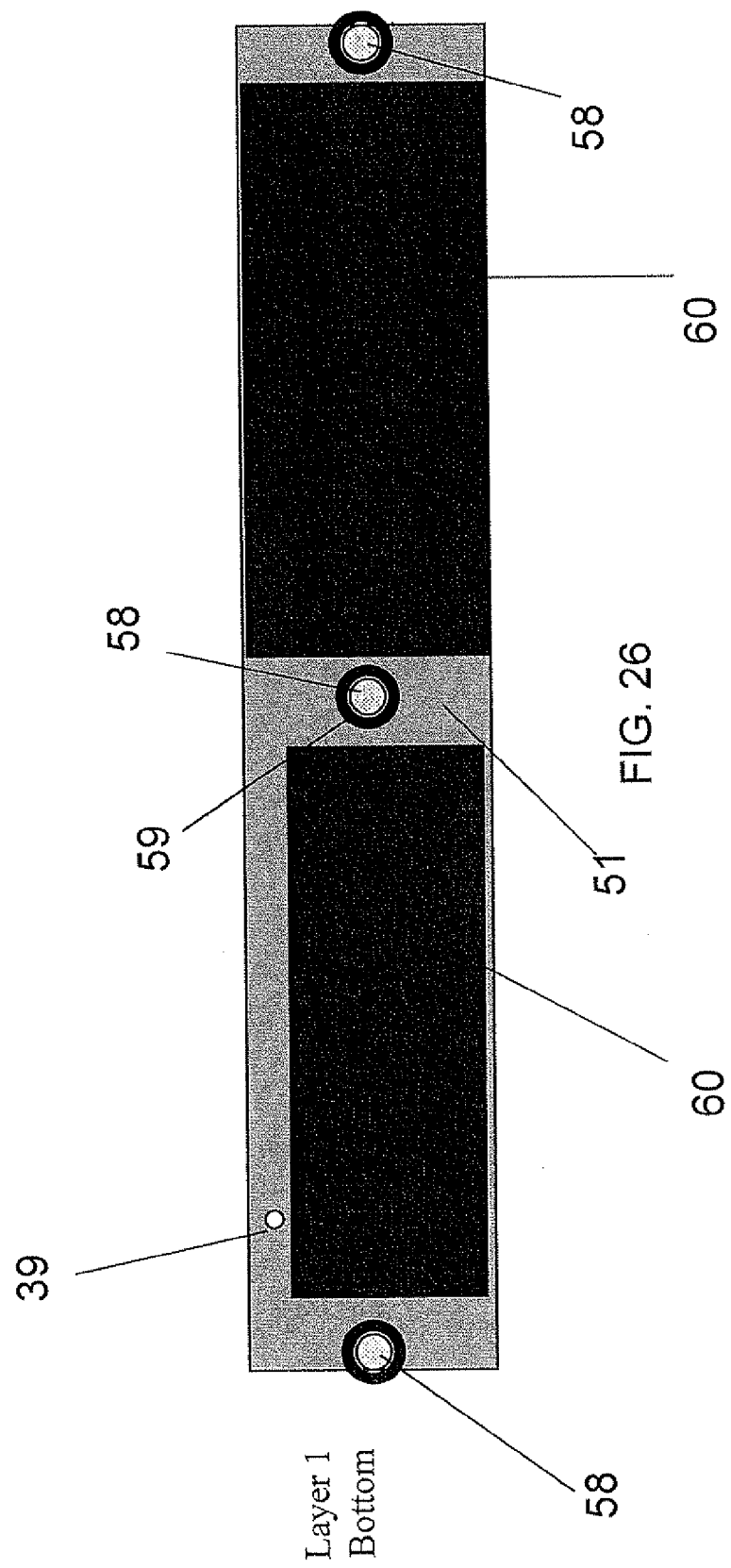
FIG. 26 shows a schematic view from below of the first layer of the micro cell system according to the invention with housing areas of conditioning and control electronic circuits according to the present invention.

To increase the overall current of the system, the fuel cells can be connected in parallel, as shown in FIG. 24. This is obtained by connecting the cathodes of the fuel cells together and thus the anodes. An example of parallel connection between two fuel cells 31, 32 is shown in FIG. 25. The electrical embodiment and the manufacturing process in the case of parallel electric connection can be extrapolated from what has been stated for the serial connection.

As stated earlier, a housing recess 60 is formed on the bottom surface of the first layer 51 for the introduction of an electronic circuit 65 that carries out the conditioning and control of the electric power. The areas intended for the electronic circuits are indicated with 60. Indeed, it is desirable to keep in mind that the power supplied by the micro fuel cell connected in series and/or in parallel may not be able to be immediately used for the final applications, but may need conditioning and control to suitably adapt it.

Figure 27:
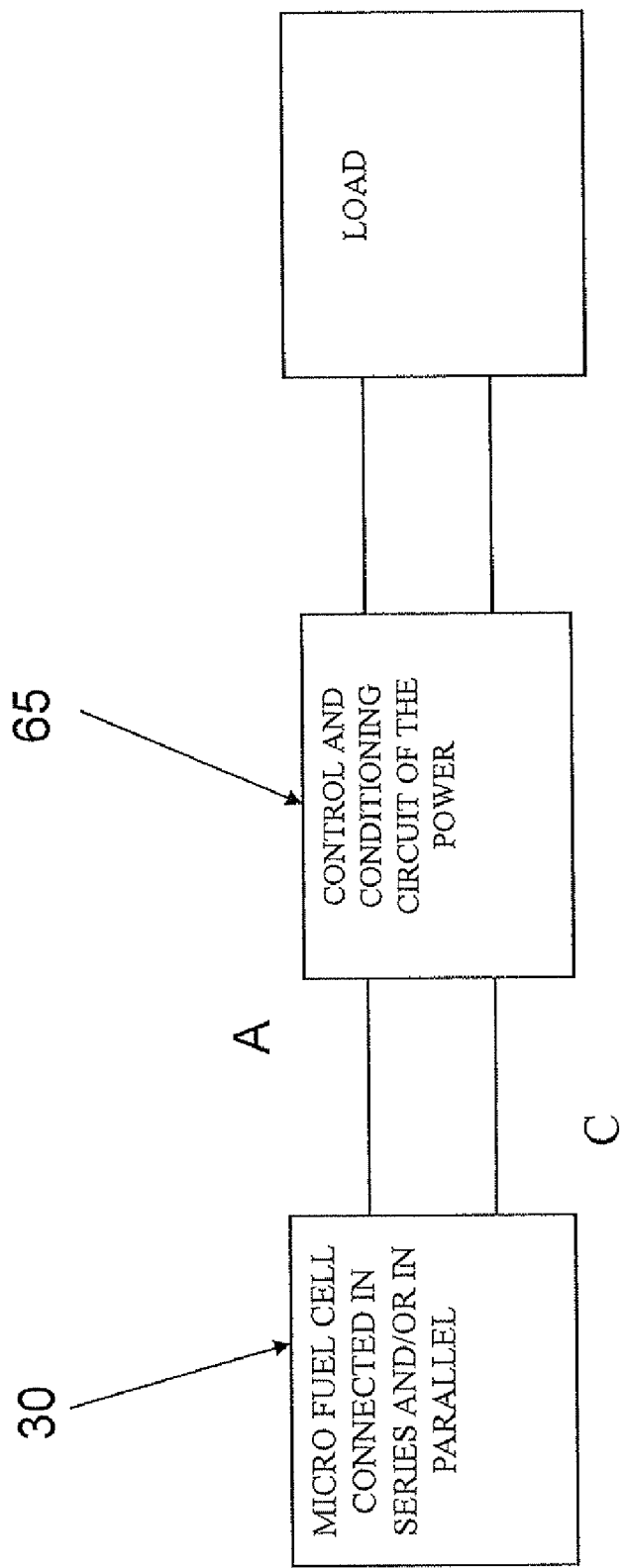
FIG. 27 is a schematic block diagram of a system according to the invention connected to a load and equipped with a corresponding conditioning and control circuit according to the present invention.
Figure 28:
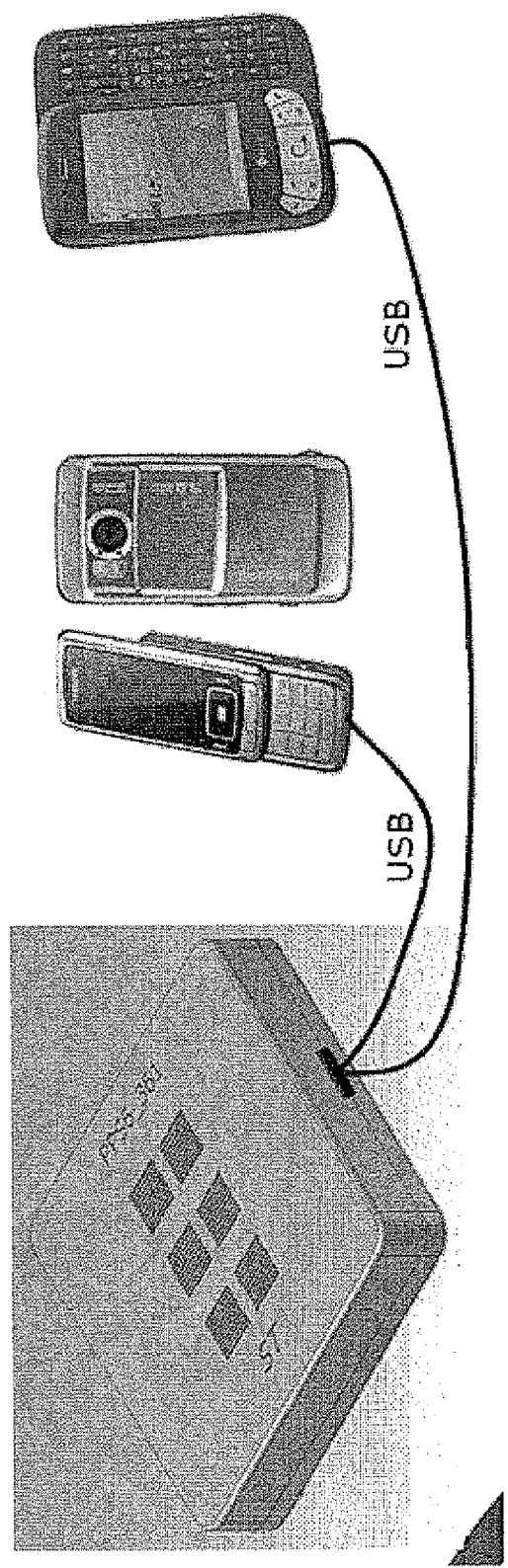
FIG. 28 shows a schematic view of a portable system (PPS) made according to the invention to supply power to portable electronic devices.

Having the possibility of introducing an electronic circuit 65 directly onto the housing of the micro fuel cell according to the "System on Package" principle is quite advantageous both in terms of space and of immediate availability of the system towards applications that need adequate powers. A block diagram containing the micro fuel cell and a control circuit is shown in FIG. 27.

In the case in which two micro fuel cells are used being connected in series, it is possible to use the vias available on the bottom of the layer 1 to use the micro fuel cells individually. By picking up the electric signal between the anode (A) and the vias, the cell 1 is used, whereas by picking up the signal between the vias and the cathode (C) the cell 2 is used. In this way it can also be considered to carry out a function test of the individual cells.

Third Embodiment

Now, with particular reference to the embodiments of FIGS. 28 to 46, a third embodiment is described for which we use the same reference numerals to indicate details or cooperating parts having the same structure and operation as the previous embodiment.

This embodiment also specifically relates to the making of a system of micro fuel cells including the electronic control and conditioning circuits of the power to be used as an energy source in portable electronic devices.

In line with what has already been described previously, the present embodiment uses the PCB technology, at low cost, to make the electrodes, the package and the electronic circuitry for conditioning and controlling the power produced by the micro cell.

With the maturity of PCB technology, it is also possible to integrate the electronic circuits for controlling and conditioning the power on the same electrodes as the micro cells, thus making a compact and efficient system, in which the electrodes of the micro cells are electrically connected to the discreet components of the electronic circuitry through metallic tracks made from copper. The system includes the micro cells, and the integrated electronic circuits also does not generally use special packages for including the electrodes and for interfacing the micro cells with the outside for the introduction of the reactants and for the extraction of electric power, thus simplifying the assembly operations and reducing the overall costs of the system. The described special features allow the micro fuel cells to be used as portable energy generators, for portable electronic systems such a mobile telephones, laptops, PDAs, etc. etc. An embodiment that implements the micro cell system as earlier described to supply portable electronic devices is now described.

For simplicity, hereafter we clarify this Portable Power Supply (PPS) system. A PPS system would be ideal for supplying power to portable applications such as mobile phones, digital video cameras, battery chargers, PDAs and Global Positioning System (GPS) units, MP3 players, video games consoles, computer notebooks and even remote sensors. Unlike normal batteries, fuel cells can produce electricity continuously as long as they are supplied with fuel, and they can be recharged instantly without having to connect to a main power socket.

The PPS system is made using PCB technology that allows prototypes to be made in short times periods, reducing the costs for the raw materials and ensuring a great flexibility of design. The PPS system includes a system of fuel cells for the production of electric energy, a reactor for the production of H2 from an NaBH4 solution, a tank for storing the solution and the reaction by-products and two piezoelectric micropumps for sending the solution from the tank to the reactor, and for emptying the reaction chamber of the by-products of the production of H2. All of the components of the PPS, apart from the micropumps and the Membrane Electrode Assembly (MEAs), are made by using the PCB technology and are assembled monolithically through a specially made hot assembly process.

More specifically, the PPS system includes a planar system of micro fuel cells made in PCB technology using polymer electrolyte, a reactor including the catalyst for the production of $H_2$ from an $NaBH_4$ solution with a high energy density (2500 Wh/l), and a tank for storing the $NaBH_4$ solution and the by-products of the production of $H_2$ that takes place inside the reactor. The system also includes two piezoelectric microfluidic units for sending the solution to the reaction chamber and expelling the by-products from it, after the production of $H_2$ is complete.

Figure 29:
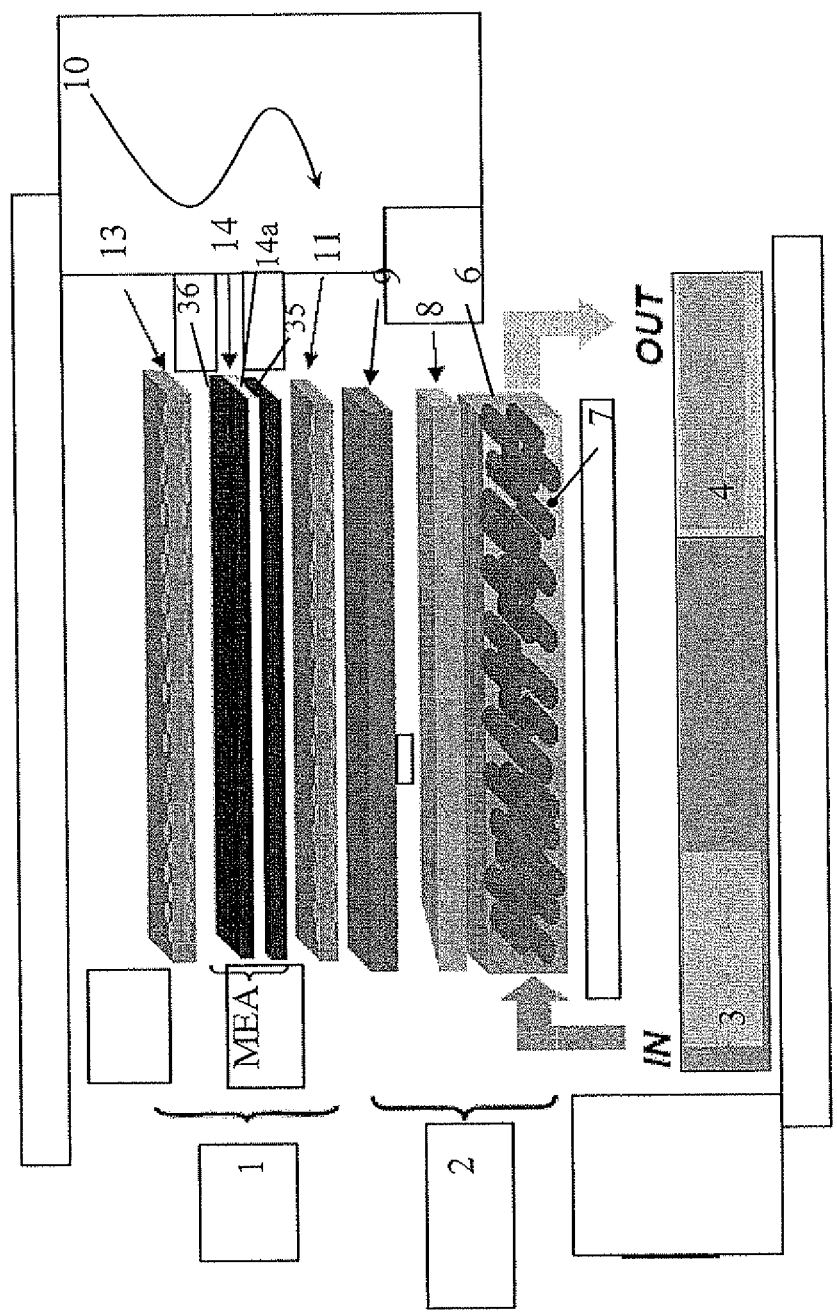
FIG. 29 is a schematic exploded view of a device for producing energy incorporated into the system PPS according to the present invention.

Use of the USB protocol makes it possible to supply power to all portable electronic devices that absorb power in the range between 0-3.5 W, and that use such a type of power supply protocol, as shown in FIG. 29. Like in the earlier described first embodiment, the PPS system provides for making at least one micro cell 1 associated with a microreactor 2 through superposition of layers of composite material, known for making printed circuits, preferably of FR4 or CEM1.

Such layers are separately micromachined with the PCB technology through precision mechanical micromachining, like for example numerical control milling, and suitable three-dimensional metallizations to obtain metalized through holes and buried channels. Advantageously, moreover, such layers are connected together in a single final pressure assembly step, with the interposition of an adhesive and/or of a silicon resin to make a single body with the micro fuel cell 1. The micro fuel cell 1 is obtained according to the present embodiments as described hereafter.

The device 10 for producing energy also includes a first tank 3 for storing a fuel solution and a second tank 4 for collecting the reaction by-products. The body of the microreactor 2 includes of a substrate 6, in particular a plate made from a composite material with a predetermined thickness and micromachined through numerical control milling to form a reaction chamber 7. In accordance with an embodiment, the reaction chamber 7 includes a catalyst that reacts with the fuel solution for producing hydrogen gas H2.

Moreover, the micro fuel cell 1 is advantageously made from a first layer 11 and from a second layer 13 with a membrane 14 of the MEA type arranged between. The membrane 14 advantageously comprises a central core 14A or Proton Exchange Membrane (PEM) and two electrodes, a bottom one 35 and a top one 36, in a monolithic configuration.

Basically, according to the present embodiment, the micro fuel cell 1 and the microreactor 2 are both formed from layers of composite material, preferably FR4 or else CEM1, having the same dimensions. Such layers are micromachined according to the PCB technology and connected together and with the layers defining the microreactor 2 through a single final pressure assembly step, with the interposition of an adhesive and/or of a silicon resin to make the device 10 in a single body.

Figure 30:
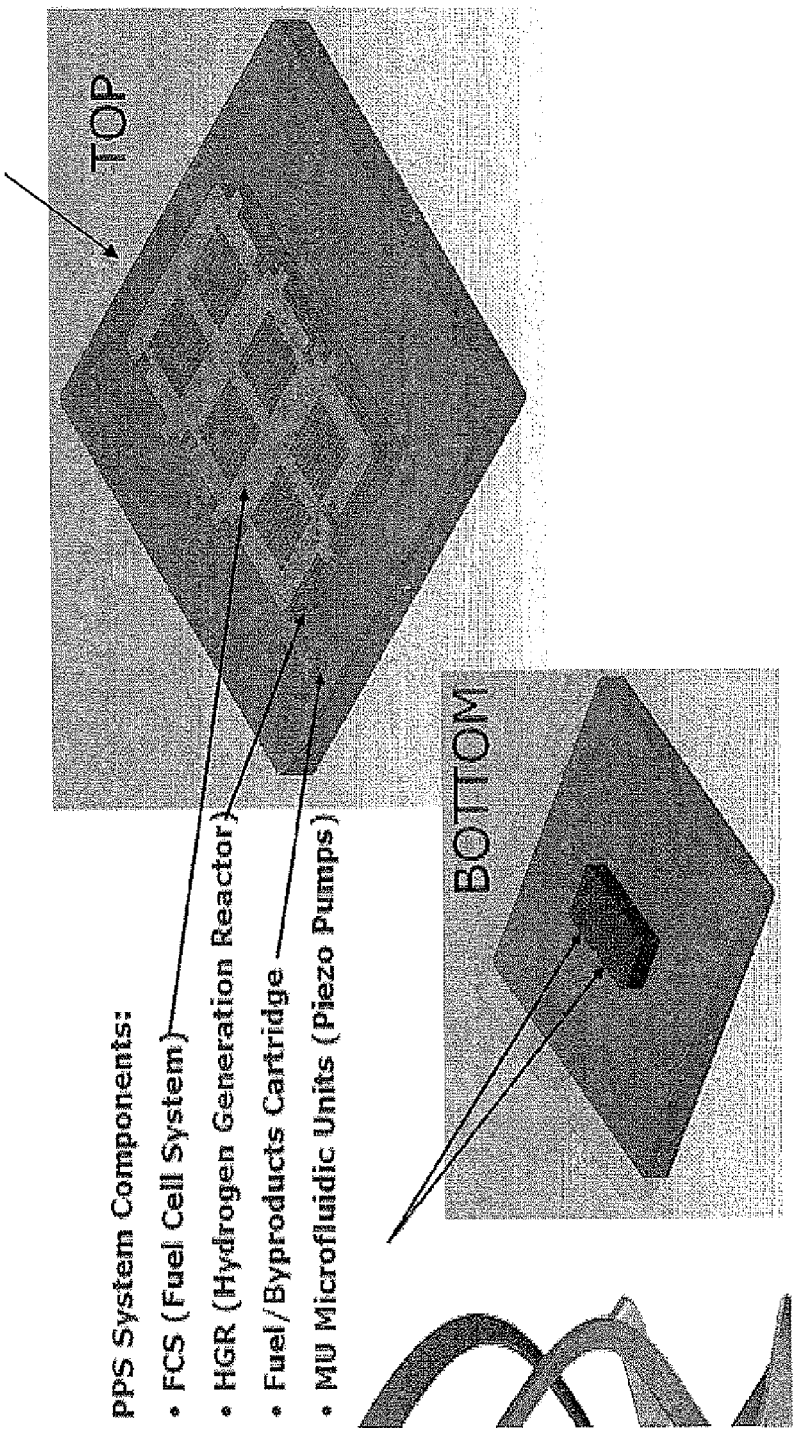
FIG. 30 shows a schematic view of a portable system (PPS) and of its components.
Figure 31:
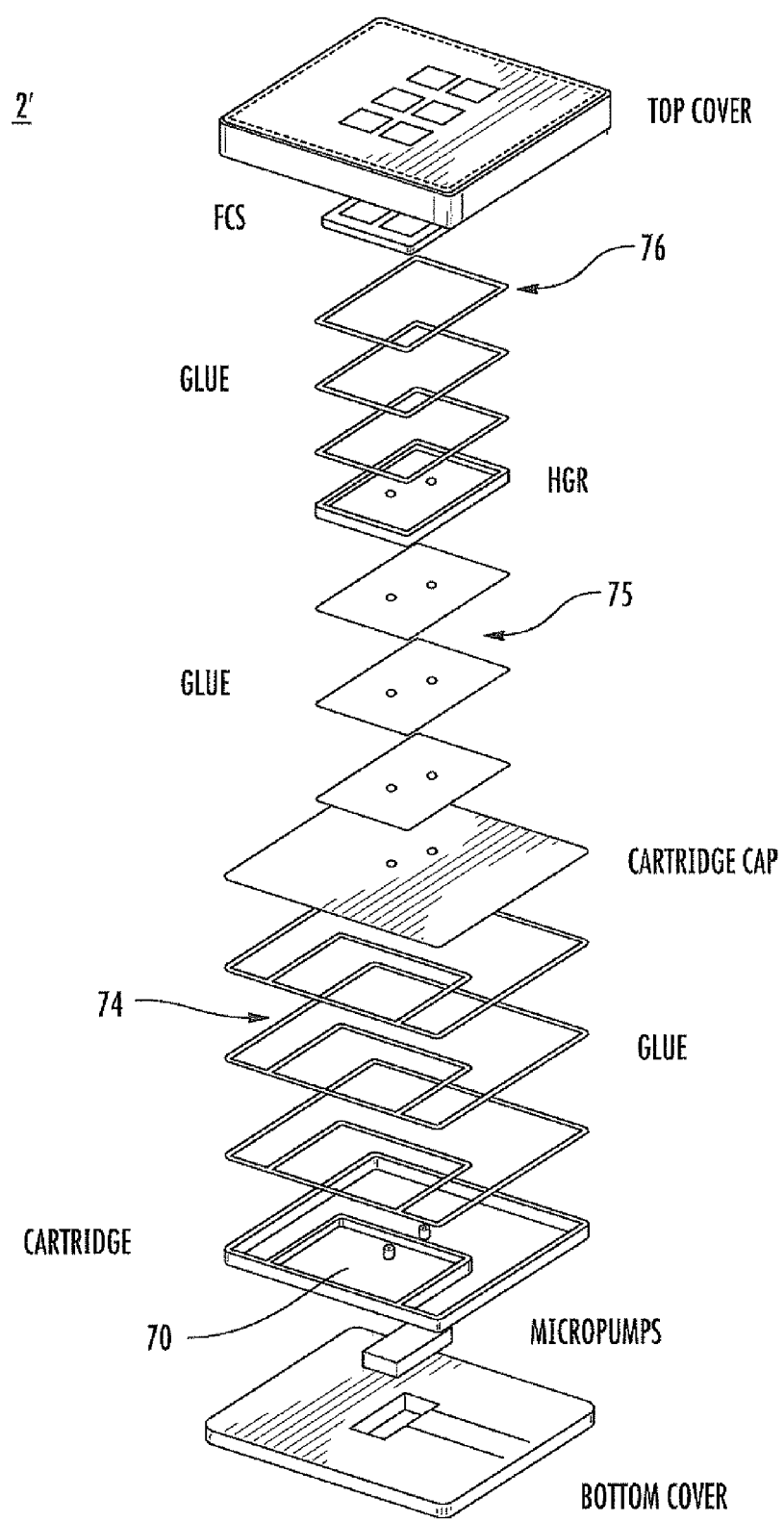
FIG. 31 shows an exploded view of the portable system (PPS) of FIG. 30 and its components.

The image shown in FIG. 30 represents the elements that form the PPS system, whereas subsequent FIG. 31 shows an exploded view of the PPS system and the components of which are included in it.

Figure 32:
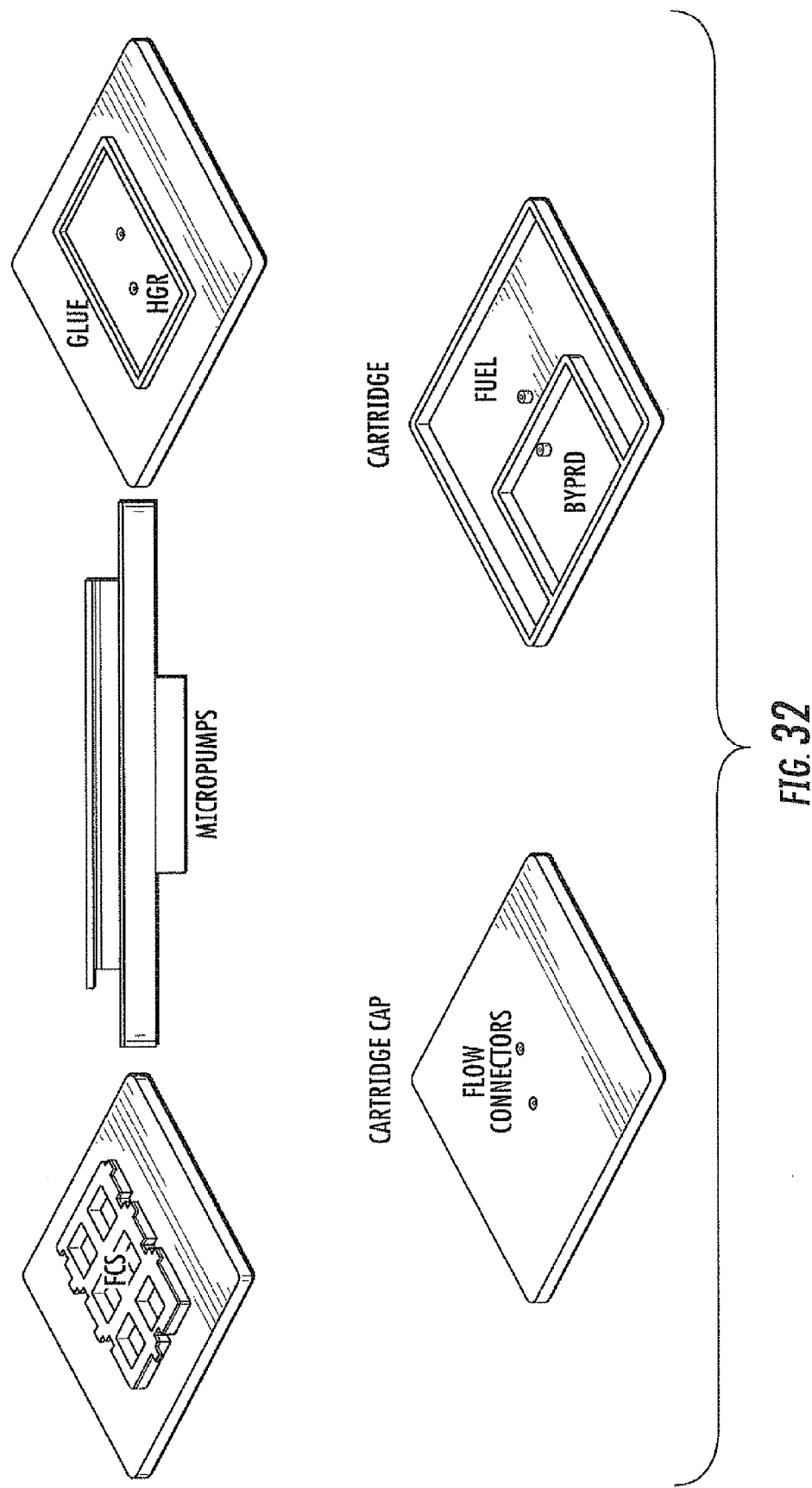
FIG. 32 shows some components in PCB of the system PPS of FIG. 30.
Figure 33A:
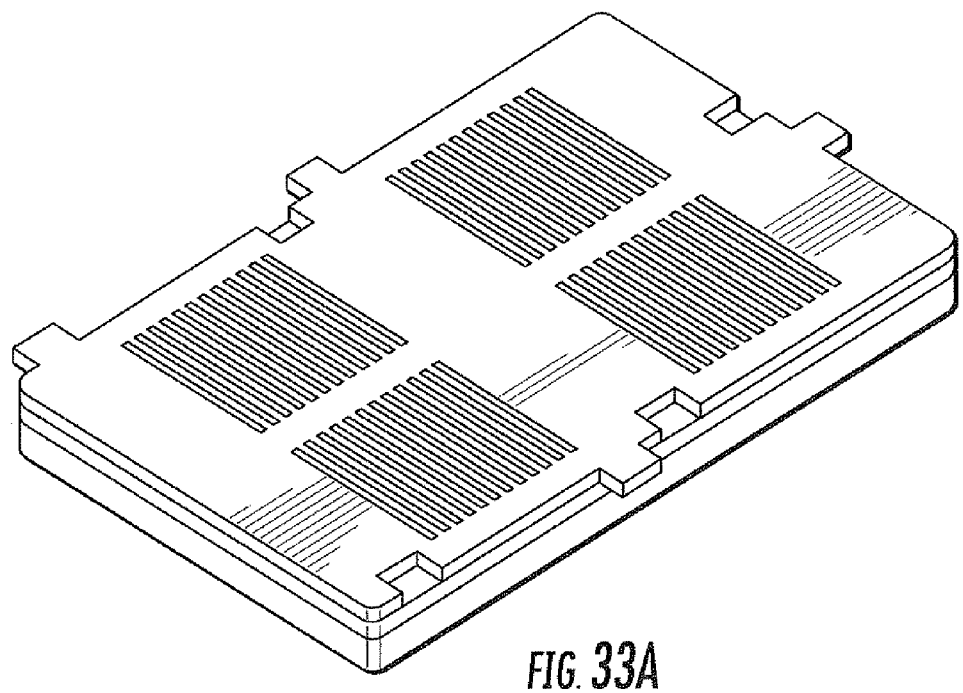
FIGS. 33A and 33B show respective schematic examples of systems PPS with components in PCB technology, for example, with FCS4 and FCS6 materials.
Figure 33B:
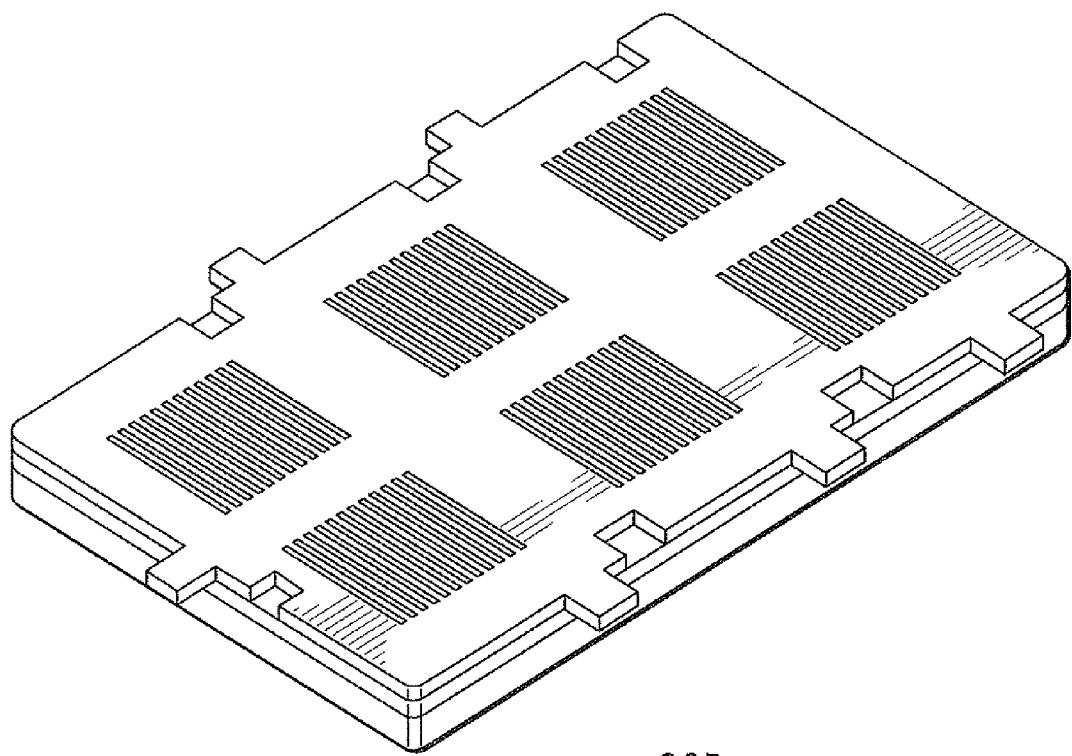

In the embodiment described here for indicative and not limiting purposes, the PPS is enclosed in a plastic cover, and it contains, inside of it, all of the components that are made in the PCB technology, as FIG. 32 shows. The various acronyms used and represented in the following figure respectively indicate: FCS: Fuel Cell System; HGR: Hydrogen Generation Reactor; and BYP: Byproducts.

The flexibility of the PCB technology and the possibility of quick prototyping allows the system to be sized based upon the electric power that is to be produced (function of the load to be supplied) and the desired autonomy. By varying the number of fuel cells in the FCS, the peak power of the system varies, ensuring the possibility of sizing the PPS to supply any type of portable electronic system: mobile phones, PDAs, Laptops, etc.

Images 33A and 33B represent two respective layouts of fuel cell systems FCS: FCS4 with four fuel cells in series, and FCS6, made with six fuel cells connected in series, and in both FCS4 and FCS6 there is planar arrangement of the fuel cells.

In addition to the maximum power that can be delivered by the PPS system, it is possible to modulate the voltage and current that make up the desired power, by varying the active area of each fuel cell, and therefore the number of these connected in series. Indeed, if one wished to increase the voltage, keeping the desired power, a system would have to be made with many fuel cells of smaller active area, connected in series.

The hydrogen sent to the fuel cells is freed through a chemical hydrolysis process from an $NaBH_4$ solution, which, as soon as it comes into contact with the catalyst, frees the hydrogen included in it. The liquid by-products of the hydrolysis reaction, by not precipitating, allow the reaction to continue and therefore hydrogen to be produced.

Figure 34:
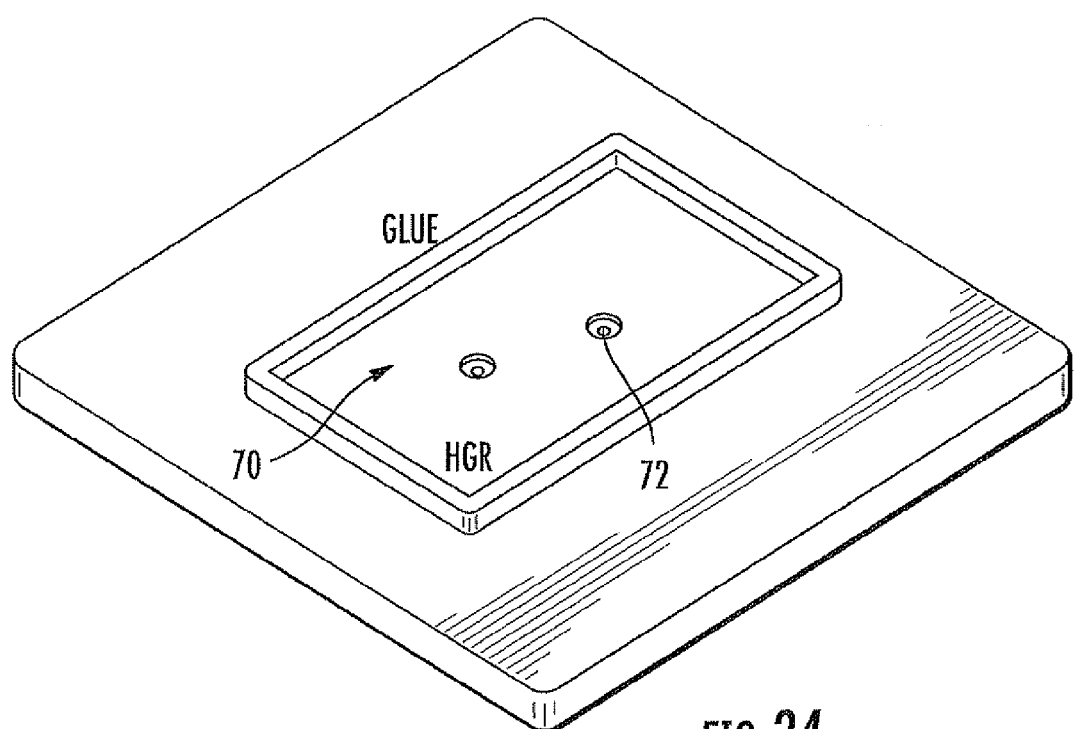
FIG. 34 shows a portion of the enclosure of a reactor for producing hydrogen.

The reactor 2' for the production of hydrogen, represented in FIG. 31, is housed in an enclosure or cartridge and includes a chamber 70 dug by micromilling techniques from a series of bottom and top PCBs 74, 76 glued with heat through layers of glue 75; the reactor 2' is located below the FCS system at the anodes of the fuel cells. The solution containing hydrogen enters into the reaction chamber through a through hole 72 made on the bottom thereof, as shown in FIG. 34, and which communicates with the portion of cartridge dedicated to the storage of the fresh solution. The reaction by-products, in liquid phase, are expelled through a second hole, made on the floor of the reaction chamber 70, which communicates with the portion of the cartridge dedicated to storing them. The catalyst in the reaction chamber is generally Ruthenium, but Nickel or Cobalt can also be used, and it can be deposited with industrial processes widely used in the microelectronics industry, like PVD (Physical Vapor Deposition) or Screen Printing.

By varying the size of the cartridge, it is possible to modulate the foreseen autonomy of the PPS system, and indeed by increasing or reducing the volume of $NaBH_4$ solution, from which hydrogen and therefore electric energy is extracted, it is possible to modulate the duration of the energy production. As soon as the solution present in the Cartridge is hydrolysed, the by-products are accumulated in the suitable volume formed inside it. The emptying of this, and the filling of the volume with "fresh" $NaBH_4$ solution, may allow the system to continue to operate, once again supplying the electrical loads being connected to it.

As can be observed in FIG. 7, the Cartridge is divided into two sections, one section 80 dedicated to store the $NaBH_4$ solution (FUEL), and one section 81 dedicated to storing the hydrolysis by-products (BYPRD). The volume of the second section 81 (BYPRD) represents about 40% of the total volume of the Cartridge for the reduction in volume of the by-products as a consequence of the production of hydrogen with respect to the initial $NaBH_4$ solution.

Figure 35:
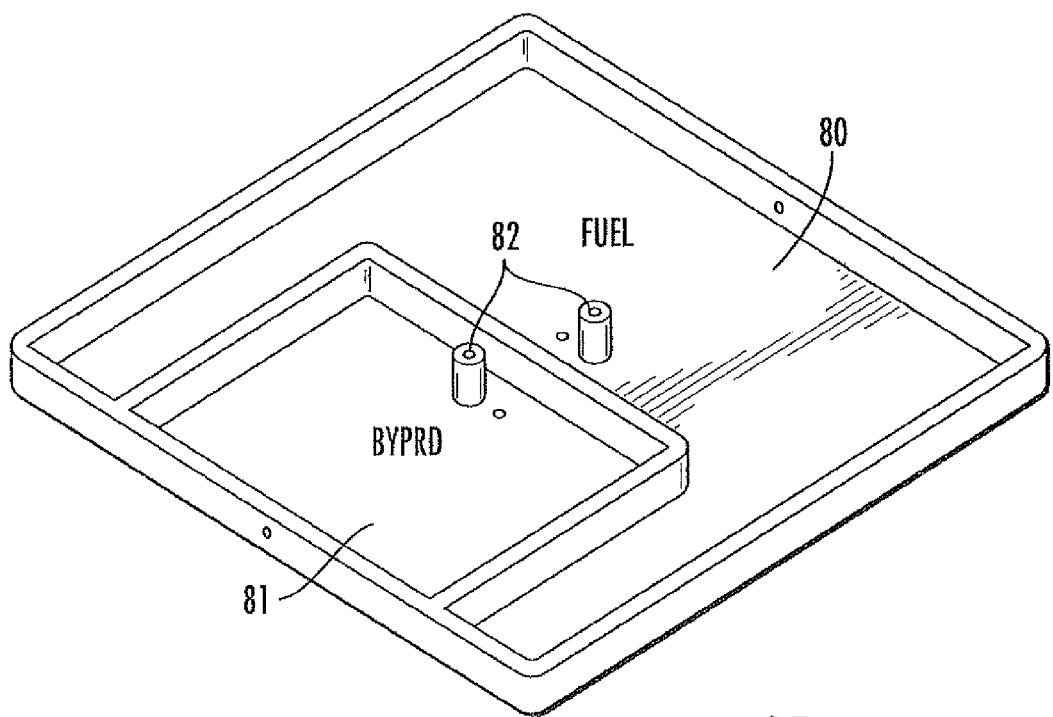
FIG. 35 shows a tank portion of the enclosure of FIG. 34 for storing an NaBH4 solution and of the hydrolysis by-products.
Figure 36:
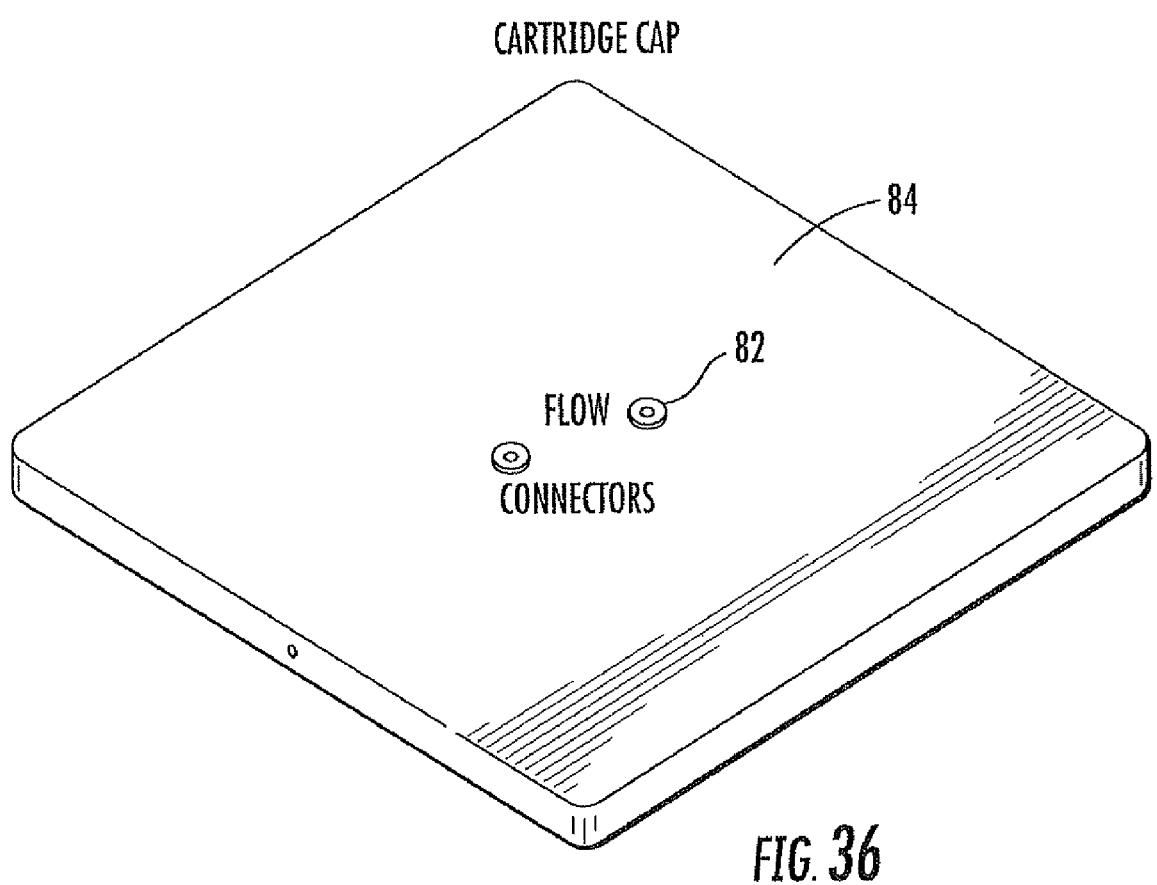
FIG. 36 shows a cap of the cartridge with fluid connectors that poke out.

Fluid connectors, also made from PCB, are made inside the two sections 80, 81, and they include perforated cylinders 82 (typically the inner hole is about 1 mm), which are made during the milling process used to make the tank. The height of the fluid connectors shown in FIG. 35 is greater than the edge of the cartridge itself, and in this way they lock into the cylinders 82 made on the floor of the reaction chamber 70, as illustrated in FIG. 36. One of the solid cylindrical fluid connectors is used to send the solution from the section 80 of the tank dedicated to the FUEL to the reaction chamber 70, and the other is used to empty the reaction chamber 70 of by-products and to send them to the dedicated section 81 of the cartridge.

The cartridge, with a square plan, has a greater surface extension than the reactor that overhang it, and to close the part of cartridge that is not located below the reactor a cap 84 is used, also made from PCB, from which the cylindrical fluid connectors 82 made in the cartridge project, and as shown in FIG. 36 such connectors therefore engage into the reaction chamber.

Figures 37, 38:
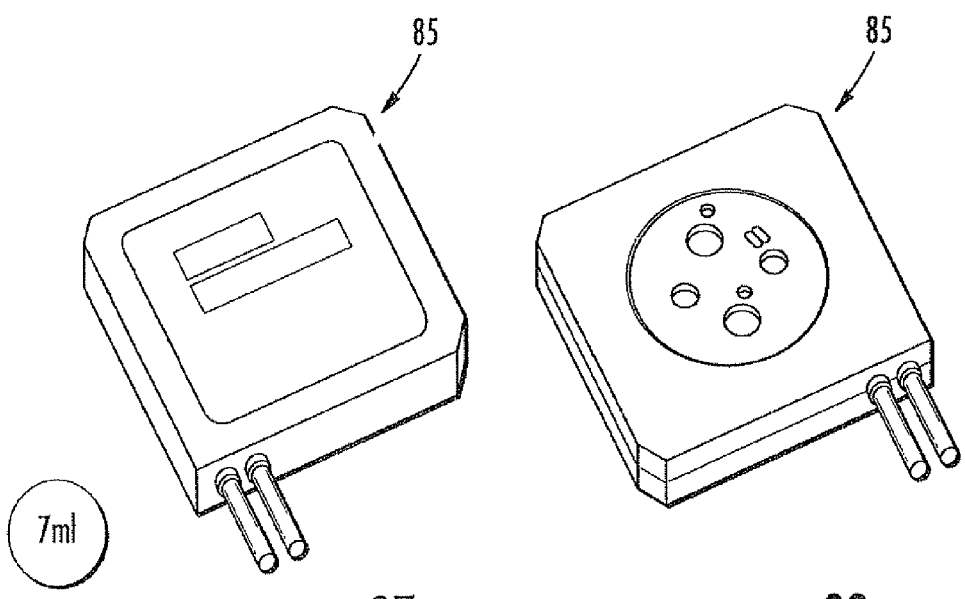
FIGS. 37 and 38 show piezoelectric micropumps.

The microfluidic system for sending the $NaBH_4$ solution to the reactor and for emptying it of the reaction by-products includes at least two piezoelectric micropumps 85, for example, of those known commercially as STAR MICRONICS SDMP 306, being shown on the front and on the back in FIGS. 37 and 38. These pumps are equipped with integrated cantilever valves that allow the liquid to flow in just one direction. Model SDMP306 can process up to 7 ml/min of liquid.

Their activation takes place by supplying a sinusoidal voltage to the piezoelectric of 240 Vp at a frequency of 40 Hz. As the frequency and power supply voltage vary the flow rate of liquid processed can be modulated. Both of the micropumps comprise two plastic nozzles 86 that respectively engage one in the hole 82 made on the floor of the cartridge the other inside the rigid fluid connector made from PCB. In this way, the first micropump 85, draws in the solution from the Cartridge and sends it passing through the body of the micropump to the reaction chamber 70. Similarly, the second micropump draws in the liquid by-products from the reaction chamber 70 and sends them inside the cartridge, in the section 81 dedicated to the by-products.

The operation of the system is now discussed. The PPS system is physically connected by gluing the components made individually using heat and installing the two microfluidic units on the back of the cartridge. To optimize the operation of the PPS, an operating cycle has been devised that ensures the safety conditions and increases the energy yield. To make the operating cycle, the theoretical case of unitary efficiency of the catalyst has been considered, which implies that the hydrolysis reaction takes place ideally. As soon as the $NaBH_4$ solution including the hydrogen comes into contact with the catalyst, hydrogen is produced inside the reaction chamber 70, whereas by interrupting the contact between the solution and the catalyst the production of hydrogen is instantly interrupted.

The ideal operating cycle supposes a dynamic ON-OFF management of the hydrogen production, otherwise known as Hydrogen On Demand (HOD). However, numerous experiments carried out in the laboratory have demonstrated that the hydrolysis reaction is not instantaneous, which indicates that there are tails of hydrogen flows even interrupting the contact between the solution and the catalyst, which is due to the low efficiency of the catalyst used, including commercial ruthenium pellets supported by alumina. New specific high-efficiency catalysts are currently being developed that allow the theoretical ideal cases considered to be put into practice.

The management of the cycle is suitably carried out by a network of pressure and temperature sensors that are housed inside the reaction chamber 70. The complete hydrogen production cycle mainly includes three steps:

1. Loading of the solution in the reaction chamber;
2. Stand-by; and
3. Discharging of the by-products from the reaction chamber to the cartridge.

Hydrogen is produced during the loading step. The first supply micropump 85 (SDMP 306) introduces the solution into the reaction chamber 70 at a flow rate of 170 μl/min, which, with the theoretical cases made, and assuming a 20% $NaBH_4$ solution, corresponds to a hydrogen flow of 65 ml/min. During this step, which lasts 70 s, the second micropump stays switched off.

Figure 39:
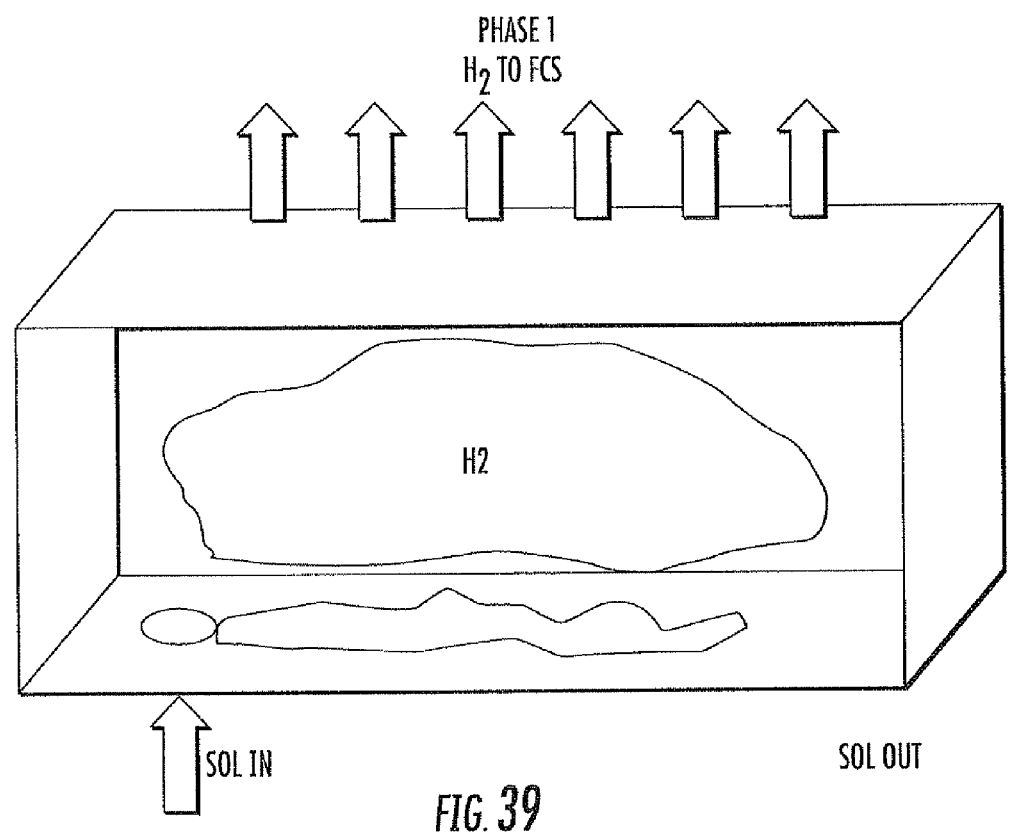
FIG. 39 shows a first step of charging the reactor with consequent production of hydrogen.
Figure 40:
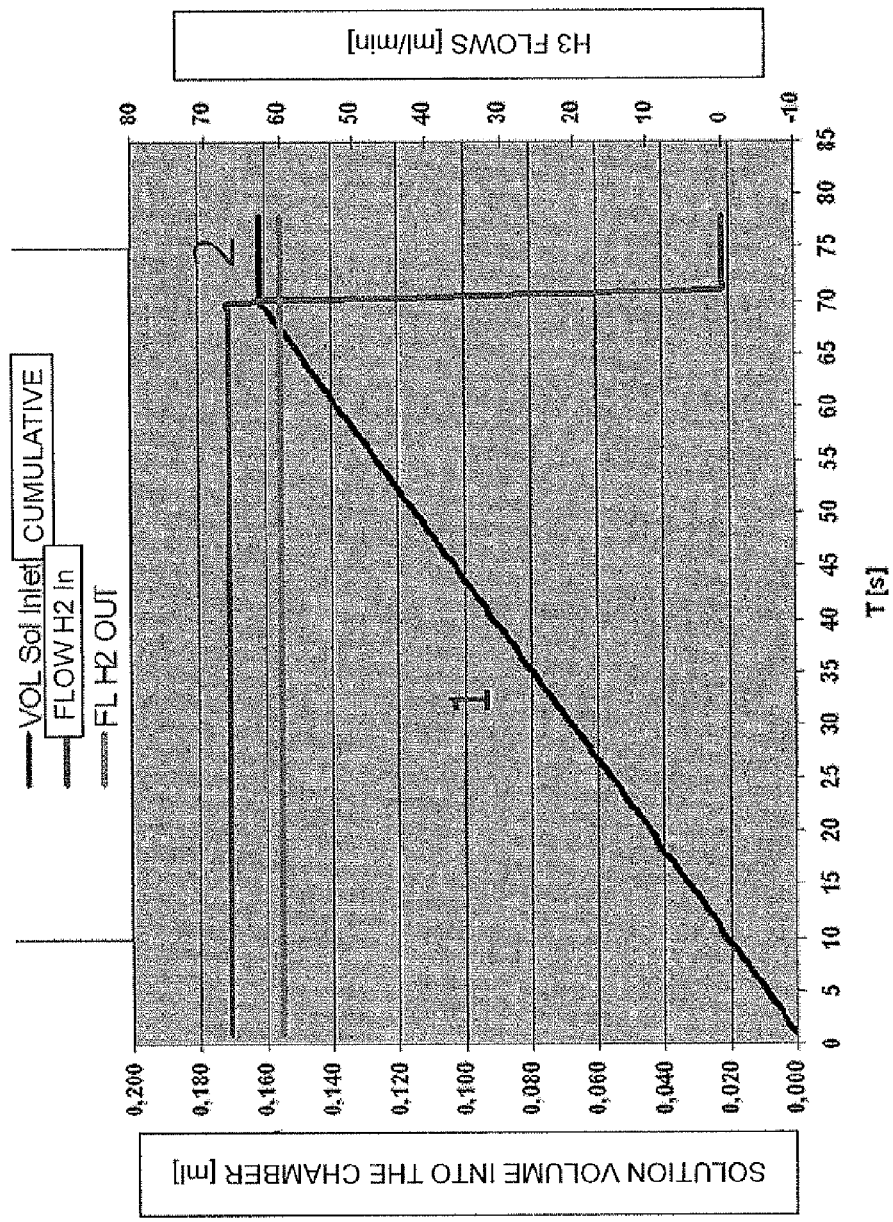
FIG. 40 shows the development of the flows of hydrogen produced and consumed (OUT) for first step FIG. 39.
Figure 41:
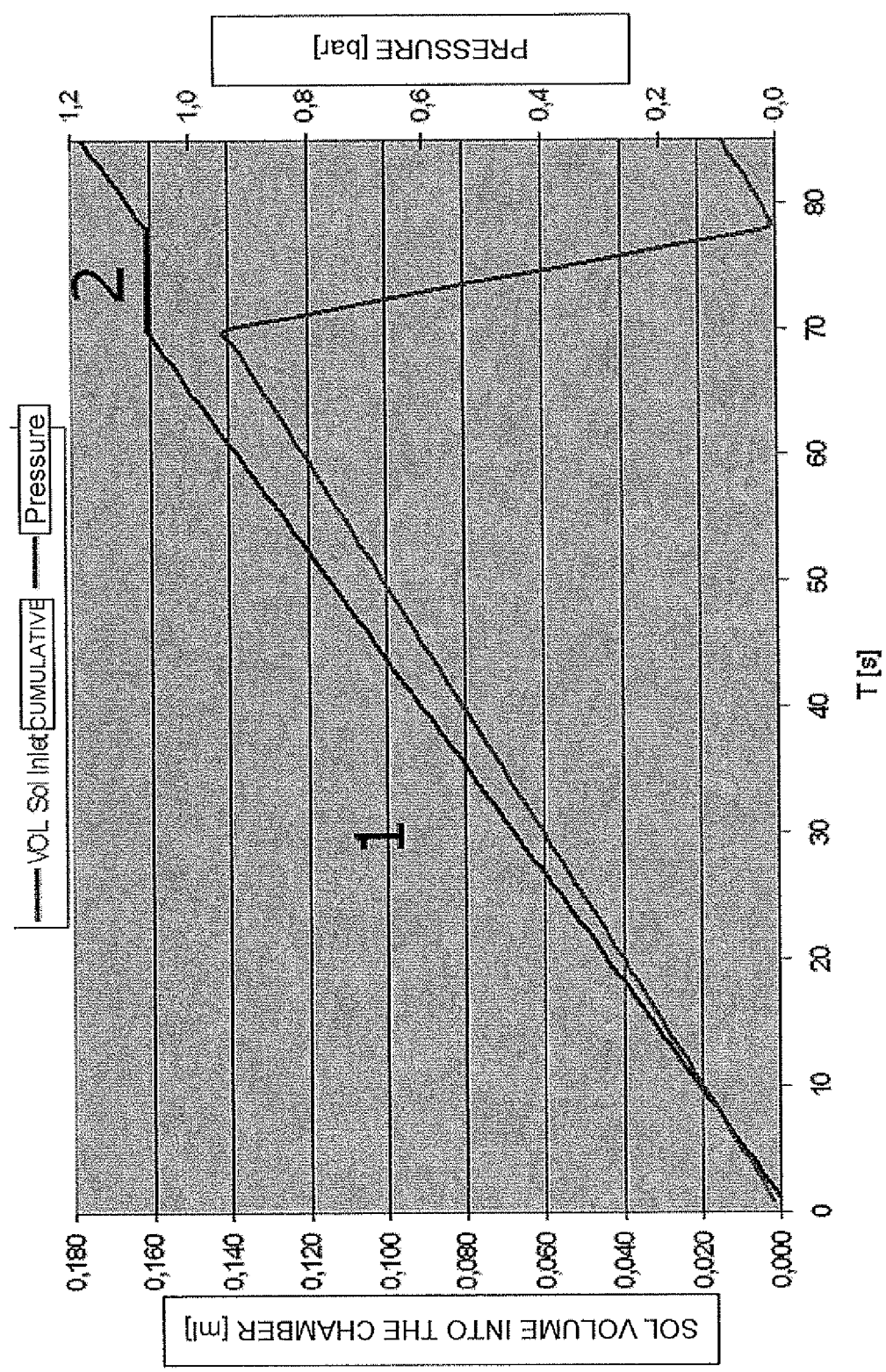
FIG. 41 shows a diagram displaying both the development of the pressure in the reaction chamber over time, as well as the volume of solution injected.

FIG. 39 schematically shows this first step. During this step, the hydrogen that is generated, at a flow rate of 65 ml/min, is sent to the fuel cells for the production of electric energy. It has been demonstrated from experimental tests that the flow of hydrogen used to obtain the power desired for the system, equal to 3.5 W, is obtained by feeding a system of fuel cells, like FCS4, with a flow of hydrogen of 60 ml/min and in air breathing conditions. Thus, the hydrogen flow that is generated inside the reactor (65 ml/min) is slightly greater than that transformed by the FCS. Such an overflow, as well as ensuring the generally necessary overpressure for the motion of the hydrogen, indicates an overall increase in the internal pressure of the reaction chamber. The graphs of FIGS. 40-41 and 43-45, respectively show the difference between the hydrogen flows entering (produced) in the reactor and coming out (absorbed by the FCS) and the pattern of the pressure in the reaction chamber over time, as well as the volume of solution injected.

Once the maximum desired pressure inside the reaction chamber has been set, the length of the loading step is unequivocally determined (70 s). In the case under examination, we have considered a maximum pressure limit, due to the difference of the entering and leaving hydrogen flows, equal to 0.9 bar.

Figure 42:
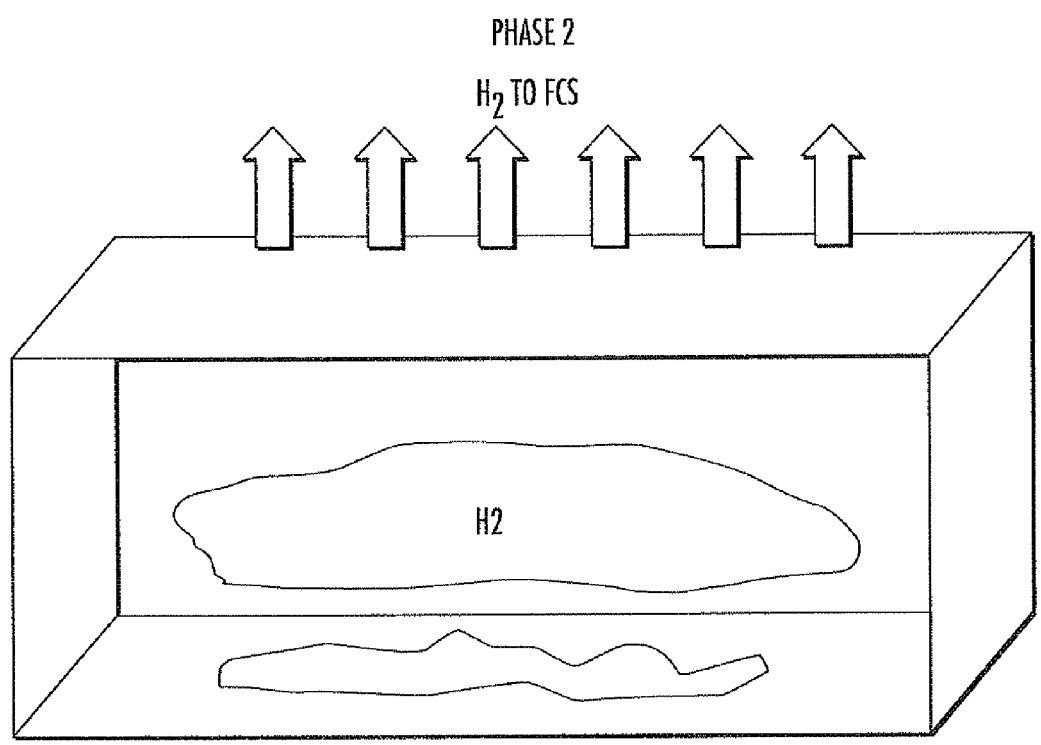
Figure 43:
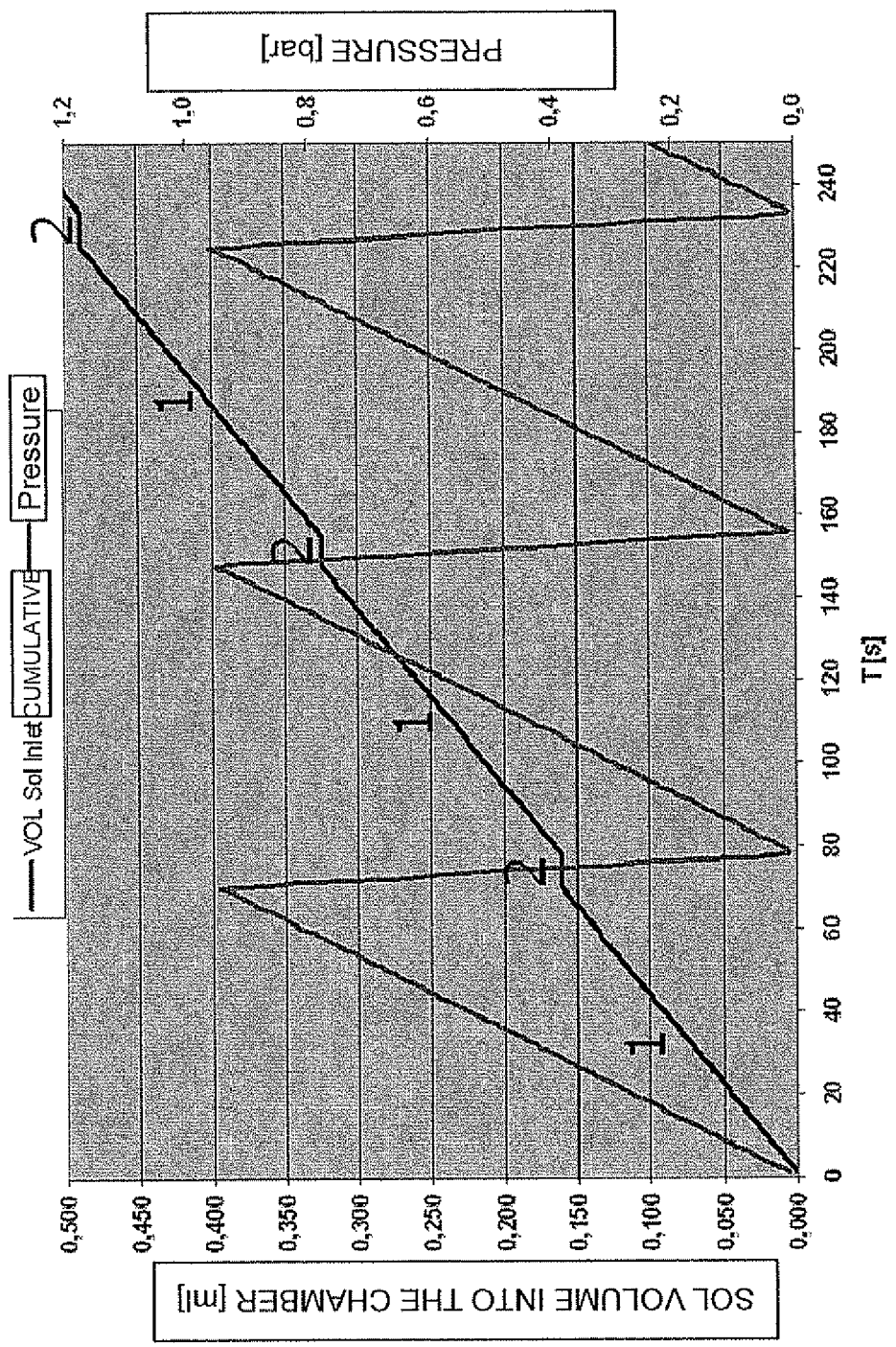
FIG. 43 shows a diagram of alternation of the charge and stand-by steps.
Figure 44:
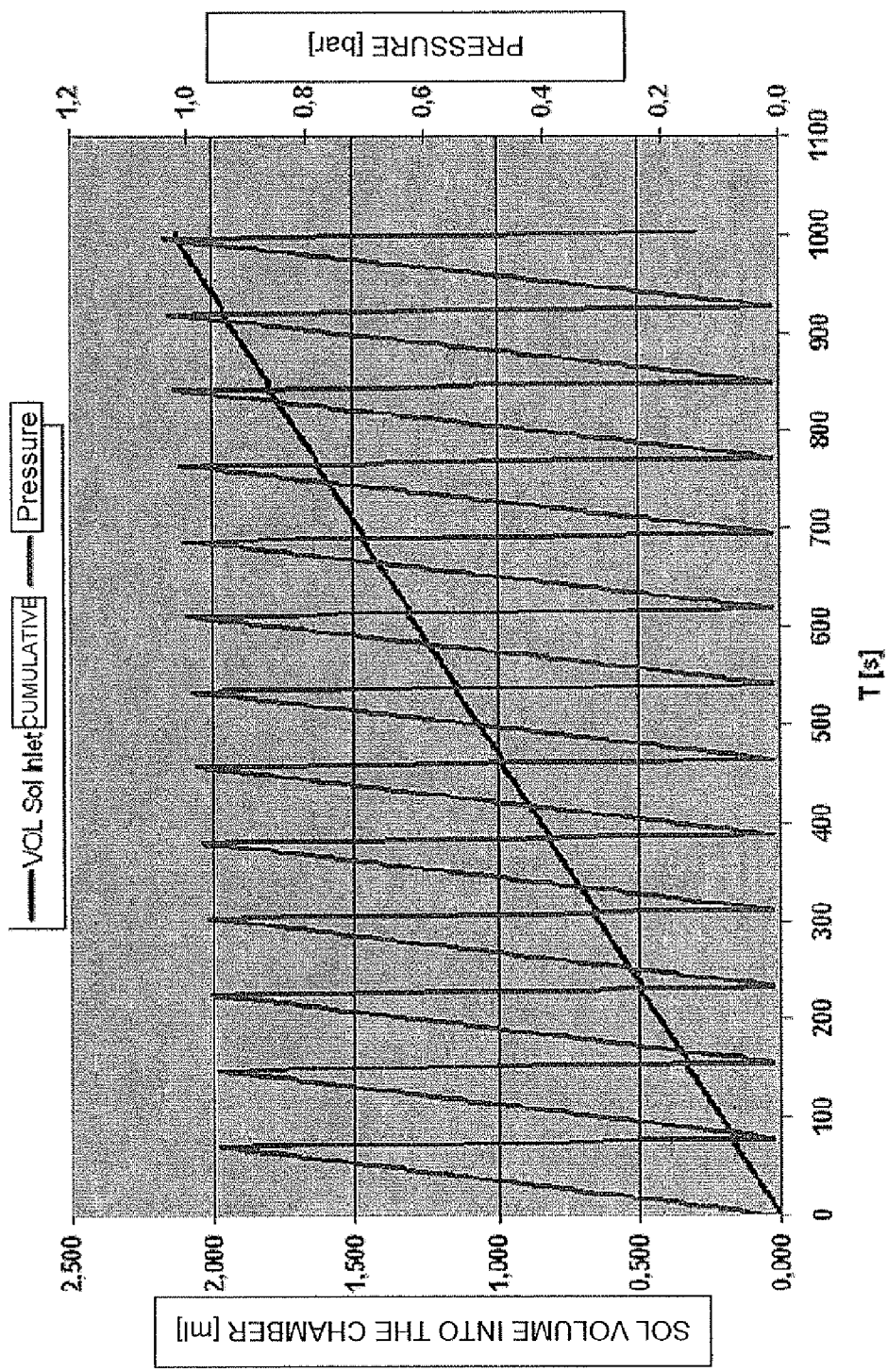
FIG. 44 shows a diagram of development of the pressure during the succession of charge and stand-by cycles.
Figure 45:
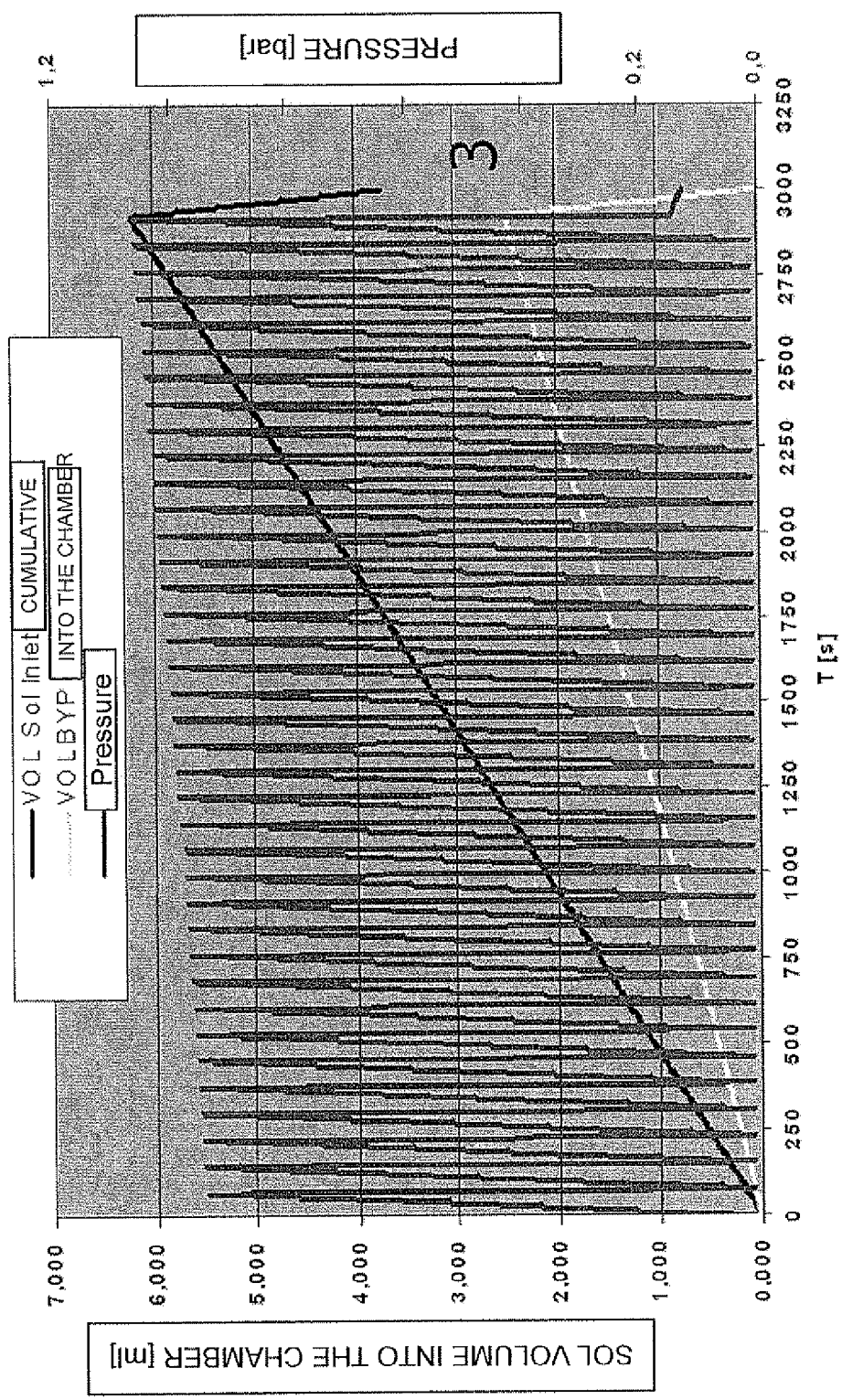
FIG. 45 shows a diagram of development of the pressure during the succession of charge and stand-by cycles.

The subsequent step, or step number 2, known as the stand-by step, and illustrated in FIG. 42, includes interrupting the supply of solution inside the chamber 70, in order to take away the overpressure. In this step both of the micropumps 85 are switched off.

The length of the second stand-by step is about 8 seconds. As soon as the pressure inside the reaction chamber reduces to values close to atmospheric pressure, due to the interruption of the "entering" hydrogen flow, loading step number 1 is repeated, with a consequent contextual increase in the internal pressure of the system.

The cycle continues alternating a loading step with a stand-by step. At each subsequent cycle, there is a slightly higher pressure peak than the peak of the previous cycle, due to the reduction in volume as available inside the reaction chamber due to the presence of the hydrolysis by-products.

Once the maximum overall value that is wished to be reached inside the reactor has been set, the number of loading and stand-by steps that can be carried out is unequivocally determined. Once the maximum desired pressure inside the reaction chamber has been set, equal to 1.1 bar, the number of charge and stand-by cycles corresponding to the given pressure is determined, and, in the case under examination, the design pressure may be reached after thirty-eight (38) charge and stand-by cycles.

Figure 46:
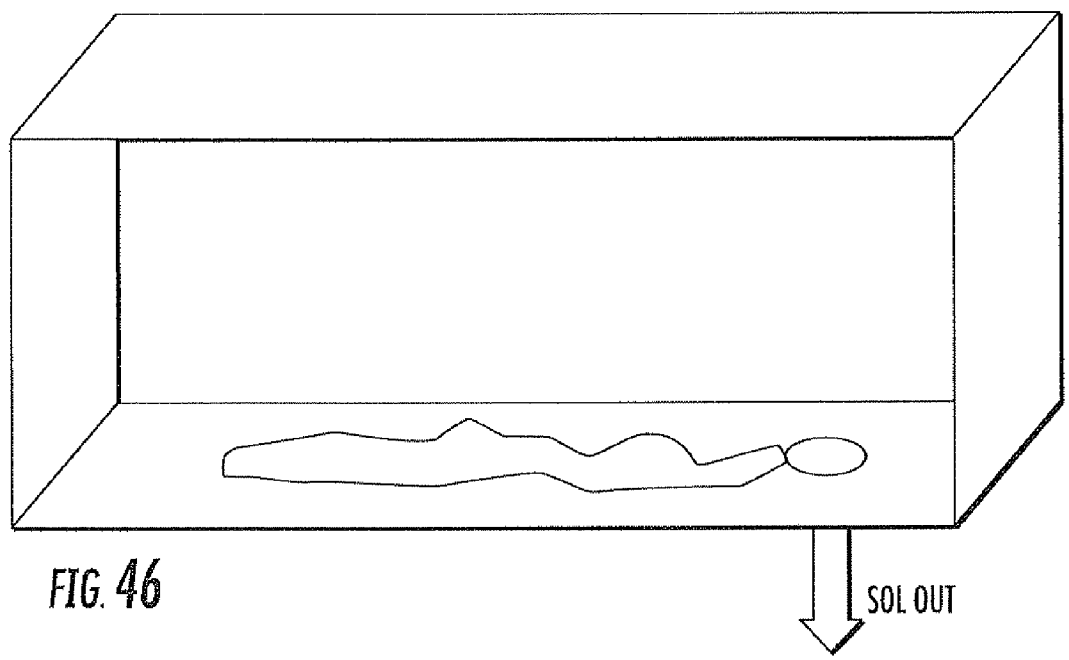
FIG. 46 schematically shows a third step of discharging the solution from the reaction chamber.

At this point, step number 3 of the cycle, known as discharge, illustrated in FIG. 46, is carried out. During this step, the first supply micropump is closed, whereas the second discharge micropump is activated to empty the reaction chamber of the by-products.

At the end of the 38 charge and stand-by cycles, inside the reaction chamber there are about 2.5 ml of by-products in liquid phase. In the example described here purely for indicative purposes, by using a micropump of the SDMP 306 type that processes a flow rate of 7 ml/min, the emptying time of the reaction chamber is determined, equal to 21 s.

Once all of the fresh $NaBH_4$ solution, including hydrogen, to continue to feed the electrical load applied has run out, the cartridge should be filled with a new hydride solution and the portion of the tank dedicated to containing the by-products should be emptied. Those skilled in the art should understand that in an industrial implementation of the PPS system the two tanks can be made with interchangeable disposable cartridges.

Overall, a complete cycle lasts about 2985 seconds (equal to about 50 min). The only step in which electric power is not produced is the discharge step, equal to 21 seconds.

During one complete cycle of the loading, stand-by (repeated 38 times), and discharge steps, about 7.5 ml of 20% $NaBH_4$ solution are introduced inside the reaction chamber, corresponding to the continuous production of electric energy at a power of 3.5 W for about 50 min.

Considering that the cartridge for including the FUEL has a volume of 71 ml, it can be worked out that overall the system can produce energy for about 8 h. At the end of such a period it is desirable to empty the chamber including the by-products and fill the corresponding section 80 including the FUEL.

The energy that can be developed by the system is equal to 28 Wh. The energy data displayed takes into account the verified experimental yield of the FCS system (3.5 W obtained with 60 ml/min of hydrogen), but they do not take into consideration further energy losses.

The energy consumption of the supply and by-product discharge micropumps 85 has been calculated. Such consumption corresponds to about 3 Wh, for which the energy available in output from the system may be about 25 Wh.

The theoretical energy on-board the PPS system considering 71 ml of 20% NaBH4 solution (1.46 Wh/ml), is equal to 103 Wh; of these, 25 Wh may be available for the load, which allows us to work out that the expected experimental yield of the system may be about 24%, almost coinciding with the experimental energy yield of the system of fuel cells. The overall volume of the system is equal to 200 cc and the theoretical energy density is 500 Wh/l, whereas the corresponding expected experimental one is 125 Wh/l.

The embodiment described above presents a device for supplying portable electronic systems known as PPS, made in PCB technology, includes the following components: FCS; HGR; Cartridge; and Microfluidic units.

The system is able to produce electric energy continuously, at a power of 3.5 W for about 8 hours.

In a commercial implementation of the system for producing electric energy for portable devices, it can be considered to use disposable cartridges to include the $NaBH_4$ solutions and the corresponding by-products of the hydrogen production. In this way, the portable energy generator could be used for an indefinite length of time by replacing the cartridges with the fuel and the by-products as needed, irrespective of whether the main electric energy network is available.

The use of PCB technology to make and mechanically assemble the components allows the production costs to be reduced and allows the flexibility offered by such technology to be ensured to make PPS systems of different sizes to supply all portable electronic systems.

The embodiments achieve numerous advantages, the most significant of which are briefly displayed below:
  Manufacture of a portable and monolithic system for producing electric energy;
  Use of a low-cost, strong and flexible technology (PCB);
  Possibility of supplying power to portable electronic systems without mains electricity;
  Commercial implementation with disposable cartridges of NaBH4 solution;
  "Infinite" theoretical autonomy by replacing the cartridges of fuel and by products;
  Integration of a system for producing H2 only when desired by the electrical load (HOD: Hydrogen On Demand);
  Integration of a system of fuel cells with high power density (270 mW/cm2 in air breathing); and
  Possibility of supplying power to different power classes of portable electronic systems (modularity).

Fourth Embodiment

Now, with particular reference to the embodiments of FIGS. 47 to 96 a fourth embodiment of the system used in micropumps is described. In order to better understand the aspects of this further embodiment it may be desirable to make an explanatory preface.

From the advent of microelectronics until the end of the 1990s miniaturization technologies of microelectronic devices have followed Moore's law, allowing the density of integration to double every 18 months. Currently, due to the limitations imposed by manufacturing processes, the foreseen trend is slowing down and it is expected that the density of integration should double every 24 months.

Progress in the miniaturization of non-electronic devices has not been as fast as in microelectronic devices. In the late 1970s silicon machining technologies were extended to the manufacture of the first micro-electro-mechanical devices, which were later renamed MEMS (Micro Electro Mechanical System).

The first device includes simple resonating mechanical structures subjected to electrostatic forces, detected the humidity of the air through resonance frequency analysis. During these same years the first prototypes of microvalves and micropumps actuated piezoelectrically or by thermopneumatic forces appeared.

Later, in the 1980s more complex mechanical elements were presented, such as springs and gears, which were to allow the development of more complex devices. The great advantage offered by MEMS is that of being able to integrate onto the same substrate (usually silicon) both mechanical elements (sensors and actuators) and the electronic circuits that allow the device to be controlled. In this way it is possible to develop purpose-made products, which combine the excellent computing capability of electronic circuits with the sensing and control capabilities of microsensors and microactuators.

New systems can thus be made that are able to detect mechanical, thermal, biological, chemical, optical and magnetic phenomena at microscopic level, and process the data acquired through an electronic control unit able to make decisions and actuate the MEMS to position, adjust, pump, etc., i.e. capable of interacting with the environment.

Microfluidic systems certainly are among the most advanced MEMS systems. The main advantage of these systems include the fact that by scaling the dimensions new effects and better performance are obtained from the fluidodynamic point of view.

The key to microfluidic technology includes the possibility of using reduced amounts of fluid, obtaining changes in the behavior of the fluids that can be advantageously exploited. The main interest in microfluidic devices derives from the fact that they can have a revolutionary impact upon chemical synthesis and analysis, similar to that of integrated circuits on computers and electronics.

As soon as these systems reach the same level of manufacturability as their macroscopic equivalents and the same quality/price ratios, it is expected that there may be an explosion of microfluidic technology.

In the next paragraphs, the main components of a microfluidic system are summarized. The operating principles and the most significant examples to be found in literature are analyzed.

This fourth embodiment has the purpose of making and characterizing a prototype tank with integrated piezoelectric micropump for storing and sending the NaBH4 solution to the reaction chamber for the production of H2 and for storing the liquid by-products of the production of hydrogen.

The integration of the microfluidic system in the tank is carried out vertically, in other words each part was mounted on the upper face of the one that precedes it, with the enormous advantage of great simplicity of assembly. The presented prototype is made using PCB technology that allows a substantial saving both in terms of manufacture, and in terms of cost. By exploiting the prototyping speed of PCB technology, it is possible to make numerous prototypes in a short time, thus having the possibility of evaluating its efficiency in real timer from the structural, fluidodynamic and electrical point of view. The characterization of the system has been carried out by observing the behavior of the individual prototypes obtained and evaluating how good the choices made proved to be. Subsequent studies and research may be carried out in order to ensure both the performance and reliability of the devices.

Micropumps, unlike other MEMS devices, are devices that use a large number of actuation principles, therefore in literature there are multiple solutions of implementation. A first distinction that can be made is between micropumps that exploit a mechanical actuation principle and those that exploit non-mechanical actuation principles. Based upon the principle by which mechanical energy is applied to the fluid, mechanical micropumps can be further divided into displacement micropumps, in which the energy is periodically administered through the application of a force to one or more of the surfaces that include the volume of fluid, obtaining an increase in the pressure that causes the displacement of the fluid; and dynamic micropumps, in which the mechanical energy is administered continuously to the flow to increase the speed.

The first category includes micropumps with control valves, peristaltic micropumps, valveless micropumps and rotary micropumps. On the other hand, the second category includes ultrasonic micropumps and centrifugal micropumps.

TABLE 2 classification of mechanical micropumps.
MECHANICAL MICROPUMPS

| Displacement micropumps | Dynamic micropumps |
| --- | --- |
| Micropumps with control valves | Ultrasonic micropumps |
| Peristaltic micropumps | Centrifugal micropumps |
| Micropumps with diffuser/nozzle valves | |
| Rotary micropumps | |

Figure 47:
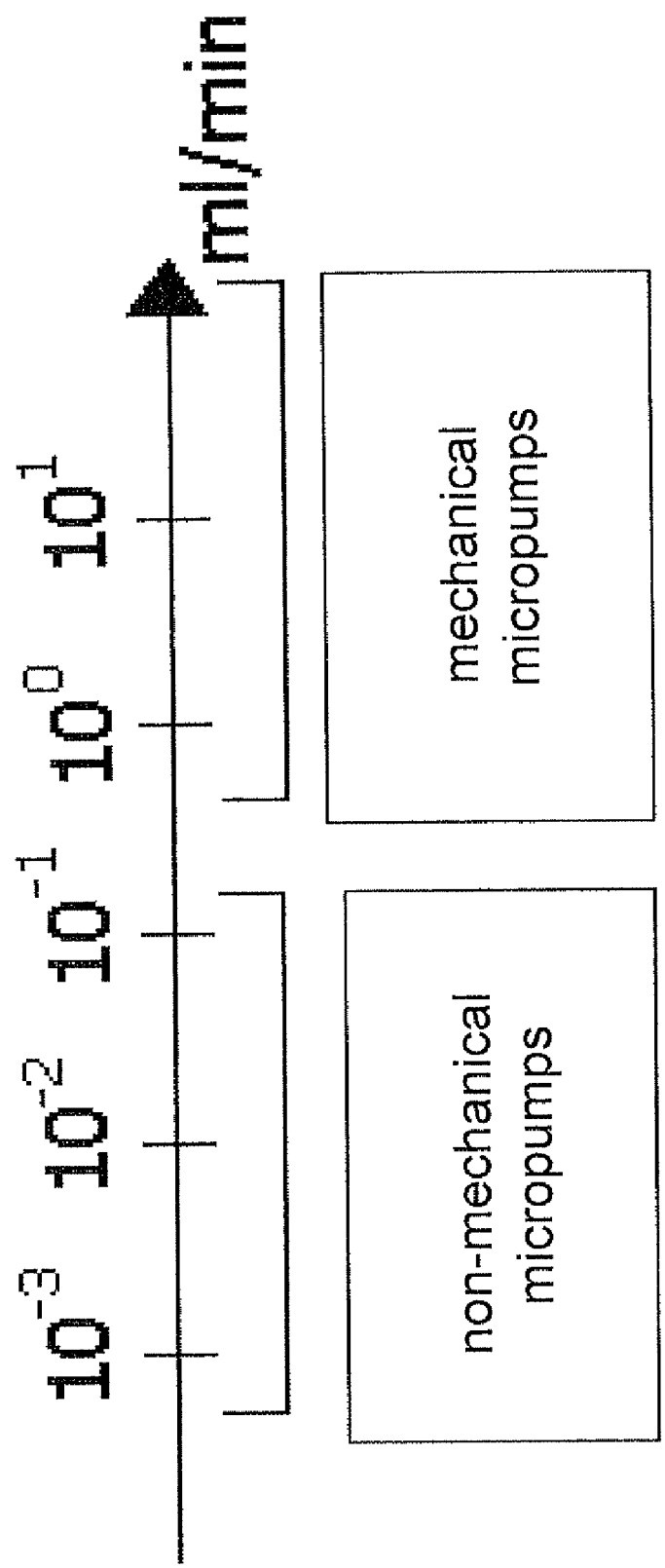
FIG. 47 shows the development of the so-called flow rate for the various types of micro pumps.

Non-mechanical micropumps apply a moment to the fluid by converting non-mechanical energy into kinematic energy of the fluid. This type of pump, which is not available on a macroscopic scale, works on the microscopic scale. Mechanical micropumps are used to produce high flow rates whereas non-mechanical ones are used for low flow rates, as shown in FIG. 47.

All mechanical micropumps generally require an electromechanical actuation principle, which generally converts electric energy into mechanical work. The actuation principles can be external or integrated.

External actuators are generally electromagnetic or piezoelectric, which whilst ensuring large forces and displacements, have the drawback that they are quite bulky. Integrated actuators are built together with the micropump and ensure very short response times, but develop weak forces and small displacements. They can be electrostatic, thermopneumatic, or thermomechanical (bimetallic).

The most important parameters that characterize a micropump are:

The maximum flow rate $\dot{Q}_{max}$. This represents the maximum volume of fluid transported by the micropump per unit time; and The maximum back pressure pmax. This is the maximum working pressure of the pump, for which the flow rate becomes zero.

Hereafter the most important examples of micropumps found in literature are displayed, with the help of FIGS. 49 to 67.

Let us firstly illustrate the micropump with control valves. The most common type of pump to be found both on the macroscopic and microscopic scale is the pump with control valves, and it includes: a chamber of initial volume V0; a membrane that creates a variation in volume ΔV; an actuation unit; and two control valves, which are opened as soon as a critical pressure difference ΔPcrit is reached.

Figure 48:
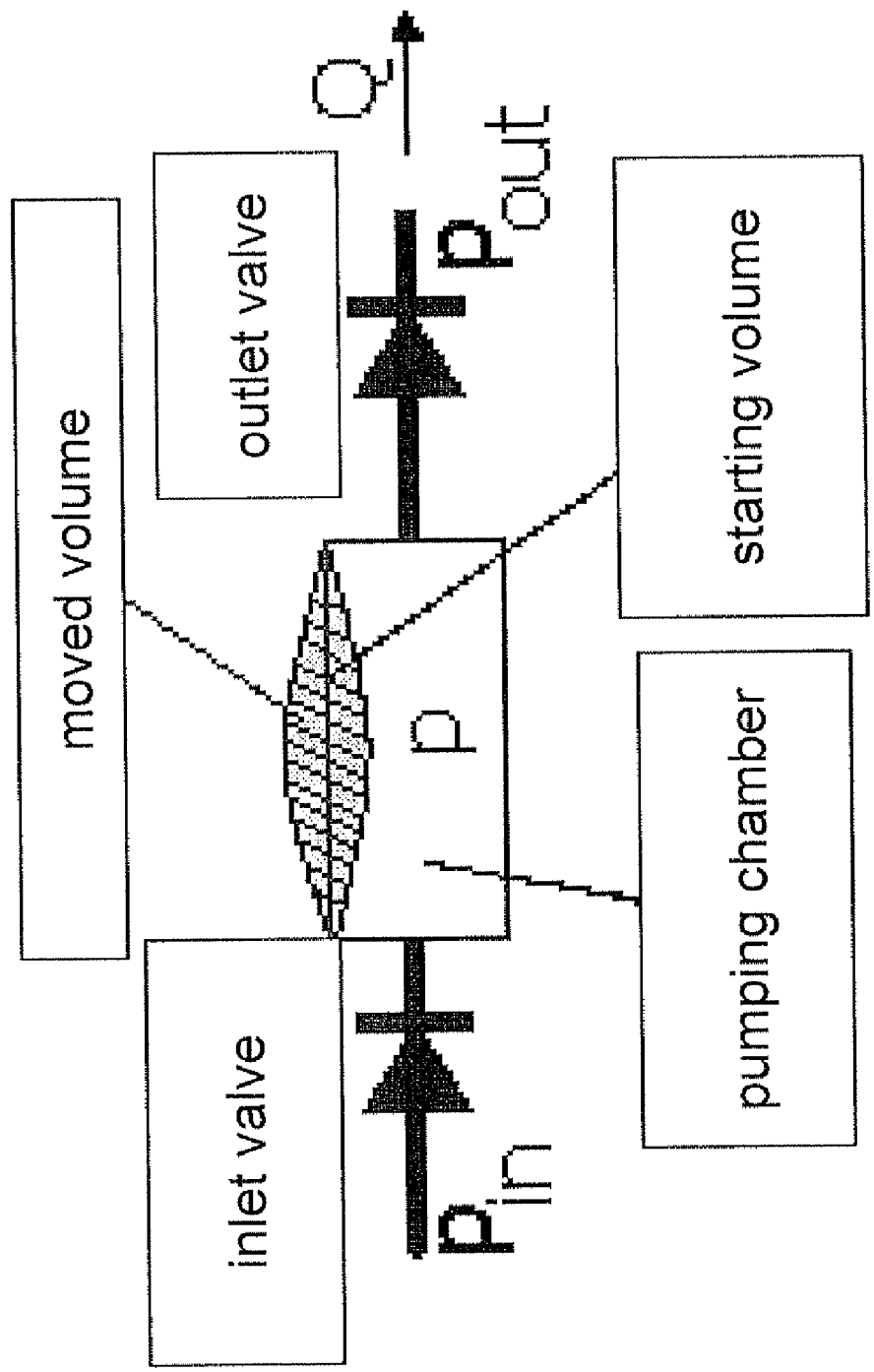
FIG. 48 shows the base drawing of a micro pump with control valves.
Figure 50:
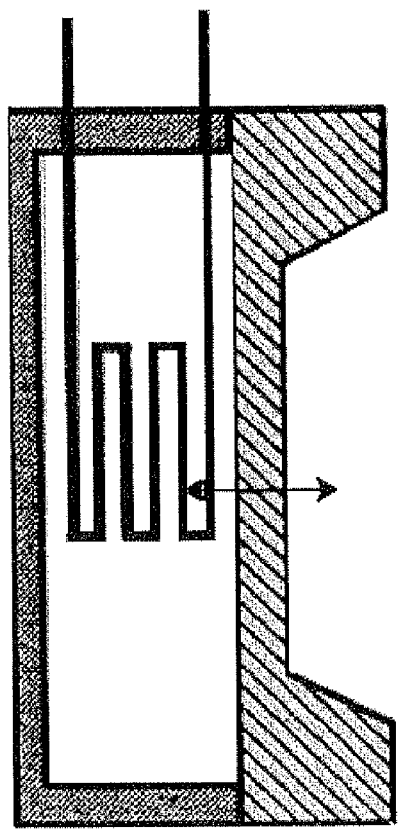
FIGS. 49 to 67 show respective schematic views of micropump structures that exploit various actuation and/or operating principles and include different types of valves.
Figure 49:
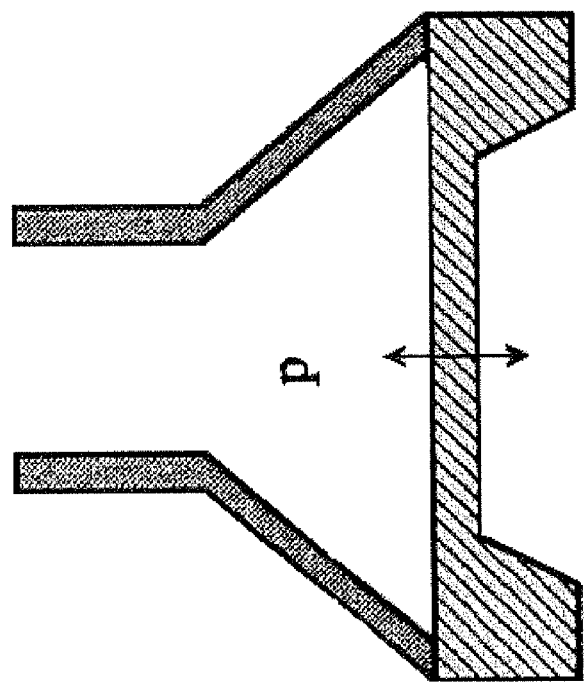
Figure 51:
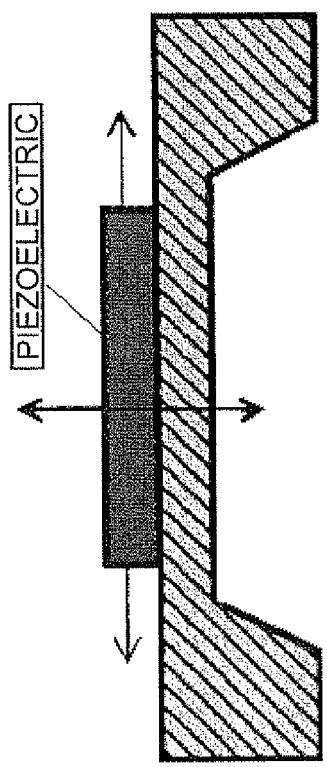
Figure 52:
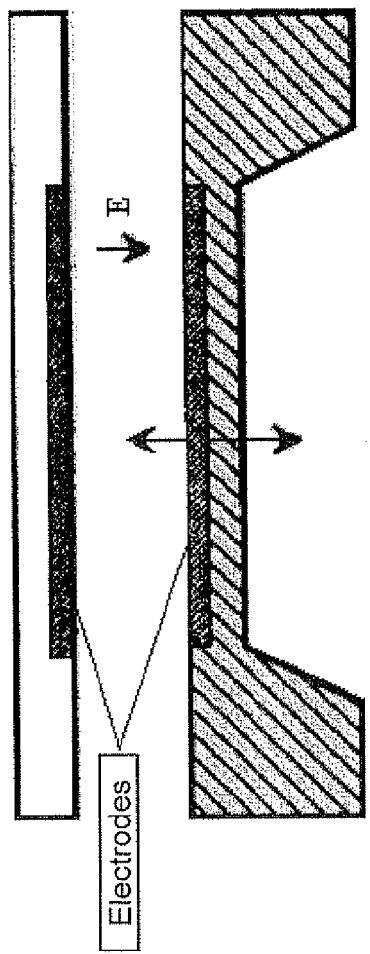
Figure 53:
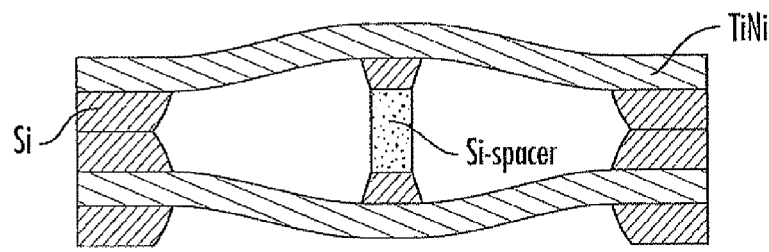
Figure 54:
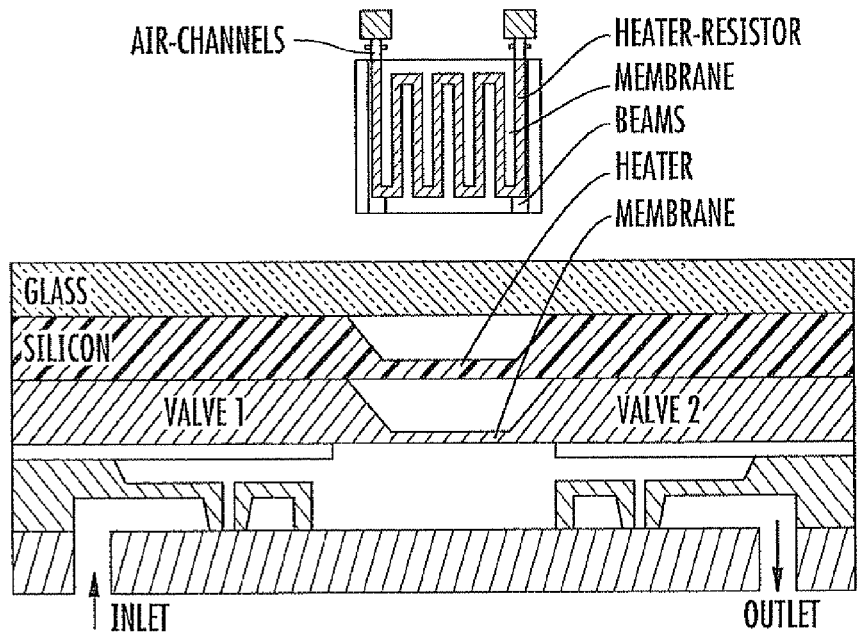

The outline diagram is represented in FIG. 48. This type of micropump can be implemented by selecting from the various actuation principles and from the various types of control valves.

The actuation of the membrane can be:

Pneumatic (FIG. 49): an external pump generates a pressure that when applied on the membrane makes it deflect causing the volume inside the chamber to vary. The presence of the external pump involves a not very high level of integration;

Thermopneumatic (FIG. 50): an air-filled chamber, arranged above the membrane, is heated; the caused increasing in volume results in the deflection of the membrane itself. When the chamber cools down the opposite effect is obtained. If the volume of the heated chamber is sufficiently small, reasonable operating frequencies can be reached. The resistance and the chamber are manufactured with the usual silicon micromachining techniques;

Piezoelectric (FIG. 51): by varying the voltage on a piezoelectric, fixed onto the membrane, there is a deflection of the membrane-piezo system. The piezoelectric can be glued onto the surface using conducting resins so as to simultaneously create the bottom electrode;

Electrostatic (FIG. 52): the electric field that is created between the membrane and a fixed electrode attracts the membrane and makes it deflect. Both of the electrodes can be made using silicon machining techniques; and Bimetallic (FIG. 53): over the membrane a polysilicon resistor, a layer of silicon dioxides and a layer of aluminium are made. By applying a voltage to the polysilicon resistor heat is produced that is dissipated in loco. This heat causes a different deflection, due to the different heat expansion coefficients of the two materials, i.e. of the layer of silicon dioxide with respect to the layer of aluminium arranged above the polysilicon, making the membrane deflect.

Hereafter some examples of micropumps with control valves are presented that exploit these actuation principles. The first example as shown refers to the thermopneumatic micropump presented by Van de Pol, illustrated in FIG. 54. The actuator includes a cavity filled with heated air on the inside with an aluminium resistor. The resistor is located on a very thin suspended silicon layer, anchored by four beams. The membrane at the base deflects due to the increase in volume of the chamber following the heating of the resistor. The diaphragm valves are closed at the base by a layer of Pyrex.

Figure 55:
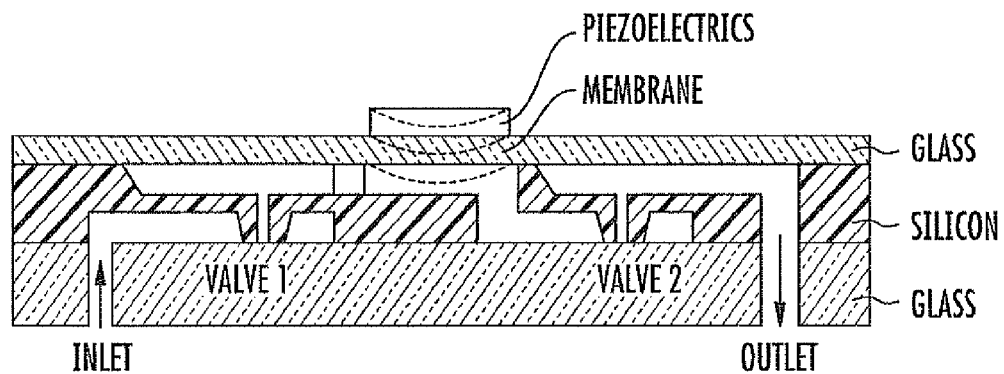
Figure 56:
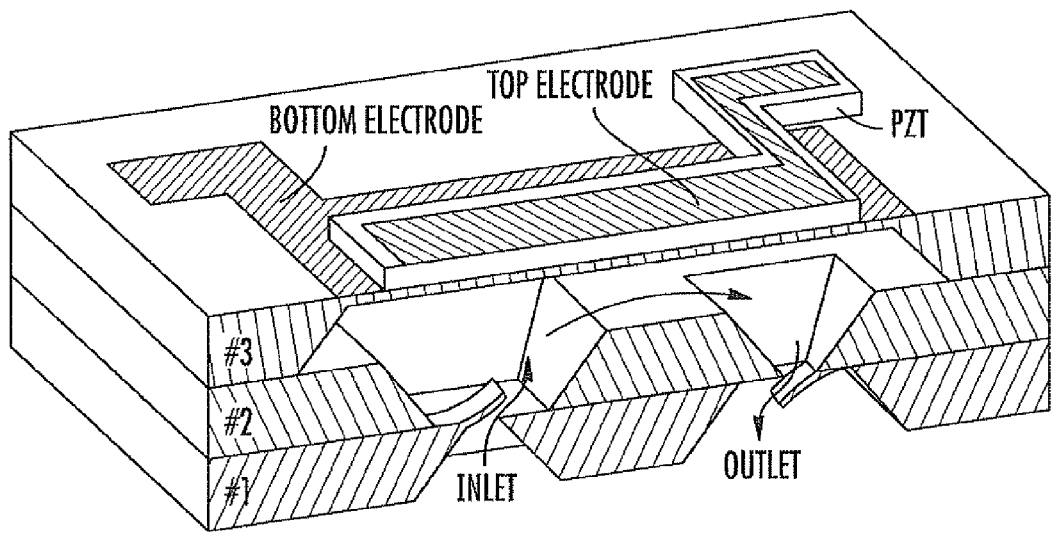
Figure 57A:
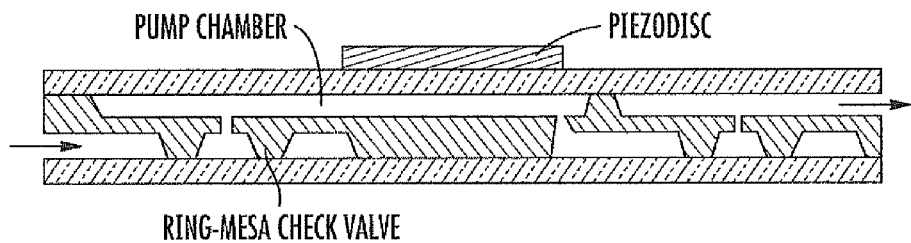
Figure 57B:
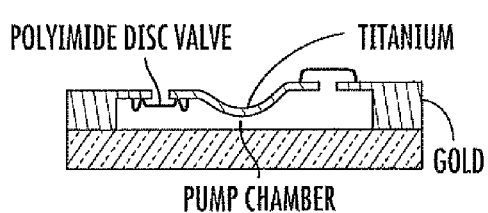
Figure 57C:
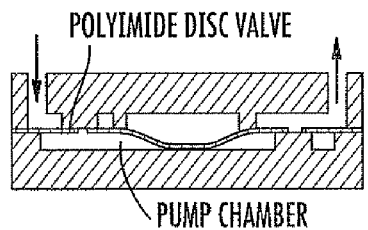
Figure 57D:
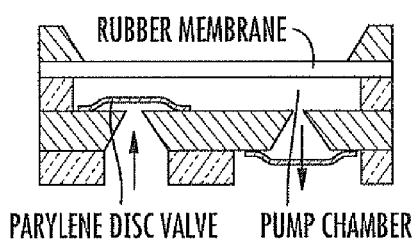
Figure 57E:
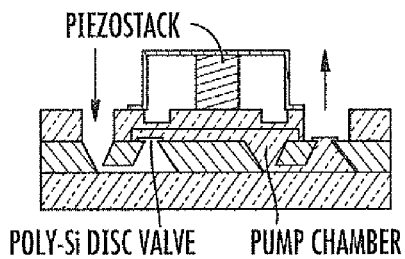
Figure 57F:
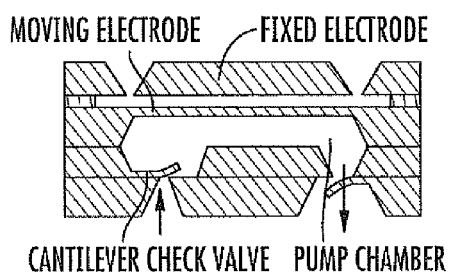
Figure 57G:
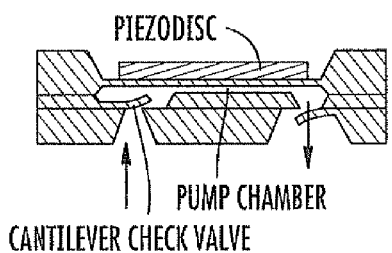
Figure 57H:
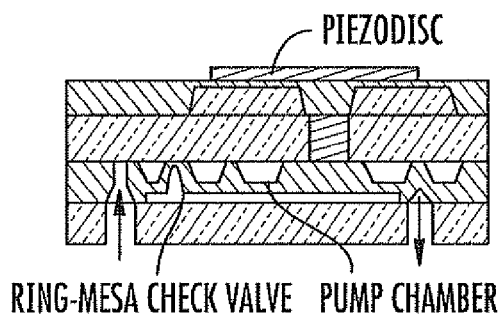
Figure 57I:
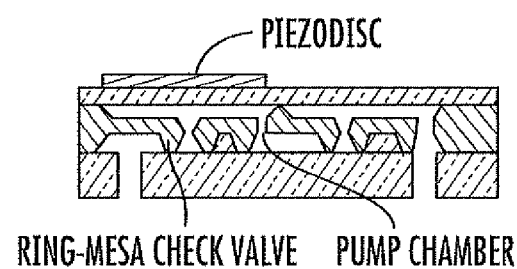
Figure 57J:
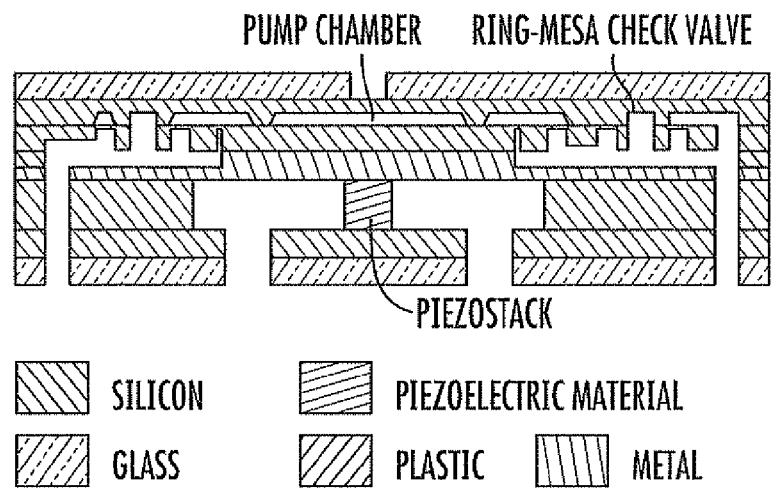
Figure 58:
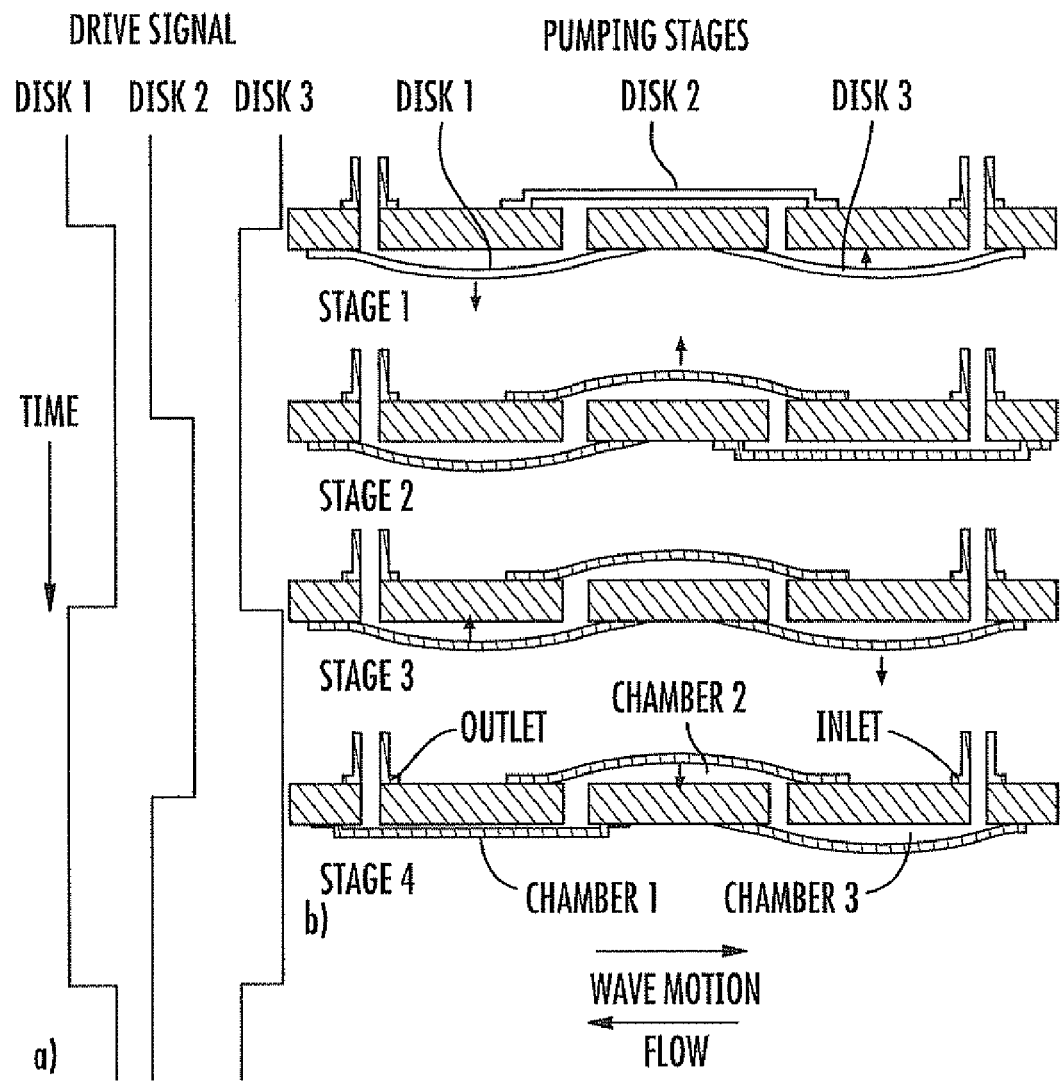

The first example of micropump that, on the other hand, exploits the piezoelectric effect as actuation principle was presented by Van Lintel, according to FIG. 55. Another example of micropump actuated piezoelectrically is the pump presented by Koch and illustrated in FIG. 56. The valves are of the cantilever type. The piezoelectric layer has been deposited on the top of the membrane using the screen-printing technology. The membrane, by oscillating, creates a chamber of variable volume. When the volume of the chamber increases, the liquid flows inside it through the inlet valve. When the volume of the chamber decreases the fluid is pushed outside through the outlet valve. FIG. 57 shows some examples of micropumps with various types of valves. Let us now briefly look at the peristaltic micropumps. Unlike micropumps with control valves, peristaltic micropumps typically do not need passive valves to control the flow. The operating principle of these systems is based upon the peristaltic movement of the pumping chambers, which pushes the fluid in the desired direction. FIG. 58 schematically shows the operating principle of a peristaltic micropump. Theoretically, peristaltic micropumps typically need at least three pumping chambers and three respective membranes.

This type of pump can easily be made given the absence of complex control valves. The biggest problem encountered in their operation is represented by the losses. Indeed, it only takes a small pressure difference between output and input to cause inverse flows in the unactuated state. In order to avoid this drawback it can be considered to introduce unidirectional valves in series, which allow such flows to be blocked. The strategies for optimizing this type of device aim at increasing the compression ratio and increasing the number of pumping chambers.

Figure 59:
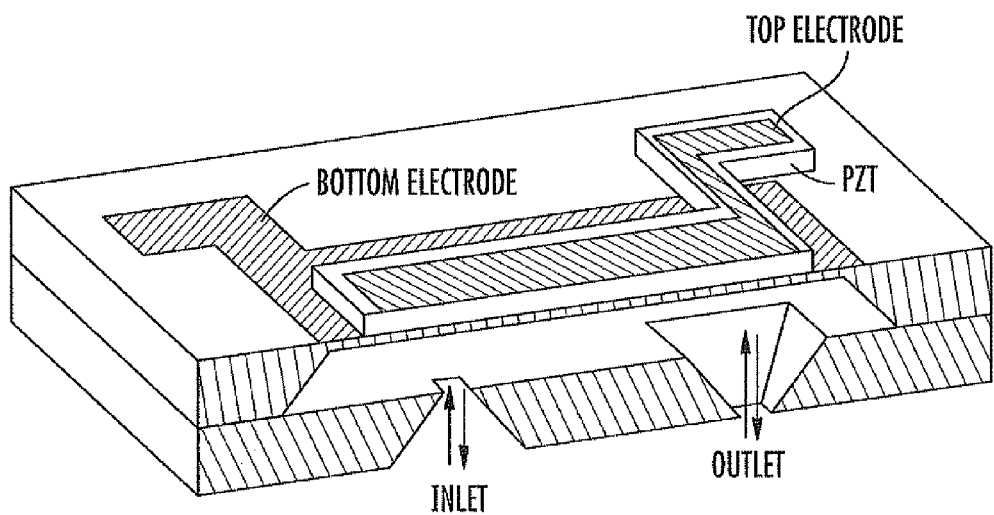
Figure 60A:
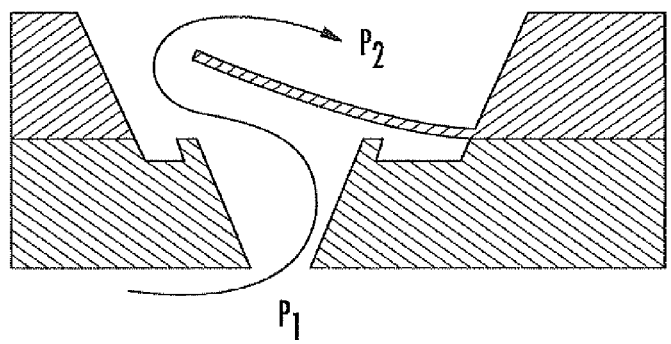
Figure 60B:
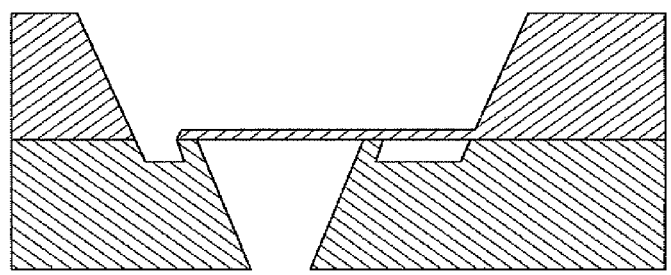

Micropumps with diffuser/nozzle valves are now described. The structure of these micropumps is similar to that of micropumps with control valves. The only difference is the use of ducts of the diffuser/nozzle type instead of the unidirectional valves, as shown in FIG. 59. These types of micropumps are much more sensitive to inverse flows than peristaltic pumps due to the low fluidic impedance of the ducts in both directions. For this reason, a unidirectional valve is very often used in series. The optimizations that they make are aimed at maximizing the volume displaced at every cycle and at improving the geometries of the nozzle/diffuser ducts.

Let us now look at the active and passive valve types. In literature there are different models of valves, from simple passive control valves up to complex electrostatically controlled diaphragm valves. The most important types of valves and the techniques for making them are briefly presented. A first division that can be made is between active and passive valves.

With regard to passive valves, they have no actuation mechanism. They are designed to ensure high flows in one direction and very low flows in the other. The main application is inside mechanically actuated micropumps, but they can also be used to close isocore reaction microchambers.

Hereafter the main models of passive valves are presented. Cantilever valves, shown in FIGS. 60A and 60B. Cantilever valves are regulation systems that allow the flow of a liquid, or of a gas, in one direction and prevent it in the other. A cantilever valve includes a thin flap resting on the top of a duct. The flap controls the flow through the valve.

When the pressure on the free side is below that on the opposite side ($p_2<p_1$), the cantilever (flap) bends upwards thus allowing the fluid to cross the duct, FIG. 60 A. If the pressure on the free side is above that on the opposite side ($p_2>p_1$) the flap is pressed against the duct and the flow is prevented from passing, FIG. 60 B.

Figure 61:
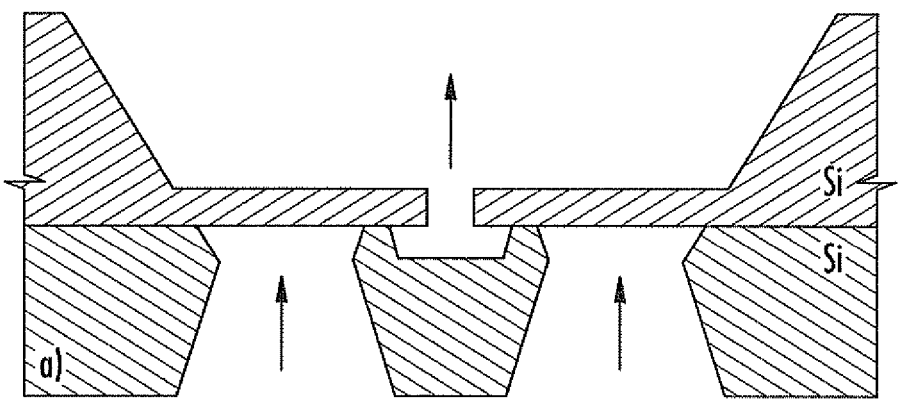
Figure 62:
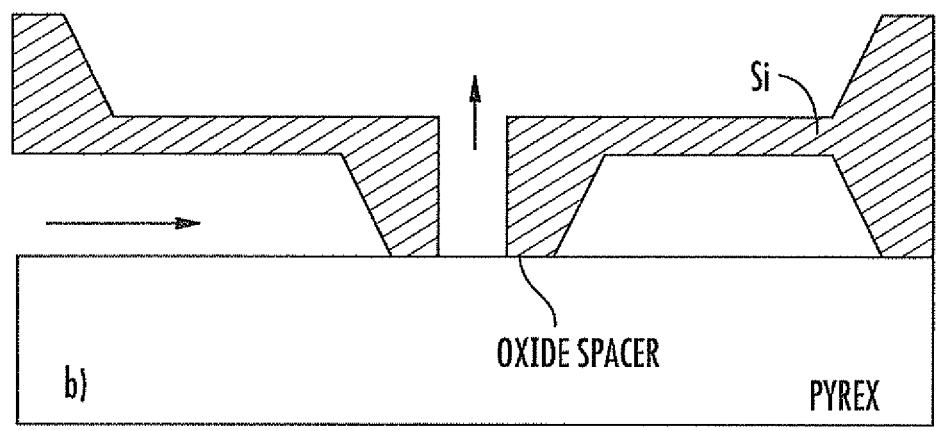

Diaphragm valves, on the other hand, use a diaphragm to control the flow. The operating principle is identical to cantilever valves. The diaphragm is positioned on the top of the inlet duct, as shown in FIG. 61.

When the flow has sufficient kinetic energy, it lifts the diaphragm and manages to cross the valve. An edge is built on the diaphragm. This element stops the flow, since when at rest, it rests upon the layer beneath. The passage of the fluid occurs when it runs inside the valve and it has sufficient kinetic energy to lift the diaphragm. When the membrane includes the edge there is a situation like shown in FIG. 62.

Figure 63A:
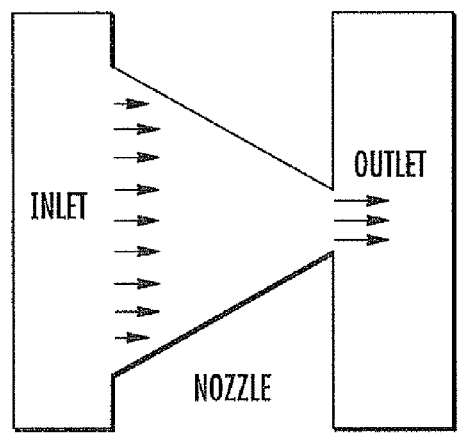
Figure 63B:
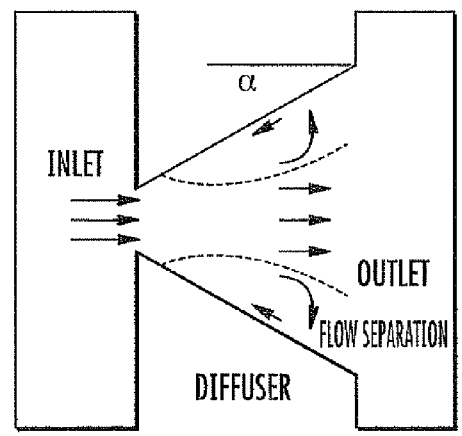

The diffuser/nozzle valves are very different to those presented earlier and they are illustrated in FIG. 63. The purpose of this fourth example is to make and prototype a piezoelectric micropump made using PCB technology, includes the tank for storing the NaBH4 solution and the corresponding by-products of the production of hydrogen.

The piezoelectric actuation allows the NaBH4 solution to be sent to the reaction chamber for the production of hydrogen gas to be sent to the fuel cells. The micropump includes, on the inside, a tank for storing the "fresh" solution still containing hydrogen in liquid form and a tank for storing the liquid by-products of the hydrolysis reaction with which the hydrogen is produced.

A piezoelectric micropump ensures the best performance in terms of flow rate and of maximum back pressure. It is a piezoelectrically actuated micropump with passive unidirectional control valves.

Figure 64A:
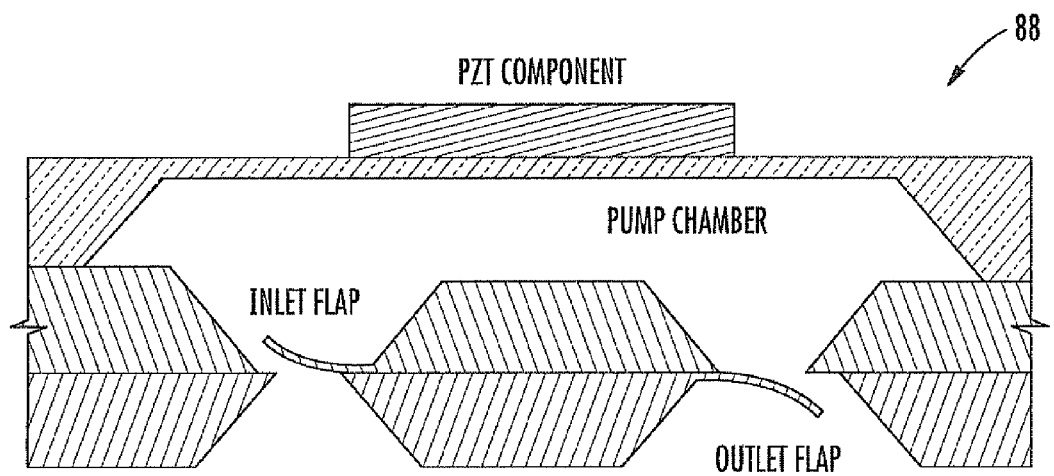

FIG. 64A shows a schematic section view of a piezoelectric micropump with passive and unidirectional control valves. The pumping chamber is defined on top by the membrane and at the bottom by the two flaps that separate it from the inlet and outlet ducts. The piezoelectric element is fixed to form a unit with the upper face of the membrane and is voltage and frequency driven. In this way it is possible to obtain different deflection values of the membrane and therefore different flow rate values.

The main parts of the micropump that are examined hereafter are the following: a membrane 90; a piezoelectric element 92; a pumping chamber 94; cantilever valves 96; and inlet and outlet ducts 98.

The membrane 90 is one of the fundamental elements of the micropump. The role of the membrane is to provide the moment for the fluid to overcome the pressure drop that it may encounter along its path, by deflecting.

Figure 64B:
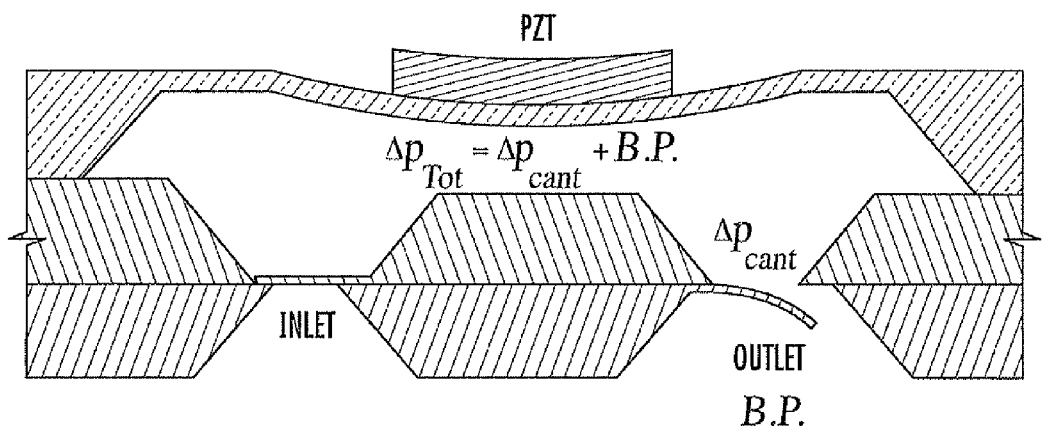

In the case under examination the pressure drop is represented by the sum of the load losses that occur at the cantilever output valve and by the back pressure that may characterize the pump during operation, as also shown in FIG. 64B.

$$\Delta p_{Tot} = \Delta p_{cont} + B.P.$$

The deflection of the membrane is caused by the deformation of the piezoelectric element fixed onto it, following the application of a voltage. Knowing the maximum deflection at the center of the membrane, it is possible to work out the volume of fluid displaced at each cycle, and consequently, knowing the working frequency, it is possible to calculate the flow rate. From the theory of deflection of thin plates, for a circular plate with a built-in joint condition on the outer edge, the displacements of the points situated on a radius of the membrane, as the radius thereof varies, are related to the maximum deflection value in the following way:

$$d(r) = d_{max}\left[1 - \left(\frac{r}{R}\right)^2\right]^2$$

In the above expression r represents the radial distance from the center of the membrane, and R represents the outer radius thereof. The variation in volume $\Delta V$ of the fluid domain, generated by the bending of the membrane, is given by the following expression:

$$\Delta V = \int_0^{2\pi}\int_0^R d_{max}\left[1 - \left(\frac{r}{R}\right)^2\right]^2 r\, dr\, d\varphi = \frac{\pi}{3}d_{max}R^2$$

The flow rate Q generated, function of the vibration frequency f of the membrane, is finally equal to:

$$Q = \Delta V \cdot f$$

The size of the membrane comes from the following considerations:

It is desired to make a membrane that is large enough to ensure that, despite the small deflections that the piezoelectric actuator manages to give it, there are large enough variations in volume to generate an adequate flow rate.

It is desirable to make a membrane that is sufficiently small so that the piezoelectric actuator, with reasonable voltages, manages to apply a sufficient force to overcome the pressure drops that the fluid may encounter along its path.

The size of the membrane, and therefore of the micropump and of the entire fuel supply block, should be compatible with that of the monolithic system for producing energy.

With regard to the piezoelectric element, it should be remembered that when a dielectric material is subjected to an electric field, the positive and negative charges inside an atom move. In this way a tiny electric dipole is created. In a linear material, the dipole moment per unit volume P that is created is linked to the electric field and from the relationship:

$$\vec{P} = \chi \cdot \vec{E} = (\varepsilon_r - 1)\varepsilon_0 \cdot \vec{E} = (\varepsilon_r - 1)\varepsilon_0 \cdot \frac{\vec{E_0}}{\varepsilon_r}$$

In the above expression the following symbols are used:
$\chi$ is the electric susceptibility;
$\varepsilon_r$ is the relative dielectric constant of the medium under examination; and
$\varepsilon_0$ is the dielectric constant of the vacuum equal to $8.85 \cdot 10^{-12}$ F m$^{-1}$.

The electric displacement field for a given material is represented as shown in the following expression:

$$\vec{D} = \varepsilon_0 \cdot \vec{E} + \vec{P} = \varepsilon_0 \varepsilon_r \cdot \vec{E} = \varepsilon \cdot \vec{E}$$

In matrix notation, for a linear cubic crystal like silicon, the electric induction is written:

$$\begin{pmatrix} D_x \\ D_y \\ D_z \end{pmatrix} = \begin{bmatrix} \varepsilon_{11} & 0 & 0 \\ 0 & \varepsilon_{11} & 0 \\ 0 & 0 & \varepsilon_{33} \end{bmatrix} \cdot \begin{pmatrix} E_x \\ E_y \\ E_z \end{pmatrix}$$

The values of the dielectric constant for two common piezoelectric materials, PZT and ZnO, are shown in the following table:

TABLE 3

Dielectric constant for two common piezoelectric materials.

| MATERIAL | E11 | E33 | UNITÀ |
|---|---|---|---|
| PZT-5A | 1730 | 1700 | $\varepsilon_0$ |
| PZT-5H | 3130 | 3400 | $\varepsilon_0$ |
| ZnO | 8.3 | 8.8 | $\varepsilon_0$ |

Figure 65:
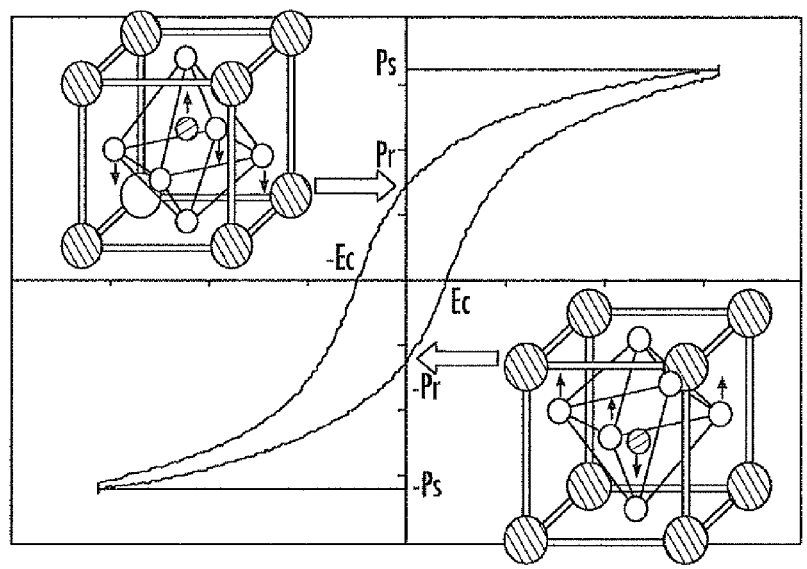

This indicates that the material is able to support a dipole moment even when E is zero. A ferroelectric material can be defined as a polar crystal with a permanent dipole moment, the direction of which can be altered by the electric field applied. A ferroelectric material that has not been exposed to strong electric fields is unpolarized, as illustrated in FIG. 65. When a slight electric field is applied to such a material, the polarization increases linearly. The slope of the curve in this portion is the electrical susceptibility $\chi$ defined earlier. When the electric field reaches higher values, there is a saturation of the polarization curve P according to the electric field E. If the electric field is taken back to zero the material has a residual polarization. In this case, the material has been polarized. A material is piezoelectric when the application of an electric field results in a deformation of the material. This is the case of all materials that show a spontaneous electrical polarization without application of electric fields. Therefore, ferroelectric materials are piezoelectric. Other crystalline materials that are not ferroelectric can be piezoelectric. Examples are quartz, zinc oxide ZnO, and cadmium sulphate CdS.

Figure 66:
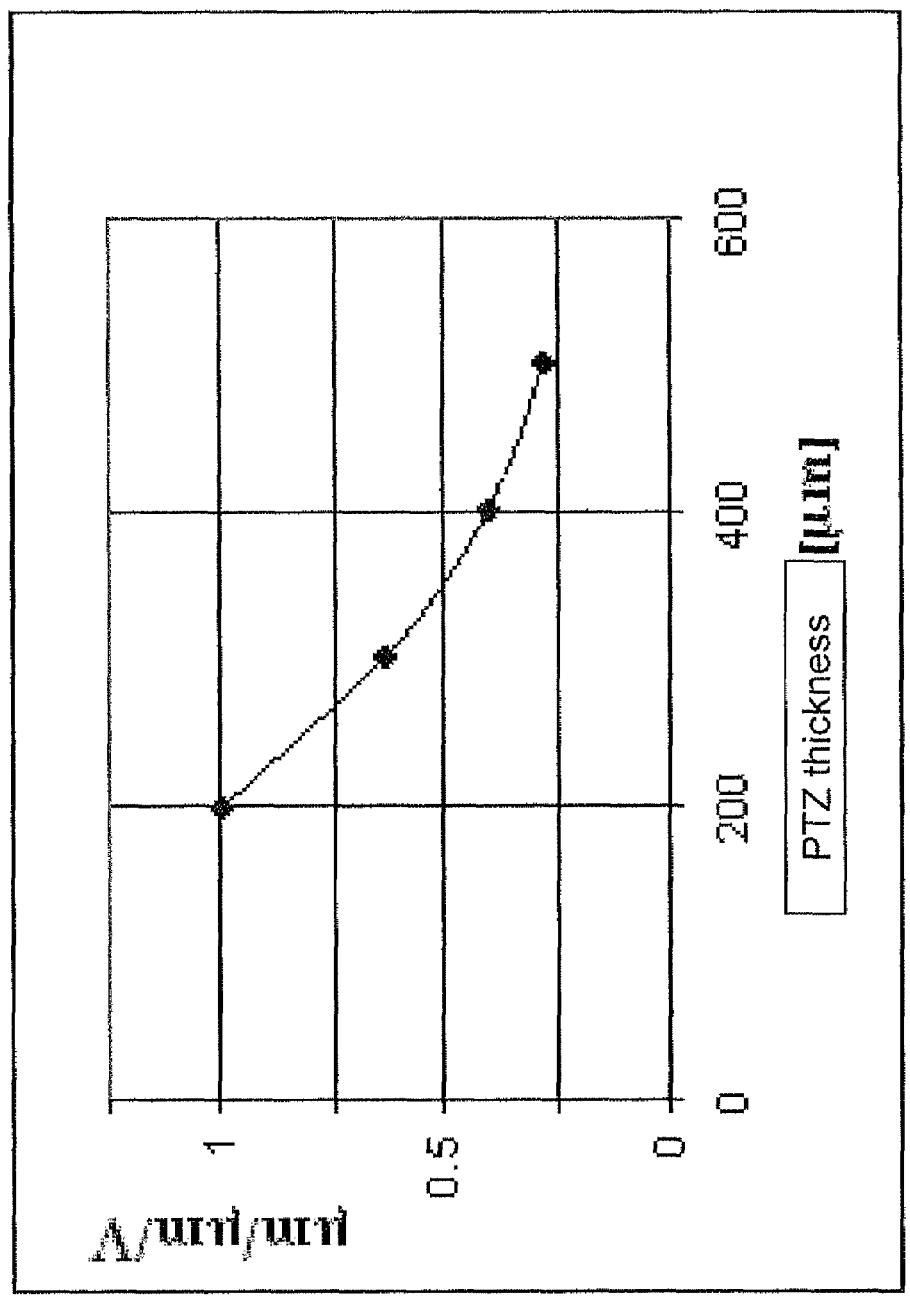
Figure 67C:
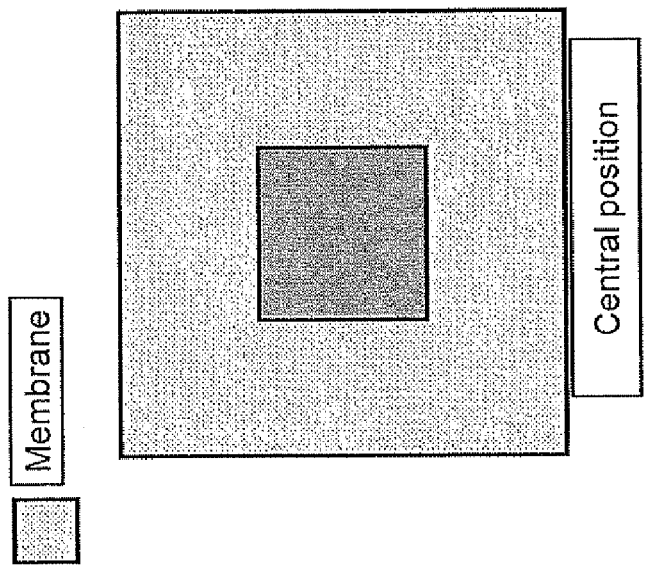
Figure 67B:
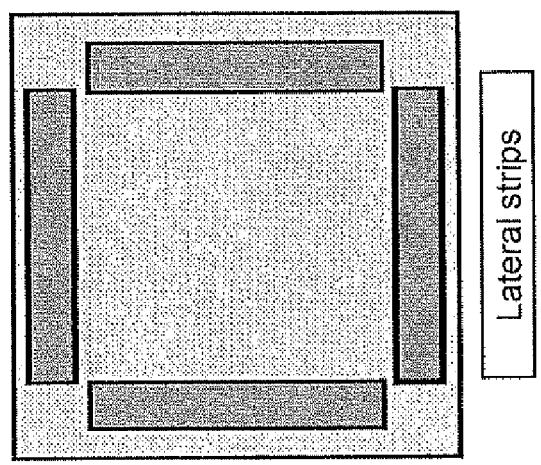
Figure 67A:
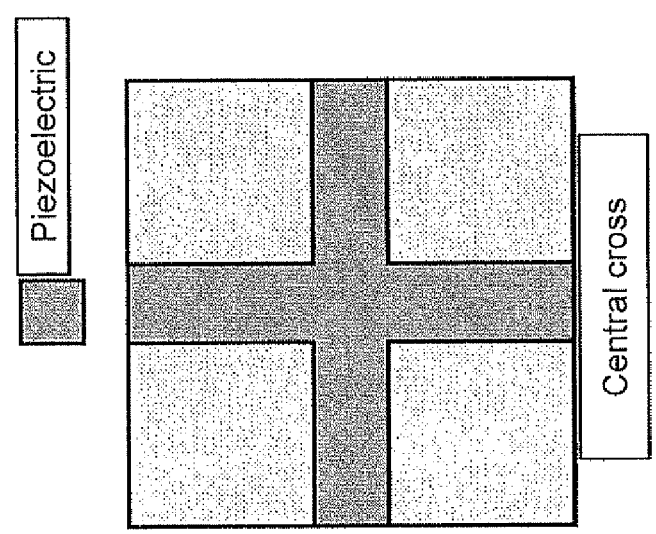

Literature tells us that as the thickness of the piezoelectric decreases, increasing deflections are obtained, as shown in the graph of FIG. 66. Moreover, it can be seen from the literature on the subject that, for an equal surface, the best arrangement of the piezoelectric on the membrane, in terms of deflection obtained, is the centred one (FIG. 67A), which allows double the displacement values compared to the others (FIGS. 67B and 67C).

Figure 68:
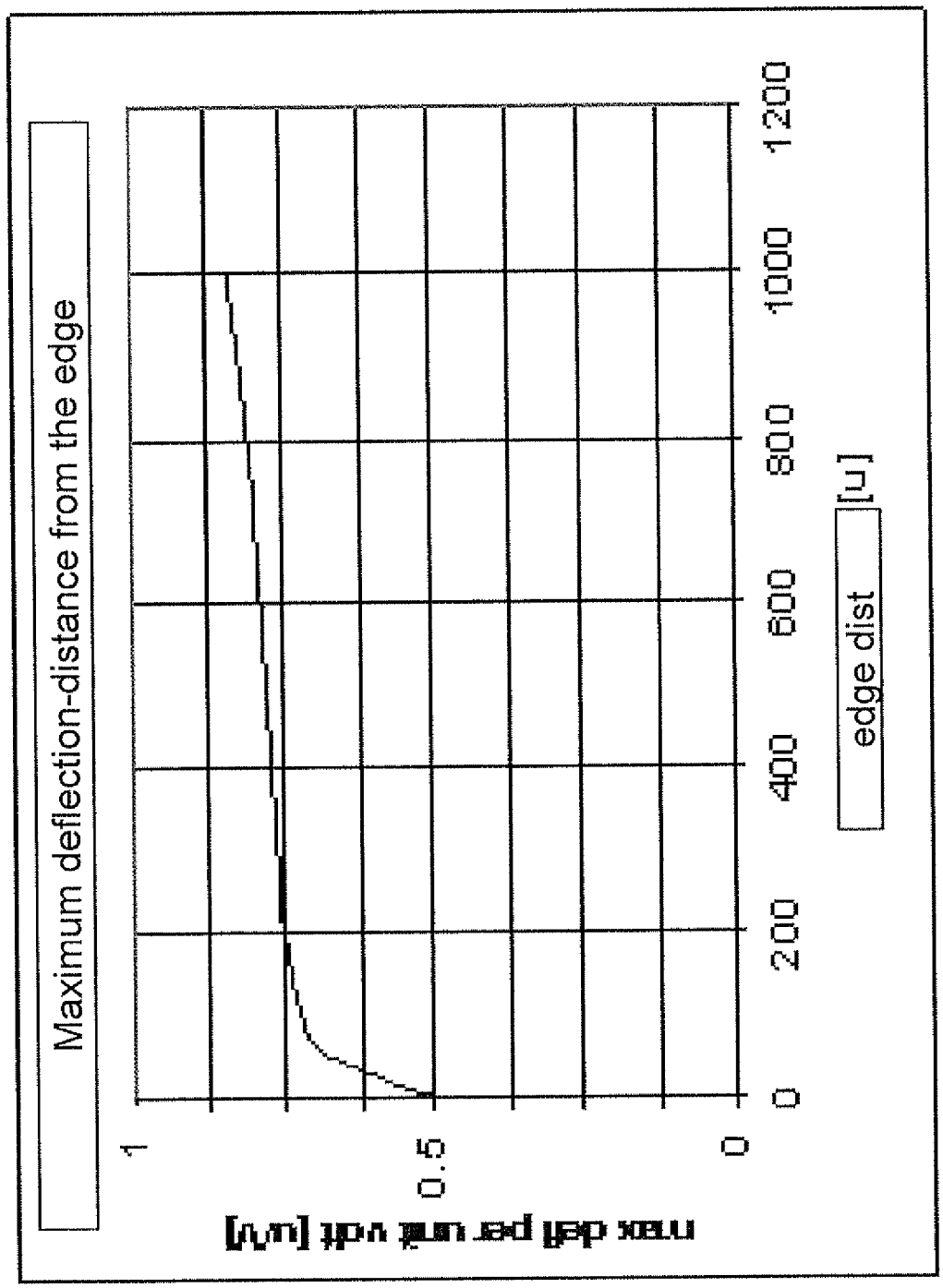
FIG. 68 is a graph that illustrates the deflection of a piezoelectric membrane.

The increase in distance of the piezoelectric element from the edges of the membrane makes the maximum deflection of the center of the membrane itself increase, as shown in the graph of FIG. 68.

On the other hand, with regard to the pumping chamber, it has been assumed that the equations that regulate the motion of the fluids at microscopic level are the same as those that regulate the motion of the fluids at the macroscopic level. This assumption can be made if in the microfluidic problem under examination, the theory of continuity of the fluid continues to apply. The study of fluid mechanics at the macroscopic level, indeed, starts from the fundamental assumption that the fluid can be treated as a continuum. It is presumed that all of the amounts of interest like the density, speed and pressure are defined by points and continuously vary from point to point in the fluid domain. The pumping chamber includes the fluid upon which the membrane acts. The volume of the pumping chamber is cylinder-shaped.

Figure 69:
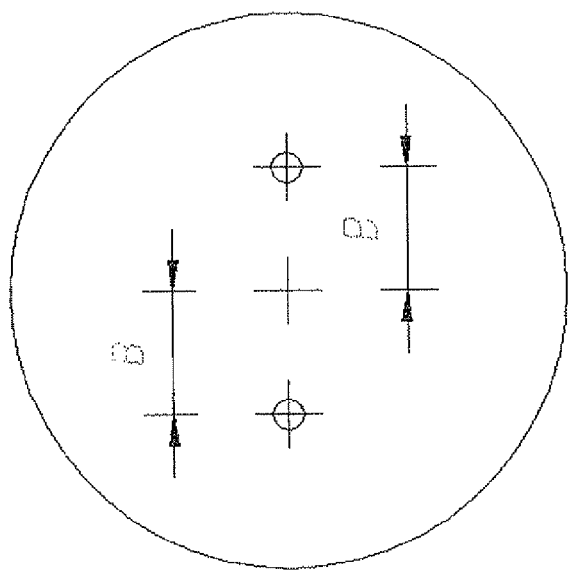
FIGS. 69 to 71 are schematic views of geometric portions of a piezoelectric micro pump incorporated in the system of the invention.
Figure 70:
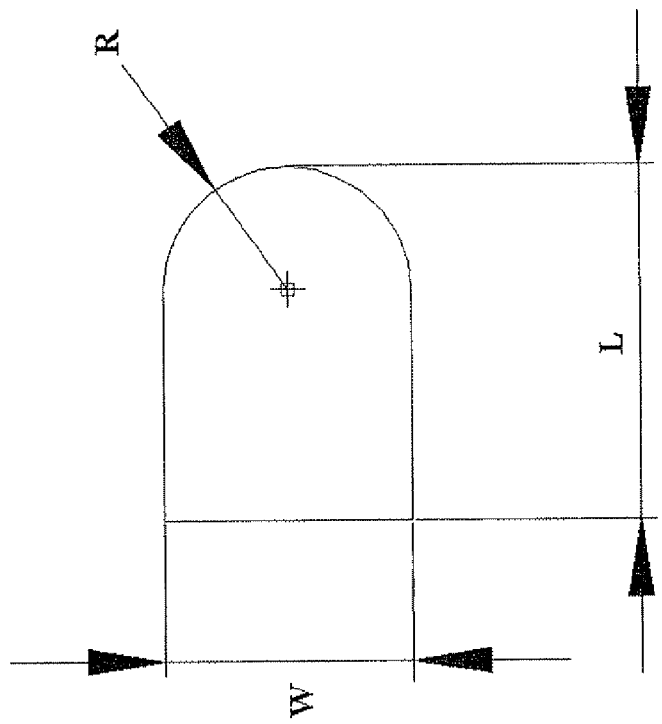

The assumed value for the sizing of the thickness of the cantilever valves was decided based upon the following considerations, treated with the help of FIG. 69. For a cantilevered beam of length L, with constant rectangular section along the axis x, of base w and height h, subjected to a load per unit length pw acting in direction z, the maximum deflection occurs at the free extremity and the following holds true:

$$\delta_{max} = \frac{3}{2E} \frac{L^4}{h^3} p$$

To obtain an increase in deflection after having fixed the planar size, therefore, it is generally necessary to decrease the thickness of the valves. The position of the inlet and outlet ducts with respect to the pumping chamber follows constructive considerations, like the geometry of the pumping chamber of FIG. 70. The inlet duct of the micropump connects the bottom of the tank, including the NaBH4 solution, with the pumping chamber and is interrupted by the cantilever valve. It has been thought of to keep the section of the duct constant and to make it in a circular shape. In this way the valve is unable to completely close the inlet of the fluid into the pumping chamber ensuring the priming of the pump. During the step in which the fluid is expelled from the pumping chamber, the localised loss consisting of the valve, which can now be seen as a gate valve, ensures a much smaller flow than that which occurs simultaneously through the outlet valve. The outlet duct of the micropump connects the pumping chamber to the reactor and is interrupted by the outlet valve.

The tank is the part intended for including the NaBH4 solution and the relative by-products (borax) of the production of hydrogen. The solution used for the production of hydrogen has a high energy density (2500 Wh/l), is chemically stable for periods of over 6 months, and is not flammable. Such characteristics make it particularly suitable for making portable systems for producing electric energy. The size of the tank, and therefore the amount of solution stored, are established based upon the following considerations:

figures show some times of the characterization of the tank with integrated piezoelectric micropump.

Through the graduation of the tube connected to the outlet of the micropump it was possible, with the help of a chronometer, to establish the average flow rate processed by the prototype made. Numerous microfluidic characterizations were carried out on the prototypes made. The following table shows the values determined experimentally during the microfluidic testing of the system in object. Each notch of the delivery tube of the micropump corresponds to 0.03125 ml.

TABLE 4

Results of the experimental tests.

| TIME [s] | CUMULATIVE TIME [s] | NOTCH N° | CUMULATIVE VOLUME [ml] | FLOW RATE [ml/min] |
|---|---|---|---|---|
| 6.6 | 6, 6 | 1 | 0.0313 | 0.2841 |
| 3.3 | 9, 9 | 2 | 0.0625 | 0.5682 |
| 12.1 | 22 | 3 | 0.0938 | 0.2557 |
| 17.2 | 39, 2 | 4 | 0.1250 | 0.1913 |
| 25.9 | 65, 1 | 5 | 0.1563 | 0.1440 |

Figure 71:
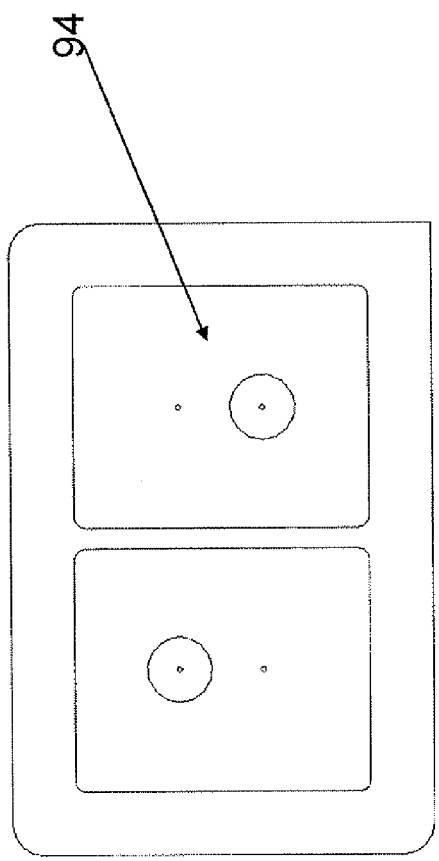
Figure 72:
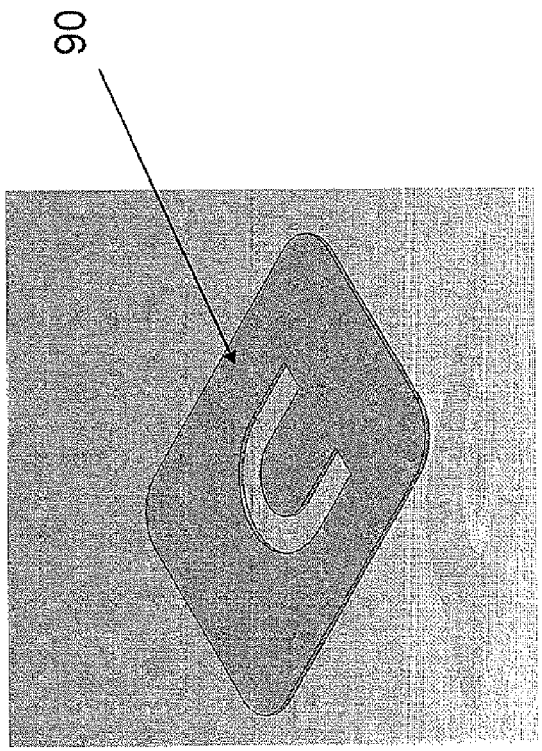
FIGS. 72 to 81 are exploded schematic perspective views of a tank and of a micro pump of the system according to the invention obtained through a CAD simulation.
Figure 73:
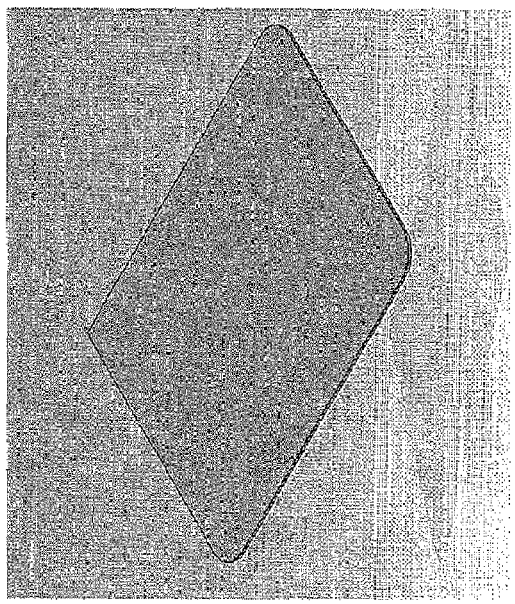
Figure 74:
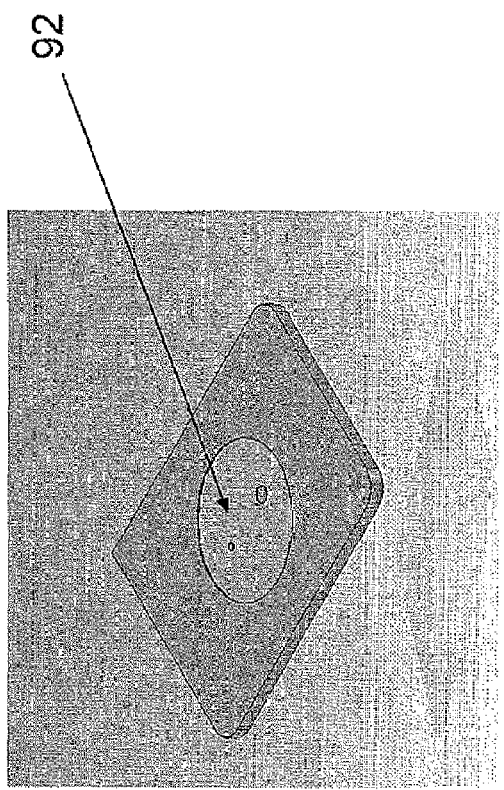
Figure 75:
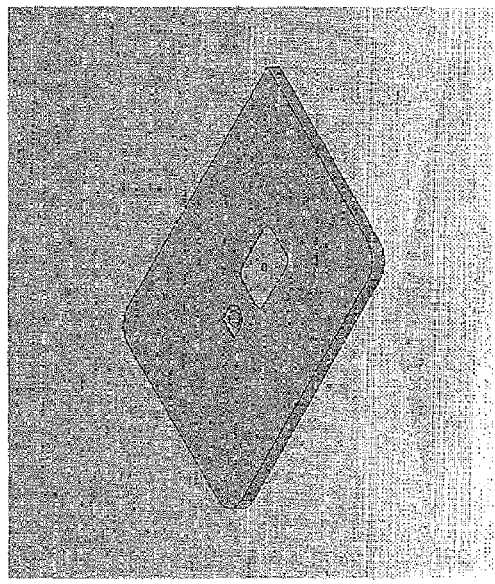
Figure 76:
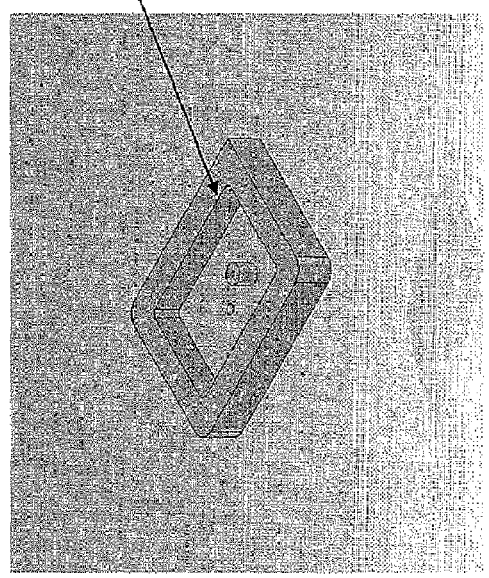
Figure 77:
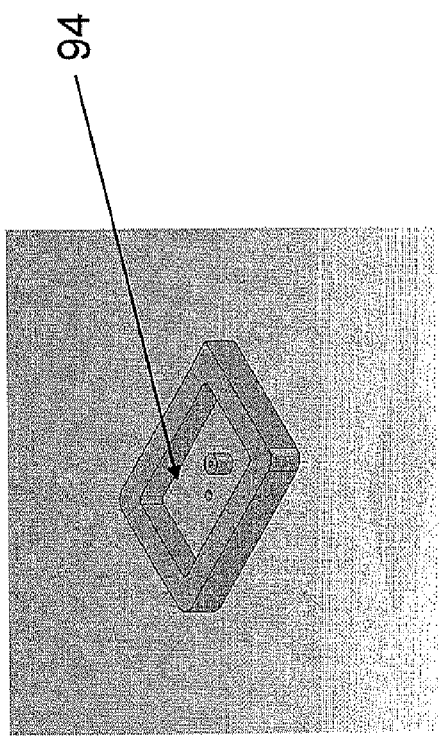
Figure 78:
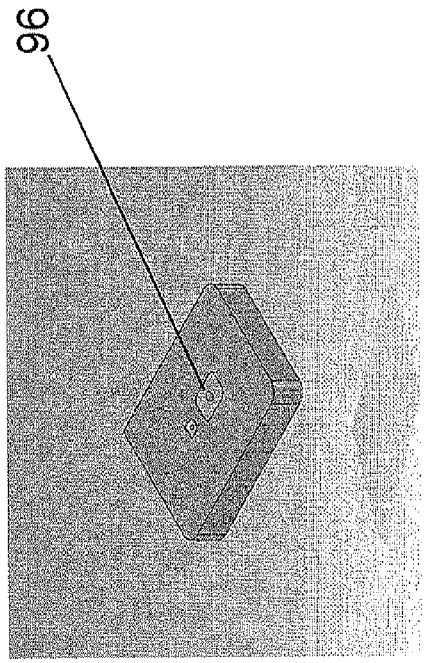
Figure 79:
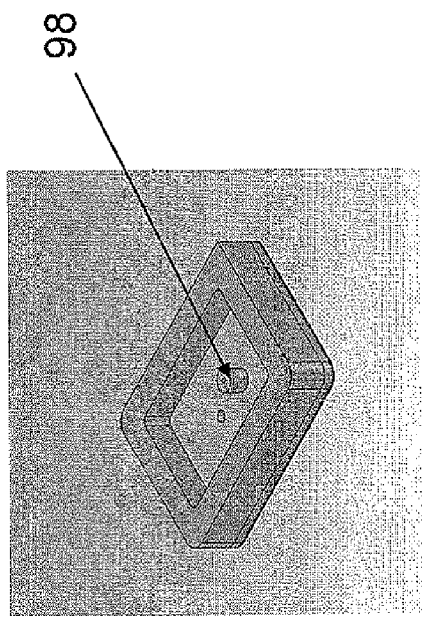
Figure 80:
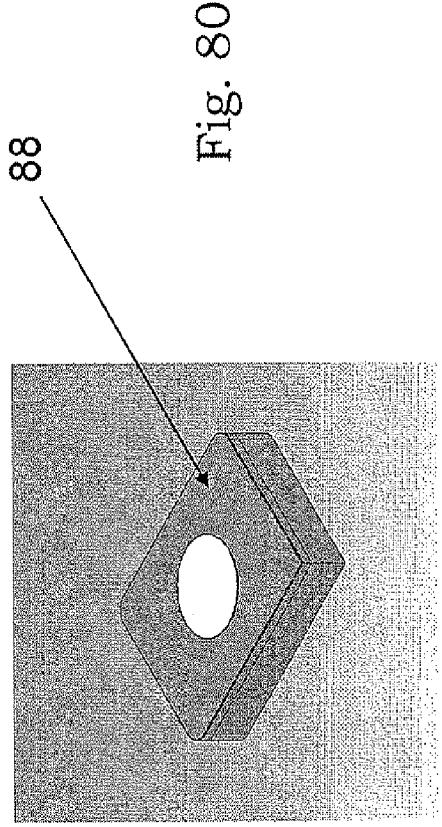
Figure 81:
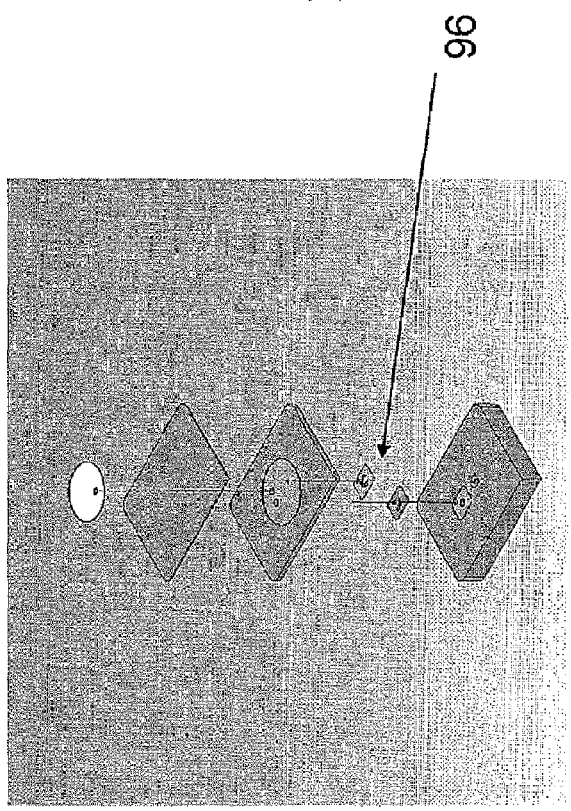
Figure 82:
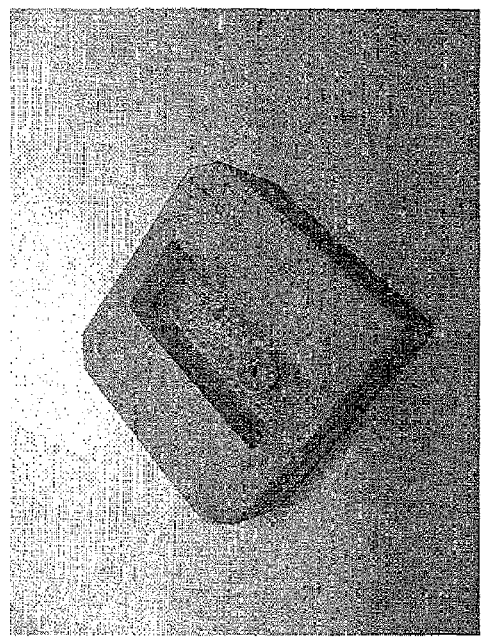
FIGS. 82 to 92 are photographic images of parts of a system made according to the invention with a tank and a micro pump.
Figure 83:
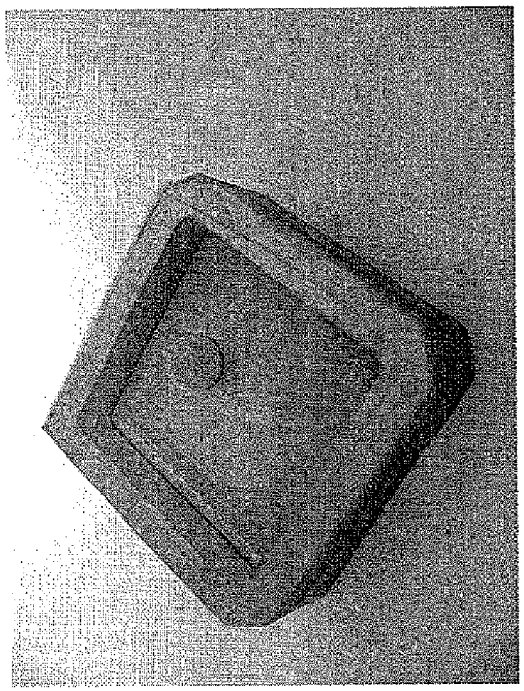
Figure 84:
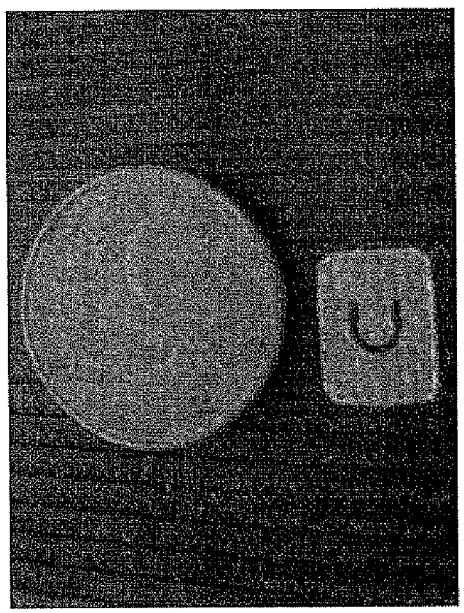
Figure 85:
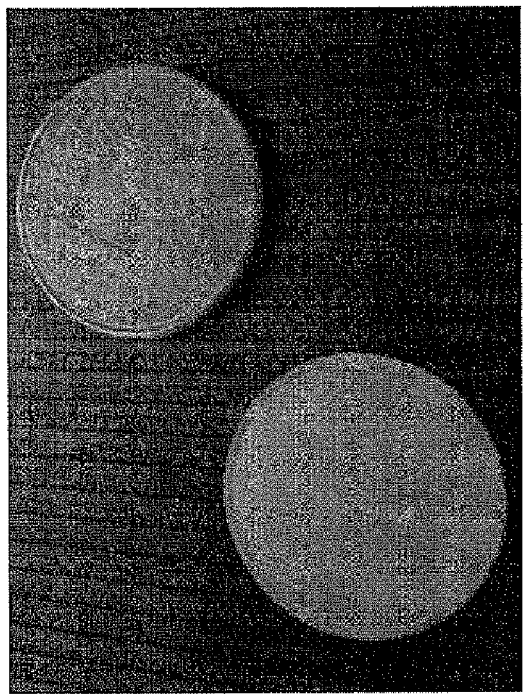
Figure 86:
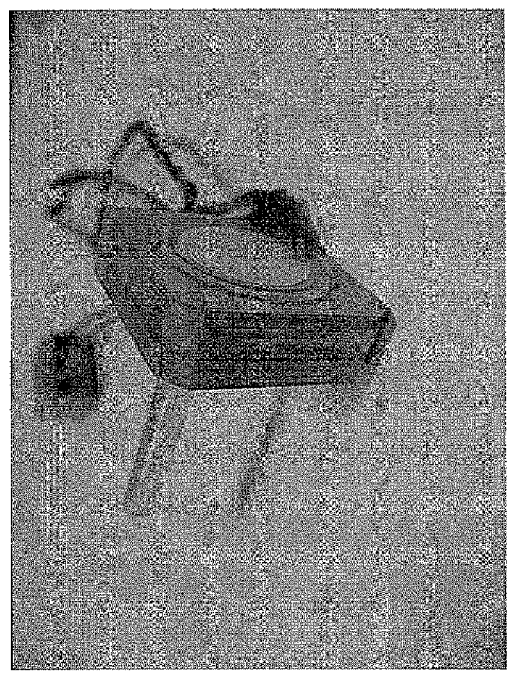
Figure 87:
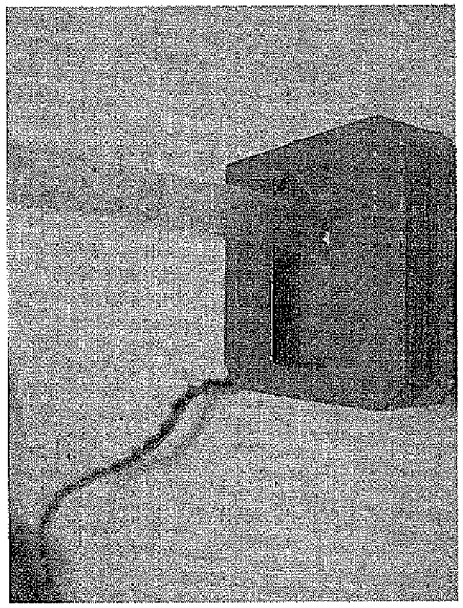
Figure 88:
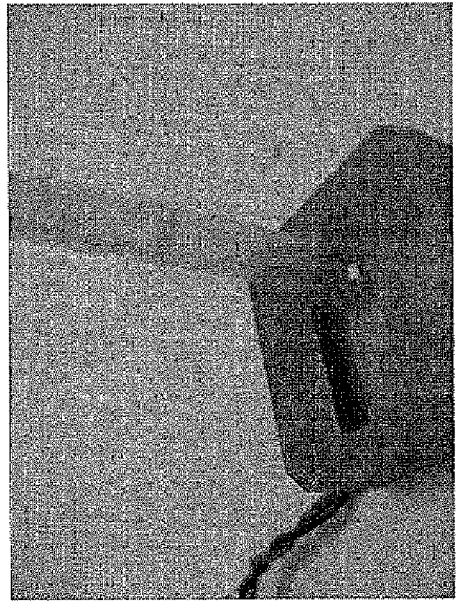
Figure 89:
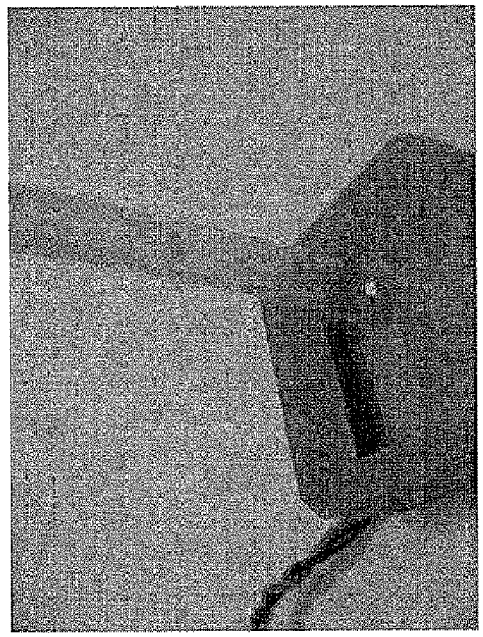
Figure 90:
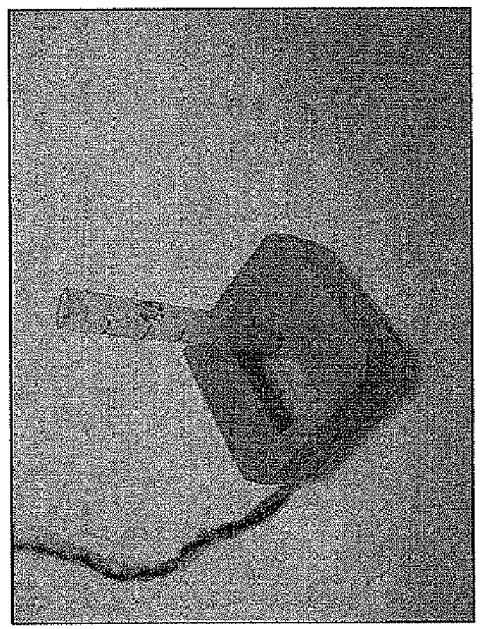

The greater the volume of solution contained in the tank, the greater the time for which it may be possible to produce hydrogen and therefore electric power;

The system arises as a portable application for producing electric energy. It is therefore important to consider the aspect concerning the bulk of the system that should be minimised as much as possible; and The tank is structured with two tanks of equal volume, the first for including the fresh NaBH4 solution, the second for including the spent solution, as schematically illustrated in FIG. 71.

Now, with particular reference to the embodiments of FIGS. 72 to 91, an embodiment obtained through CAD of the tank with an integrated micro pump in PCB technology is illustrated. The CAD exploits Solid Edge modelling software.

The manufacture and subsequent prototyping were carried out by the applicant, given the symmetry of the system, on just half a tank, in other words, on a system made up of a single basin and a micropump.

FIGS. 82 to 91 show images depicting the individual parts of the system, the assembled system and exploded views thereof. The choice of PCB technology has allowed the individual parts that make up the prototype of the tank with an integrated micropump, the object of the present application to be made in a short time and at low cost.

The rapidity of obtaining a complete prototype, which is an intrinsic feature of fast prototyping, has made it possible to evaluate, in real time, through experimental tests carried out on the prototypes obtained, how good the technical choices made during the manufacturing step have proven to be.

During the manufacturing step of the tank with integrated micropump, through the use of unconventional rapid prototyping techniques on Printed Circuit Boards, all of the individual parts that make up the prototype were created. The machining of all of the parts making up the prototype was carried out using LPKF ProtoMat® S100.

Hereafter the images depicting the prototype of the tank with an integrated piezoelectric micropump are shown.

Characterization of the Devised Prototype

Figure 92:
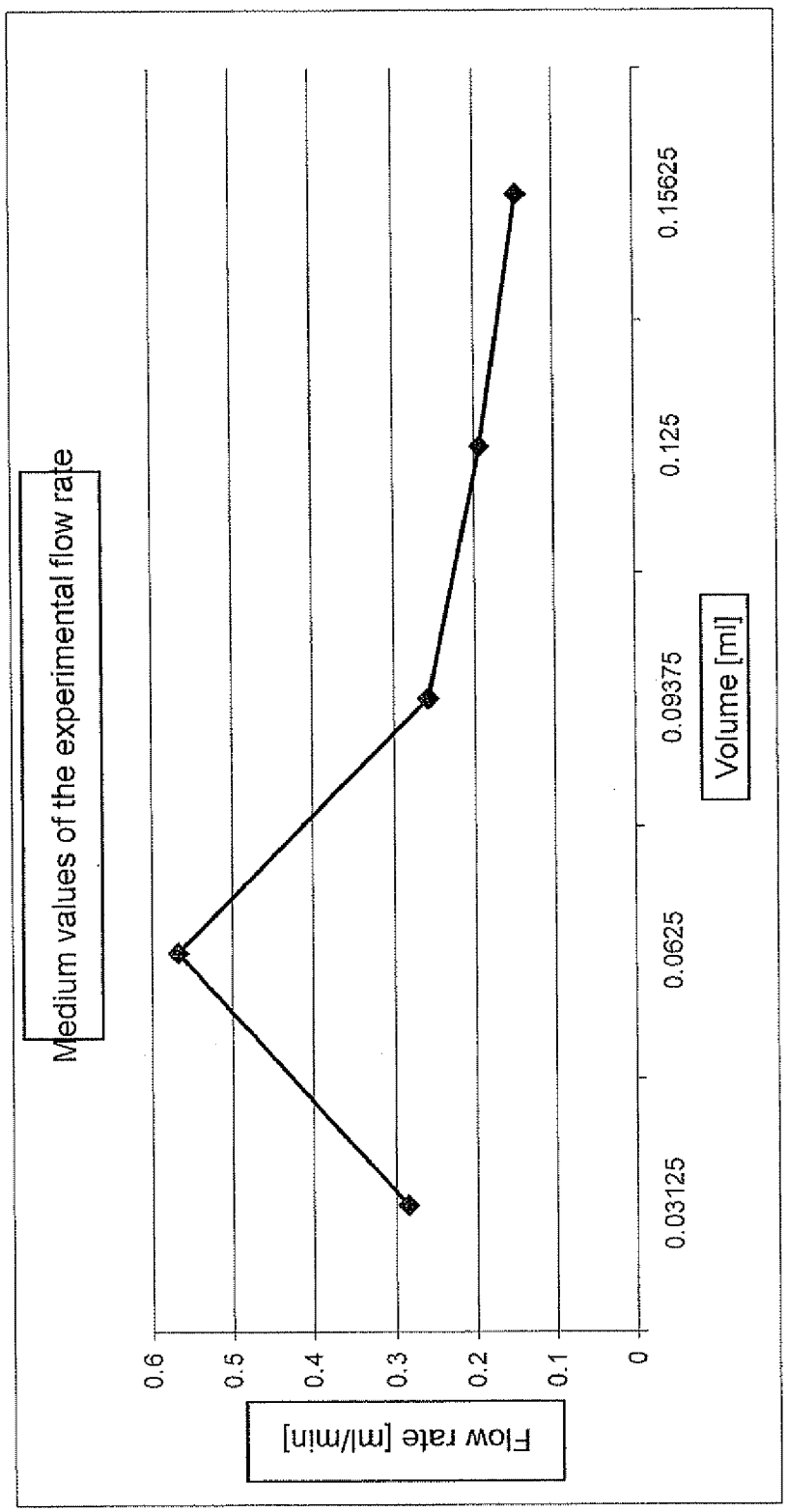

To test each individual prototype obtained we proceeded to measure the flow rate of fluid processed according to the values of the voltage and of the control frequency of the piezoelectric, made to vary through a special apparatus. The FIGS. 92 to 96 show the data shown in the above table III. FIG. 92 shows the development of the flow rate as the volume of fluid processed varies. From the graph it can be seen that, after an initial step for filling the pumping chamber, the peak of the detected values is reached, equal to 0.57 ml/min. After having reached the peak, the flow rate begins to decrease due to the increasing weight of the column of fluid that accumulates in the outlet tube and therefore, due to the greater pressure that the fluid itself experiences downstream of the outlet valve.

Figure 93:
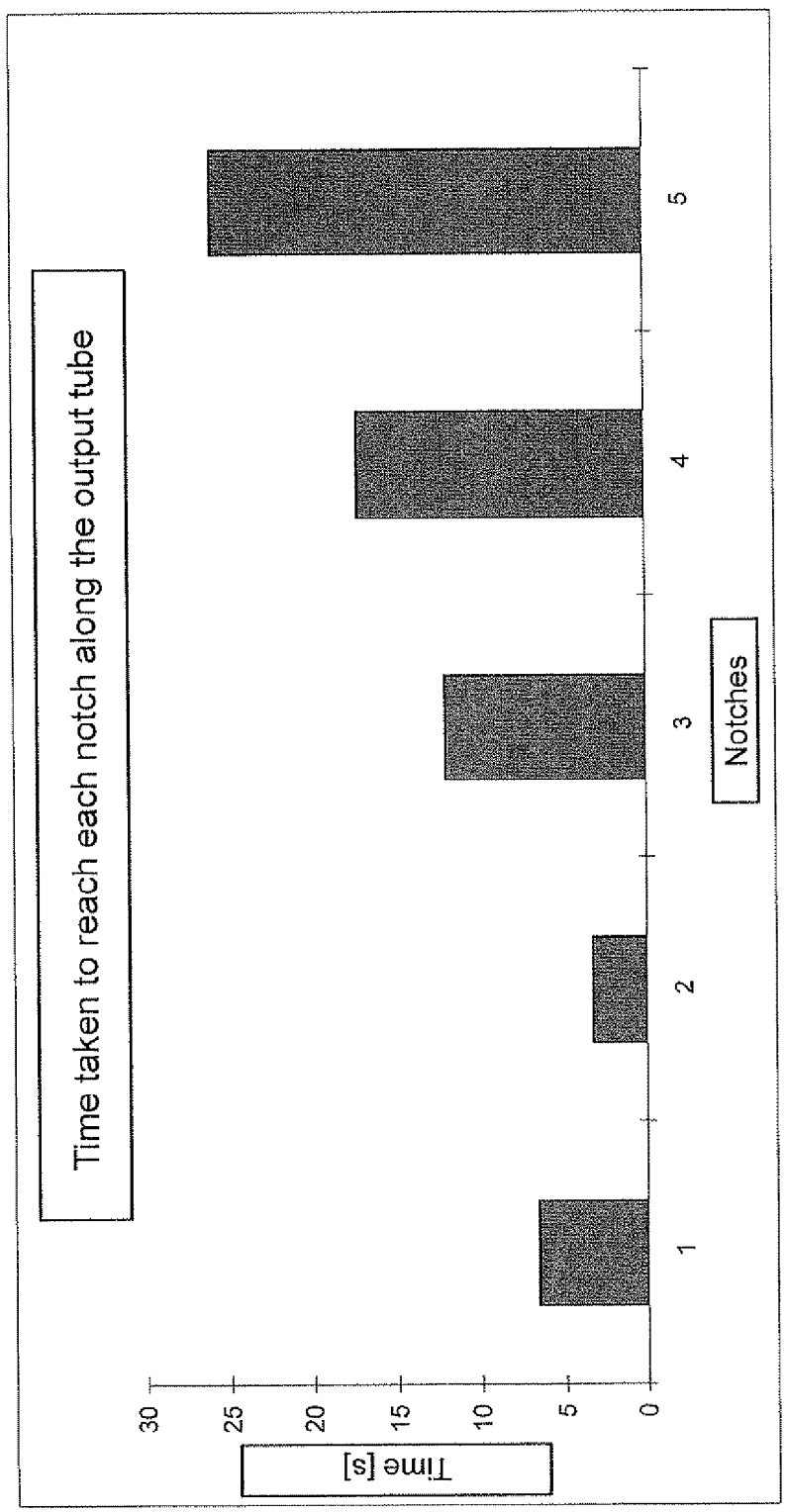
Figure 94:
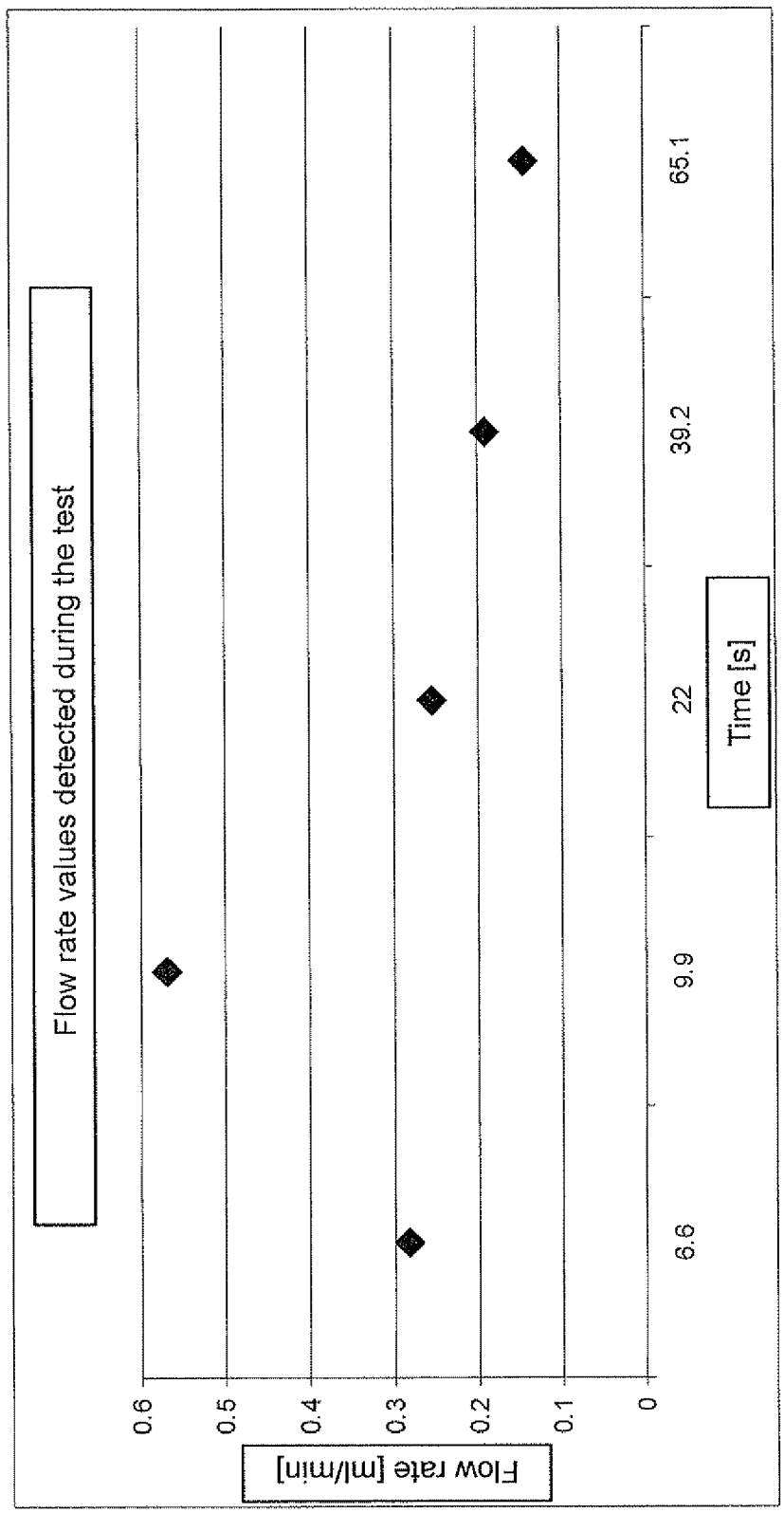
Figure 95:
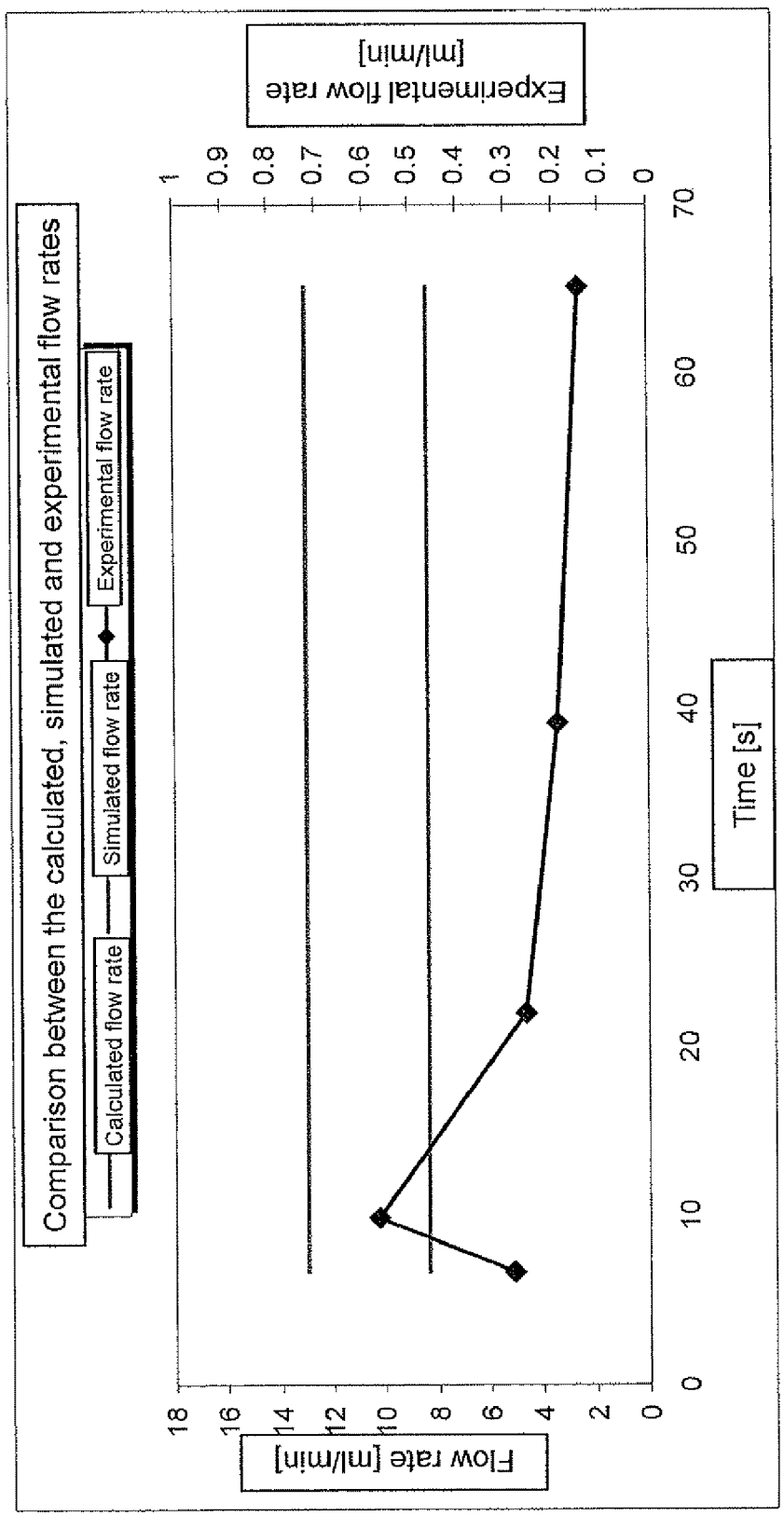

The graph shown in FIG. 93 highlights the time taken by the fluid to reach each notch along the graduated tube. After the initial time, for completing the priming of the pump and to reach the first notch, at the second notch the minimum value of time taken is obtained, at the maximum flow rate value. From notch 3 to notch 5 there is an increase in the time taken for the aforementioned fluidodynamic reasons. FIG. 94 shows the flow rate values detected during the test, according to the cumulative times. A comparison between the calculated, simulated and experimental values of the flow rates is shown in FIG. 95.

Some electrical measurements were also taken, suitable for detecting the power absorbed by the micropump. Through the use of a digital oscilloscope the electrical magnitudes of interest were detected, i.e.: voltage; current; and instantaneous power.

The series of measurements made on the prototype of the tank with integrated piezoelectric micropump was carried out during the normal operation of the system, thus with the presence of water flowing inside the micropump, and for the maximum control values of the piezoelectric, i.e.: 240 Vpp for the voltage applied to the electrodes of the piezoelectric element; and 60 Hz of the control frequency.

Figure 96:
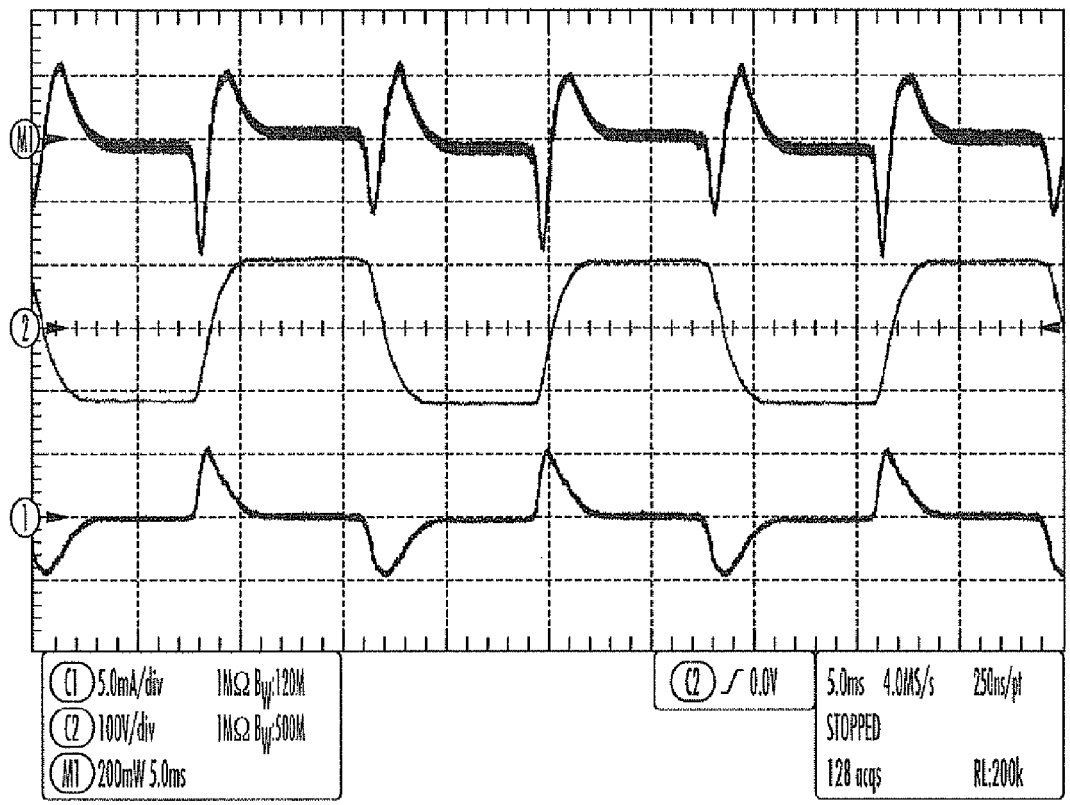

FIG. 96 shows the results of the test provided by the oscilloscope. From the test the following effective values for the voltage and the current were obtained, detected on the electrodes of the piezoelectric element: Ieff=1.811 mA; and Veff=102.9 V.

Through the effective values of the voltage and of the current it is possible to work out the apparent power A absorbed by the system, defined as:

$$A = V_{eff} \cdot I_{eff}$$

The apparent power value thus calculated is: A=186 mVA, whereas maximum instantaneous absorption values of 495 mW were encountered. There was found to be capacitative electrical behavior on the piezoelectric element.

Figure 91:
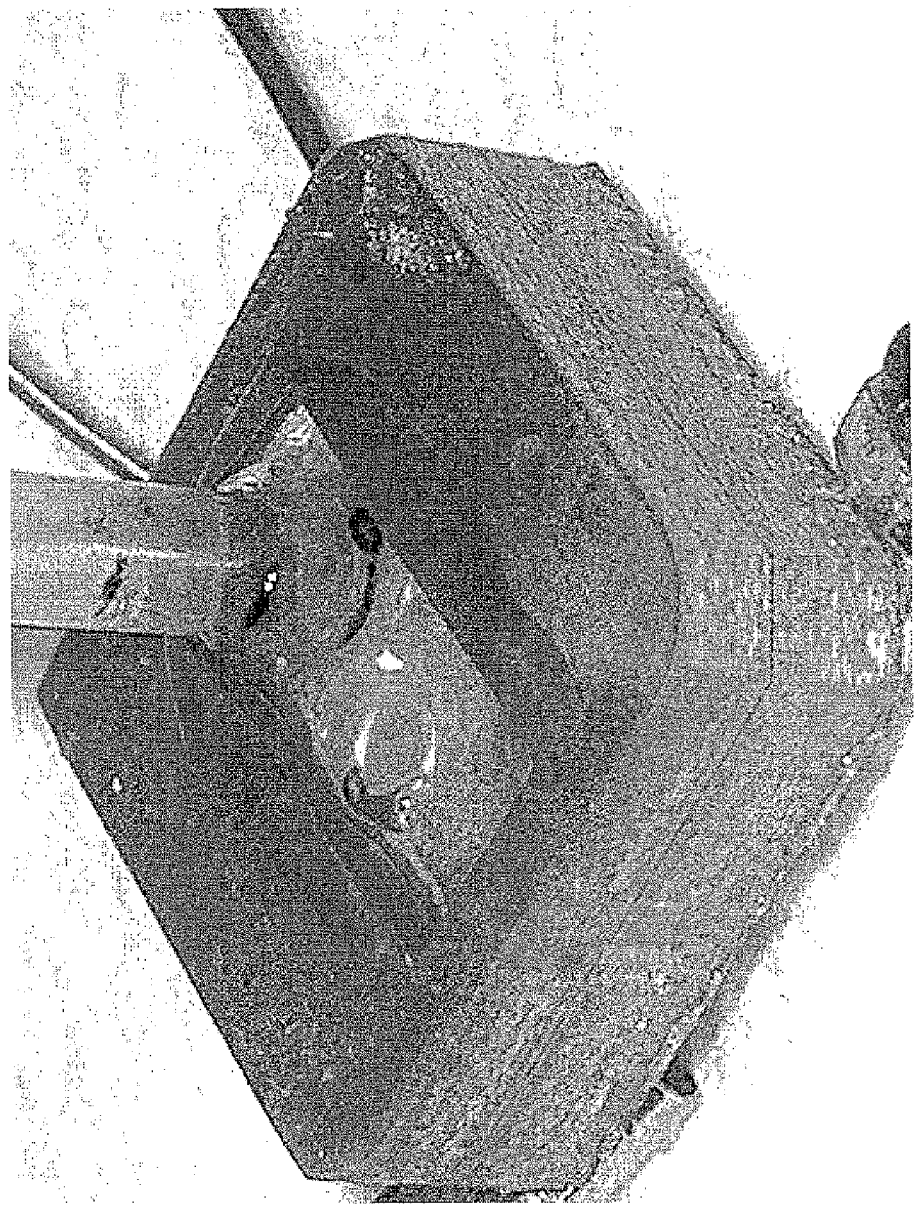

Further future measurements aim to determine the active power P, the reactive power Q and the deforming power D of the system linked to the apparent power, calculated above, from the relationship in FIG. 91.

The functionality of the devised system and the feasibility thereof using PCB technology has thus been demonstrated. In the above description the steps of manufacturing and characterizing a microfluidic system in PCB technology for including and storing an NaBH4 solution and the relative by-products of the production of H2 have been outlined.

For a commercial implementation of a system for producing electric energy for portable devices, it has been thought of to use disposable cartridges to contain the NaBH4 solutions and the relative by-products of the production of hydrogen. The description has shown CAD manufacture, the manufacture and characterisation of a prototype of a tank for storing the NaBH4 solution and relative by-products of the production of hydrogen, integrating the piezoelectric pumps, desirable for the circulation of the solution. The integration of the microfluidic systems in the tank was carried out vertically, in other words each part was mounted on the upper face of the preceding one, with the great advantage of high simplicity of assembly.

The prototype presented was made using PCB technology that allows a substantial saving in terms of manufacturing time and cost. Numerous microfluidic characterisations have been carried out on the prototypes made, the best values of which determined experimentally have been shown. Voltage and current measurements have been taken at the electrodes of the piezoelectric element in order to determine the apparent power absorbed by the system in object. The functionality of the devised system and the feasibility thereof using PCB technology has thus been demonstrated.

The invention claimed is:

1. A device for producing energy for portable applications comprising:
   a micro fuel cell;
   a microreactor having a reaction chamber including a catalyst for producing hydrogen gas to be fed to said micro fuel cell;
   said microreactor comprising
      at least one composite material substrate, and
      a semipermeable membrane adjacent said at least one composite material substrate,
      said at least one composite material substrate and said semipermeable membrane being coupled to said micro fuel cell to define a single body.

2. The device according to claim 1 wherein said at least one composite material substrate comprises a microchannel having a plurality of trapping seats for particles of the catalyst.

3. The device according to claim 2 wherein said trapping seats are transverse with respect to an axis of said microchannel.

4. The device according to claim 1 wherein said microreactor further comprises an upper layer over said at least one composite material substrate and said semipermeable membrane; said upper layer having at least one through opening therein.

5. The device according to claim 1 wherein said micro fuel cell comprises a first layer and a second layer, each comprising a composite material and having at least one membrane electrode assembly (MEA) membrane arranged therebetween.

6. The device according to claim 5 wherein said micro fuel cell comprises a third intermediate layer between said first layer and said second layer; the MEA membrane being completely embedded between said first layer and said third layer.

7. The device according to claim 6 wherein said at least one composite material substrate, said first and second layers, said upper layer, and said intermediate third layer each comprises a composite material.

8. The device according to claim 7 wherein said composite material comprises at least one of Flame Retardant 4 (FR4) and Composite Epoxy Material type 1 (CEM1).

9. The device according claim 1 further comprising a fuel solution for reacting with the catalyst; said fuel solution comprising an aqueous solution of Sodium Borohydride (NaBH4).

10. The device according to claim 1 wherein said catalyst comprises a metal of group VIIIB.

11. The device according to claim 10 wherein the metal is selected from Cobalt, Nickel, Platinum and Ruthenium.

12. A device comprising:
   a plurality of micro fuel cells;
   a microreactor having a reaction chamber including a catalyst for producing hydrogen gas to be fed to said plurality of micro fuel cells;
   said microreactor comprising
      at least one composite material substrate, and
         a semipermeable membrane adjacent said at least one composite material substrate,
         said at least one composite material substrate and said semipermeable membrane being coupled to said plurality of micro fuel cells to define a single body;
   a tank for storing a fuel solution and by-products of $H_2$ production that occurs inside the microreactor; and
   a plurality of piezoelectric microfluidic units for sending the fuel solution to the reaction chamber and for expelling the by-products from the reaction chamber after the $H_2$ production is complete.

13. The device according to claim 12 wherein the device defines a monolithic structure.

14. A method of forming a device for producing energy for portable applications comprising:
   forming at least one micro fuel cell; and
   forming a microreactor having a reaction chamber including a catalyst for producing hydrogen gas to be fed to the at least one micro fuel cell;
   the microreactor comprising
      at least one composite material substrate, and
      a semipermeable membrane adjacent the at least one composite material substrate,
      the at least one composite material substrate and the semipermeable membrane to the at least one micro fuel cell to define a single body.

15. The method according to claim 14 wherein the at least one composite material substrate comprises a microchannel having a plurality of trapping seats for particles of the catalyst.

16. The method according to claim 15 wherein the trapping seats are transverse with respect to an axis of the microchannel.

17. The method according to claim 14 wherein providing the microreactor further comprises an upper layer over the at least one composite material substrate and the semipermeable membrane; the upper layer having at least one open hole therein.

18. The method according to claim 14 wherein the at least one micro fuel cell comprises a first layer and a second layer, each comprising a composite material and having at least one membrane electrode assembly (MEA) membrane arranged therebetween.

19. The method according to claim 18 wherein the at least one micro fuel cell comprises a third intermediate layer between the first layer and the second layer; and completely embedding the MEA membrane between the first layer and the third layer.

20. The method according to claim 19 wherein the at least one composite material substrate, the first and second layers, the upper layer, and the intermediate third layer each comprises a composite material.

* * * * *